(12) United States Patent
Rodrigo et al.

(10) Patent No.: US 12,107,916 B2
(45) Date of Patent: Oct. 1, 2024

(54) PRIORITISING NETWORK FUNCTION NODES

(71) Applicant: Telefonaktiebolaget LM Ericsson (publ), Stockholm (SE)

(72) Inventors: Maria Cruz Bartolome Rodrigo, Madrid (ES); Xin Yu Zhang, Stockholm (SE); Yunjie Lu, Shanghai (CN); Emiliano Merino Vazquez, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/266,942

(22) PCT Filed: Jan. 14, 2022

(86) PCT No.: PCT/EP2022/050778
§ 371 (c)(1),
(2) Date: Jun. 13, 2023

(87) PCT Pub. No.: WO2022/152870
PCT Pub. Date: Jul. 21, 2022

(65) Prior Publication Data
US 2024/0064197 A1    Feb. 22, 2024

(30) Foreign Application Priority Data

Jan. 14, 2021   (EP) .................................. 21382018
Sep. 30, 2021   (WO) ................ PCT/CN2021/122070

(51) Int. Cl.
*H04L 67/1008* (2022.01)
*H04L 67/51* (2022.01)

(52) U.S. Cl.
CPC .......... *H04L 67/1008* (2013.01); *H04L 67/51* (2022.05)

(58) Field of Classification Search
CPC ........................... H04L 67/1008; H04L 67/51
See application file for complete search history.

(56) References Cited

U.S. PATENT DOCUMENTS 10,609,530 B1 * 3/2020 Patil ...................... H04L 41/122
10,833,938 B1 * 11/2020 Rajput ................ H04L 67/1095
(Continued)

FOREIGN PATENT DOCUMENTS

WO    2021083926 A1    5/2021

OTHER PUBLICATIONS

3rd Generation Partnership Project, "3rd Generation Partnership Project; Technical Specification Group Core Network and Terminals; 5G System; Network Function Repository Services; Stage 3 (Release 17)", Technical Specification, 3GPP TS 29.510 V17.2.0, Jun. 2021, pp. 1-236, 3GPP.

(Continued)

*Primary Examiner* — Benjamin M Thieu
(74) *Attorney, Agent, or Firm* — COATS & BENNETT, PLLC

(57) ABSTRACT

There is provided a method for prioritising a plurality of first NF nodes of at least one service producer. Transmission of a first message is initiated (202) towards a network repository function (NRF) node. The first message comprises information indicative of a plurality of criteria and an order of importance of the criteria. The information is for use in assigning priority information to the plurality of first NF nodes. For each first NF node, the priority information is indicative of a priority with which the first NF node is to be selected to provide a service relative to at least one other first NF node of the plurality of first NF nodes and the priority information is assigned based on one or more criteria of the criteria that the first NF node meets and the position of the one or more criteria in the order of importance of the criteria.

23 Claims, 24 Drawing Sheets

(56) References Cited

U.S. PATENT DOCUMENTS

2020/0127916 A1    4/2020  Krishan
2020/0314615 A1   10/2020  Patil et al.
2021/0168055 A1*   6/2021  Lair ........................ H04L 67/51
2022/0060547 A1*   2/2022  Krishan .................. H04L 67/51

OTHER PUBLICATIONS

3rd Generation Partnership Project, "3rd Generation Partnership Project; Technical Specification Group Core Network and Terminals; 5G System; Network Function Repository Services; Stage 3 (Release 16)", Technical Specification, 3GPP TS 29.510 V16.1.1, Oct. 2019, pp. 1-150, 3GPP.

* cited by examiner

PRIORITISING NETWORK FUNCTION NODES

TECHNICAL FIELD

The disclosure relates to methods for prioritising a plurality of first network function (NF) nodes of at least one service producer in a network, and nodes configured to operate in accordance with those methods.

BACKGROUND

There exist various techniques for handling a request for a service in a network. A service request is generally from a consumer of the service ("service consumer") to a producer of the service ("service producer"). For example, a service request may be from a network function (NF) node of a service consumer to an NF node of a service producer. The NF node of the service consumer and the NF node of the service producer can communicate directly or indirectly. This is referred to as direct communication and indirect communication respectively. In the case of indirect communication, the NF node of the service consumer and the NF node of the service producer may communicate via a service communication proxy (SCP) node.

FIG. 1A-D illustrates different existing systems for handling service requests, as set out in 3GPP TS 23.501 v16.4.0. In more detail, FIGS. 1A and 1B illustrate systems that use direct communication, while FIGS. 1C and 1D illustrate systems that use indirect communication.

In the systems illustrated in FIGS. 1A and 1B, a service request is sent directly from the NF node of the service consumer to the NF node of the service producer. A response to the service request is sent directly from the NF node of the service producer to the NF node of the service consumer. Similarly, any subsequent service requests are sent directly from the NF node of the service consumer to the NF node of the service producer. The system illustrated in FIG. 1B also comprises a network repository function (NRF) node. Thus, in the system illustrated in FIG. 1B, the NF node of the service consumer can query the NRF node to discover suitable NF nodes of the service producer to which to send the service request. In response to such a query, the NF node of the service consumer can receive an NF profile for one or more NF nodes of the service producer and, based on the received NF profile(s) can select an NF node of the service producer to which to send the service request. In the system illustrated in FIG. 1A, the NRF node is not used and instead the NF node of the service consumer may be configured with the NF profile(s) of the NF node(s) of the service producer.

In the systems illustrated in FIGS. 1C and 1D, a service request is sent indirectly from the NF node of the service consumer to the NF node of the service producer via a service communication proxy (SCP) node. A response to the service request is sent indirectly from the NF node of the service producer to the NF node of the service consumer via the SCP node. Similarly, any subsequent service requests are sent indirectly from the NF node of the service consumer to the NF node of the service producer via the SCP node. The systems illustrated in FIGS. 1C and 1D also comprise an NRF node.

In the system illustrated in FIG. 1C, the NF node of the service consumer can query the NRF node to discover suitable NF nodes of the service producer to which to send the service request. In response to such a query, the NF node of the service consumer can receive an NF profile for one or more NF nodes of the service producer and, based on the received NF profile(s) can select an NF node of the service producer to which to send the service request. In this case, the service request sent from the NF node of the service consumer to the SCP node comprises the address of the selected NF node of the service producer. The NF node of the service consumer can forward the service request without performing any further discovery or selection. In case the selected NF node of the service producer is not accessible for any reason, it may be up to the NF node of the service consumer to find an alternative. In other cases, the SCP node may communicate with the NRF node to acquire selection parameters (e.g. location, capacity, etc.) and the SCP node may select an NF node of the service producer to which to send the service request.

In the system illustrated in FIG. 1D, the NF node of the service consumer does not carry out the discovery or selection process. Instead, the NF node of the service consumer adds any necessary discovery and selection parameters (required to find a suitable NF node of the service producer) to the service request that it sends via the SCP node. The SCP node uses the request address and the discovery and selection parameters in the service request to route the service request to a suitable NF node of the service producer. The SCP node can perform discovery with the NRF node.

For the fifth generation core (5GC), from Release 16, the SCP node is included as a network element to allow indirect communication between an NF node of a service consumer and an NF node of a service producer. The indirect communication that is used can be either of the two indirect communications options described earlier with reference to FIGS. 1C and 1D.

Each of the techniques illustrated in FIGS. 1B, 1C and 1D involve a discovery process for discovering NF nodes of a service producer and this involves the NF node of the service consumer receiving an NF profile of one or more NF nodes of the service producer for use in selecting an NF node of the service producer to which to send a service request. The NF node of the service consumer may receive, in a discovery response, one or multiple NF service producer profiles, e.g. of functionally equivalent NF service producer instances. An NF service producer profile can include a priority value that can be used by the NF node of the service consumer to perform selection (or reselection) among the provided NF service producer profiles.

The NF node of the service consumer may define the NF service producer profiles it is interested in by including in the discovery request it transmits to the NRF node some specific query parameters, e.g. target-nf-type, service-names, and/or any other query parameters (such as any one or more of the query parameters defined in clause 6.2.3.2.3.1 in 3GPP 29.510 V17.2.0). The specific query parameters can be those that the NF node of the service consumer requires that corresponding query parameters in the NF service producer profiles, returned in the discovery response from the NRF node, are to match. However, there may be some query parameters that are only a preference of the NF node of the service consumer, rather than a strict requirement.

The NRF node can provide results based on the indicated preferences, as described in the third generation partnership project (3GPP). For example, clause 6.2.3.2.3.1 in 3GPP 29.510 V17.2.0 defines the preferred tracking area identity ("preferred-tai") as:

| | | | | | |
|---|---|---|---|---|---|
| preferred-tai | Tai | O | 0 . . . 1 | When present, the NRF shall prefer NF profiles that can serve the TAI, or the NRF shall return NF profiles not matching the TAI if no NF profile is found matching the TAI. | Query-Params-Ext2 |

The NRF node needs to include in the discovery response it sends the NF node of the service consumer an indication of whether or not results fulfilling the preferred-tai are provided. For this, a search result attribute is included in the discovery response. For example, clause 6.2.6.2.2 in 3GPP 29.510 V17.2.0 defines the "preferredSearch" as:

| | | | | |
|---|---|---|---|---|
| preferredSearch | Preferred Search | C | 0 . . . 1 | This information element (IE) shall be present to indicate whether all the returned NF profiles match the preferred query parameters, if the discovery request contains any of the query parameters defined in the PreferredSearch data type. |

If only one preferred query parameter is included in the discovery request, the NRF node behaves as indicated. For example, if "preferred-tai=TAI-x" is included in the discovery request, then the discovery response may include only NF service producer profiles with the requested TAI-x and "preferredTaiMatchInd=True". Alternatively, all the results may be included in the discovery response, not taking into account TAI-x, with an indication that "preferredTaiMatchInd=False".

If more than one preferred query parameter is included in the discovery request, the information provided by the NRF node in the discovery response is insufficient to ease the selection by the NF node of the service consumer. In an example, there may be a first NF node of a service producer ("NFp1") and a second NF node of a service producer ("NFp2") with the following attributes provided in their respective profiles:
  NFp1: preferred-tai=TAI-x, and preferred-vendor-specific-nf-features=x
  NFp2: preferred-tai=TAI-y, and preferred-vendor-specific-nf-features=y In this example, the discovery request transmitted from the NF node of the service consumer to the NRF node includes the following query parameters:
  preferred-tai=TAI-x, and preferred-vendor-specific-nf-features=y.

Then, the NRF node may either provide no results, or provide both NFp1 and NFp2 together with an indication that "preferredTaiMatchInd=False" and an indication that "preferredVendorSpecificFeaturesInd=False". With this information, the NF node of the service consumer is forced to either perform another NRF discovery with only one preferred query parameter or to check the contents of each of the NF service producer profiles to identify the value of TAI and vendor specific NF features.

Therefore, it is apparent at least from this example that the existing techniques for allowing an NF node of a service consumer to request some preferences for NRF discovery is cumbersome and, in some cases, not useful.

SUMMARY

It is an object of the disclosure to obviate or eliminate at least some of the above-described disadvantages associated with existing techniques.

In particular, the existing techniques that allow the NF node of the service consumer to request some preferences for the NRF discovery is cumbersome and, in some cases, not useful. Currently, the possibility for the NF node of the service consumer to include multiple query parameters and prioritise among them is not defined. It has thus been realised that an improved technique for prioritising a plurality of NF nodes of at least one service producer is needed.

Therefore, according to an aspect of the disclosure, there is provided a method for prioritising a plurality of first NF nodes of at least one service producer in a network. The method is performed by a network node. The method comprises initiating transmission of a first message towards a network repository function (NRF) node. The first message comprises information indicative of a plurality of criteria and an order of importance of the plurality of criteria. The information is for use in assigning priority information to the plurality of first NF nodes. For each first NF node of the plurality of first NF nodes, the priority information assigned to the first NF node is indicative of a priority with which the first NF node is to be selected to provide a service relative to at least one other first NF node of the plurality of first NF nodes and the priority information is assigned to the first NF node based on one or more criteria of the plurality of criteria that the first NF node meets and the position of the one or more criteria in the order of importance of the plurality of criteria.

According to an aspect of the disclosure, there is provided another method for prioritising a plurality of first NF nodes of at least one service producer in a network. The method is performed by an NRF node. The method comprises receiving a first message from a network node. The first message comprises information indicative of a plurality of criteria and an order of importance of the plurality of criteria. The method comprises assigning priority information to the plurality of first NF nodes. For each first NF node of the plurality of first NF nodes, the priority information assigned to the first NF node is indicative of a priority with which the first NF node is to be selected to provide a service relative to at least one other first NF node of the plurality of first NF nodes and the priority information is assigned to the first NF node based on one or more criteria of the plurality of criteria that the first NF node meets and the position of the one or more criteria in the order of importance of the plurality of criteria.

According to an aspect of the disclosure, there is provided another method for prioritising a plurality of first NF nodes of at least one service producer in a network. The method is performed by an NRF node. The method comprises initiating transmission of a fifth message towards a network node. The fifth message comprises priority information assigned to the plurality of first NF nodes. For each first NF node of the plurality of first NF nodes, the priority information assigned to the first NF node is indicative of a priority with which the first NF node is to be selected to provide a service relative to at least one other first NF node of the plurality of first NF nodes and the priority information is assigned to the first NF node based on one or more criteria of the plurality of criteria that the first NF node meets and the position of the one or more criteria in the order of importance of the plurality of criteria.

According to an aspect of the disclosure, there is provided another method for prioritising a plurality of first NF nodes of at least one service producer in a network. The method is performed by a network node. The method comprises receiving a fifth message from an NRF node. The fifth message comprises priority information assigned to the plurality of first NF nodes. For each first NF node of the plurality of first NF nodes, the priority information assigned to the first NF node is indicative of a priority with which the first NF node is to be selected to provide a service relative to at least one other first NF node of the plurality of first NF nodes and the priority information is assigned to the first NF node based on one or more criteria of the plurality of criteria that the first NF node meets and the position of the one or more criteria in the order of importance of the plurality of criteria.

According to another aspect of the disclosure, there is provided a network node comprising processing circuitry configured to operate in accordance with the method(s) described in respect of the network node. In some embodiments, the network node may comprise at least one memory for storing instructions which, when executed by the processing circuitry, cause the network node to operate in accordance with the method(s) described in respect of the network node.

According to another aspect of the disclosure, there is also provided an NRF node comprising processing circuitry configured to operate in accordance with the method(s) described in respect of the NRF node. In some embodiments, the NRF node may comprise at least one memory for storing instructions which, when executed by the processing circuitry, cause the NRF node to operate in accordance with the method(s) described in respect of the NRF node.

According to another aspect of the disclosure, there is provided a method performed by a system. The method comprises the method(s) described in respect of the NRF node and the method(s) described in respect of the network node.

According to another aspect of the disclosure, there is provided a system comprising at least one NRF node as described earlier and at least one network node as described earlier.

According to another aspect of the disclosure, there is provided a computer program comprising instructions which, when executed by processing circuitry, cause the processing circuitry to perform the method(s) described in respect of the NRF node and/or the method(s) described in respect of the network node.

According to another aspect of the disclosure, there is provided a computer program product, embodied on a non-transitory machine-readable medium, comprising instructions which are executable by processing circuitry to cause the processing circuitry to perform the method(s) described in respect of the NRF node and/or the method(s) described in respect of the network node.

In this way, there is provided a mechanism to enable prioritisation of NF nodes of a service producer (or, for example, the profiles thereof) according to the preferences and corresponding precedence as specified by the NF node of the service consumer. Therefore, an improved technique for prioritising a plurality of first NF nodes of at least one service producer in a network is provided.

BRIEF DESCRIPTION OF THE DRAWINGS

For a better understanding of the technique, and to show how it may be put into effect, reference will now be made, by way of example, to the accompanying drawings, in which.

DETAILED DESCRIPTION

Herein, techniques for handling a discovery request and response in a network are described. A discovery request can also be referred to as a request for discovery. A discovery request is a request for information indicative of one or more network function (NF) nodes of a service producer for providing a service requested by an NF node of a service consumer. Generally, a service is software intended to be managed for users. Herein, a service can be any type of service, such as a communication service (e.g. a notification service or a callback service), a context management (e.g. user equipment context management (UECM)) service, a data management (DM) service, or any other type of service.

Herein, techniques for prioritising a plurality of first NF nodes of at least one service producer in a network are described.

The techniques described herein can be used in respect of any network, such as any communications or telecommunications network, e.g. cellular network. The network may be a fifth generation (5G) network or any other generation network. In some embodiments, the network may be a core network or a radio access network (RAN). The techniques are implemented by a network repository function (NRF) node and a network node. The network node referred to herein may be a second NF node of a service consumer or a first service communication proxy (SCP) node. The first SCP node is a node that is configured to operate as an SCP between the second NF node and the NRF node. Generally, an NRF node is a node that provides NF service registration and discovery. An NRF node thus enables NF nodes to identify services offered by other NF nodes. Further definitions of an NRF node are provided in 3GPP TS 29.510 V16.5.0 and V17.2.0 and the NRF node described herein may be capable of operating in accordance with any of the methods described therein.

An NF is a third generation partnership project (3GPP) adopted, or 3GPP defined, processing function in a network, which has defined functional behaviour and 3GPP defined interfaces. An NF can be implemented either as a network element on a dedicated hardware, as a software instance running on a dedicated hardware, or as a virtualised function instantiated on an appropriate platform, e.g. on a cloud infrastructure. Herein, the term "node" in relation to an "NF node" will be understood to cover each of these scenarios. Herein, references to a plurality of NF nodes of a service producer may refer to, for example, functionally equivalent instances of NF nodes of the service producer.

Figure 2:
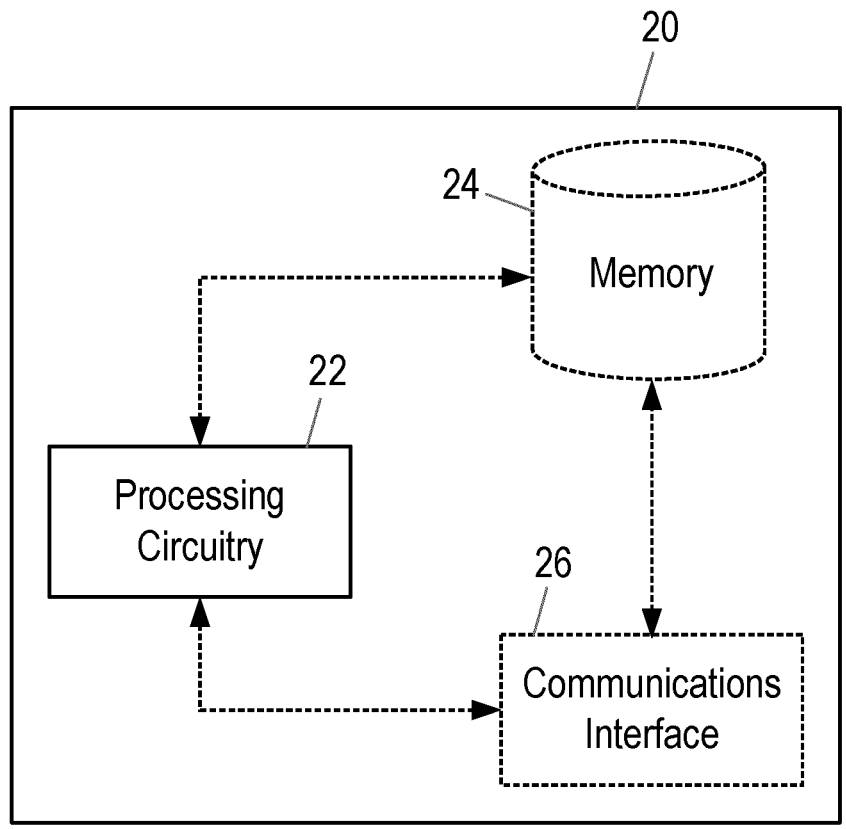
FIG. 2 is a block diagram illustrating a network node according to an embodiment.

FIG. 2 illustrates a network node 20 in accordance with an embodiment. The network node 20 is for prioritising a plurality of first NF nodes of at least one service producer in a network. The network node can be a second NF node of the service consumer or a first SCP node. The first SCP node is configured to operate as an SCP between the second NF node and an NRF node. In some embodiments, the network node 20 (e.g. the second NF node and/or the first SCP node) can, for example, be a physical machine (e.g. a server) or a virtual machine (VM). The second NF node can be, for example, a user equipment (UE).

As illustrated in FIG. 2, the network node 20 comprises processing circuitry (or logic) 22. The processing circuitry 22 controls the operation of the network node 20 and can implement the method described herein in respect of the network node 20. The processing circuitry 22 can be configured or programmed to control the network node in the manner described herein. The processing circuitry 22 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the network node 20. In some embodiments, the processing circuitry 22 can be configured to run software to perform the method described herein in respect of the network node 20. The software may be containerised according to some embodiments. Thus, in some embodiments, the processing circuitry 22 may be configured to run a container to perform the method described herein in respect of the network node 20.

Briefly, the processing circuitry 22 of the network node 20 is configured to, initiate transmission of a first message towards an NRF node. The first message comprises information indicative of a plurality of criteria and an order of importance of the plurality of criteria. The information is for use in assigning priority information to the plurality of first NF nodes. Alternatively or in addition, the processing circuitry 22 of the network node 20 is configured to receive a fifth message from an NRF node. The fifth message comprises priority information assigned to the plurality of first NF nodes. For each first NF node of the plurality of first NF nodes, the priority information assigned to the first NF node is indicative of a priority with which the first NF node is to be selected to provide a service relative to at least one other first NF node of the plurality of first NF nodes and the priority information is assigned to the first NF node based on one or more criteria of the plurality of criteria that the first NF node meets and the position of the one or more criteria in the order of importance of the plurality of criteria.

As illustrated in FIG. 2, in some embodiments, the network node 20 may optionally comprise a memory 24. The memory 24 of the network node 20 can comprise a volatile memory or a non-volatile memory. In some embodiments, the memory 24 of the network node 20 may comprise a non-transitory media. Examples of the memory 24 of the network node 20 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 22 of the network node 20 can be connected to the memory 24 of the network node 20. In some embodiments, the memory 24 of the network node 20 may be for storing program code or instructions which, when executed by the processing circuitry 22 of the network node 20, cause the network node 20 to operate in the manner described herein in respect of the network node 20. For example, in some embodiments, the memory 24 of the network node 20 may be configured to store program code or instructions that can be executed by the processing circuitry 22 of the network node 20 to cause the network node 20 to operate in accordance with the method described herein in respect of the network node 20. Alternatively or in addition, the memory 24 of the network node 20 can be configured to store any information, data, messages, requests, responses, indications, notifications, signals, or similar, that are described herein. The processing circuitry 22 of the network node 20 may be configured to control the memory 24 of the network node 20 to store information, data, messages, requests, responses, indications, notifications, signals, or similar, that are described herein.

In some embodiments, as illustrated in FIG. 2, the network node 20 may optionally comprise a communications interface 26. The communications interface 26 of the network node 20 can be connected to the processing circuitry 22 of the network node and/or the memory 24 of the network node 20. The communications interface 26 of the network node 20 may be operable to allow the processing circuitry 22 of the network node 20 to communicate with the memory 24 of the network node 20 and/or vice versa. Similarly, the communications interface 26 of the network node 20 may be operable to allow the processing circuitry 22 of the network node 20 to communicate with the NRF node, the first NF node, the second NF node, and/or any other node. The communications interface 26 of the network node 20 can be configured to transmit and/or receive information, data, messages, requests, responses, indications, notifications, signals, or similar, that are described herein. In some embodiments, the processing circuitry 22 of the network node 20 may be configured to control the communications interface 26 of the network node 20 to transmit and/or receive information, data, messages, requests, responses, indications, notifications, signals, or similar, that are described herein.

Although the network node 20 is illustrated in FIG. 2 as comprising a single memory 24, it will be appreciated that the network node 20 may comprise at least one memory (i.e. a single memory or a plurality of memories) 24 that operate in the manner described herein. Similarly, although the network node 20 is illustrated in FIG. 2 as comprising a single communications interface 26, it will be appreciated that the network node 20 may comprise at least one communications interface (i.e. a single communications interface or a plurality of communications interface) 26 that operate in the manner described herein. It will also be appreciated that FIG. 2 only shows the components required to illustrate an embodiment of the network node 20 and, in practical implementations, the network node 20 may comprise additional or alternative components to those shown.

Figure 3:
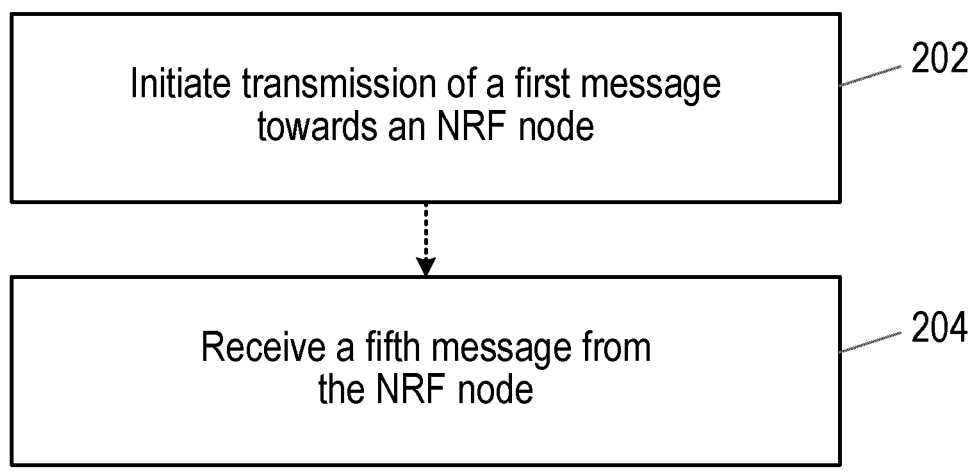
FIG. 3 is a flowchart illustrating a method performed by a network node according to an embodiment.

FIG. 3 is a flowchart illustrating a method performed by a network node 20 in accordance with an embodiment. As mentioned earlier, the network node 20 can be the second NF node of a service consumer, or a first SCP node that is configured to operate as an SCP between a second NF node and an NRF node. The method is for prioritising a plurality of first NF nodes of at least one service producer in a network. The network node 20 described earlier with reference to FIG. 2 is configured to operate in accordance with the method of FIG. 3. The method can be performed by or under the control of the processing circuitry 22 of the network node 20.

As illustrated at block 202 of FIG. 3, transmission of a first message is initiated towards an NRF node. Herein, the term "initiate" can mean, for example, cause or establish.

Thus, the processing circuitry 22 of the network node 20 can be configured to itself transmit the first message (e.g. via a communications interface 26 of the network node 20) or can be configured to cause another node to transmit the first message. The first message comprises information indicative of a plurality of criteria and an order of importance of the plurality of criteria. The information is for use in assigning priority information to the plurality of first NF nodes. For each first NF node of the plurality of first NF nodes, the priority information assigned to the first NF node is indicative of a priority with which the first NF node is to be selected relative to at least one other first NF node of the plurality of first NF nodes. The first NF node is to be selected to provide (e.g. execute or run) a service. The priority information is assigned to the first NF node based on one or more criteria of the plurality of criteria that the first NF node meets and the position of the one or more criteria in the order of importance of the plurality of criteria.

The priority information referred to herein is for use by the network node 20 in selecting an NF node of a service producer to provide a service requested by a second NF node of a service consumer. The priority information is indicative of a priority with which the first NF node is to be selected relative to at least one other NF node of the service producer. The priority information referred to herein may also be referred to as a priority attribute. In some embodiments, the priority information referred to herein may be a value, such as an integer value. For example, it may be that the lowest value (e.g. 1) is indicative of the highest priority and the highest value (e.g. 65535) is indicative of the lowest priority. This value may also be referred to herein as a priority value.

Herein, a service can be software intended to be managed for users. The service referred to herein can be any type of service, such as a communication service, a context management (e.g. user equipment context management (UECM)) service, a data management (DM) service, or any other type of service.

In some embodiments, the first message may comprise an array and the array may comprise the information indicative of the plurality of criteria and the order of importance of the plurality of criteria. In some of these embodiments, each item of the array may comprise a different criterion of the plurality of criteria and the plurality of criteria are ordered in the array according to their importance.

In some embodiments, the method may comprise initiating transmission of a second message towards the NRF node. The second message can comprise the information indicative of the plurality of criteria and the order of importance of the plurality of criteria and/or information indicative of the plurality of first NF nodes for providing the service and, for each first NF node of the plurality of first NF nodes, the priority information assigned to the first NF node.

In some embodiments, the second message may be a first subscription request, and the first subscription request may be a request for the NRF node to notify the network node 20 of updates to a profile of any first NF nodes of the plurality of first NF nodes or the first subscription request may be a request for the NRF node to notify the network node 20 of updates to the priority information assigned to any first NF nodes of the plurality of first NF nodes. In some embodiments, the first subscription request may be separate from a second subscription request and the second subscription request may be a request for the NRF node to notify the network node 20 of updates to a profile of any first NF nodes of the plurality of first NF nodes.

In some embodiments, the first message may be a discovery request and the discovery request may be a request for information indicative of the plurality of first NF nodes for providing the service.

In other embodiments, the first message may be a subscription request and the subscription request may be a request for the NRF node to notify the network node 20 of updates to a profile of any first NF nodes of the plurality of first NF nodes. The subscription request can be for updates to a profile of one or more (e.g. all) first NF nodes of the plurality of NF nodes. In some embodiments, if the network node stores (or caches) a profile of one or more of the plurality of first NF nodes provided in a discovery response, then the network node 20 may subscribe to changes in the profile of those first NF node(s). An existing subscription can involve, for example, one (e.g. instance of a) first NF node or a set of first NF nodes (e.g. or a set of instances of a first NF node). In some embodiments, the priority information may not be provided in the subscription request. For example, instead, the NRF node may determine the priority information and optionally also store it, e.g. as part of other information stored for the subscription. This allows the NRF node to send, to the network node, a notification of updates to a profile of one or more of the first NF nodes of the plurality of first NF nodes only when the priority information has changed.

In other embodiments, the first message may be a first subscription request and the first subscription request may be a request for the NRF node to notify the network node of updates to the priority information assigned to any first NF nodes of the plurality of first NF nodes. In some embodiments, the first subscription request may comprise information indicative of the plurality of first NF nodes for providing the service. In some embodiments, the first subscription request may be separate from a second subscription request and the second subscription request may be a request for the NRF node to notify the network node 20 of updates to a profile of any first NF nodes of the plurality of first NF nodes.

In other embodiments, the first message may comprise an identifier and the identifier may be the information indicative of the plurality of criteria and the order of importance of the plurality of criteria. In some embodiments, the information indicative of the plurality of criteria and the order of importance of the plurality of criteria may be an identity of a resource of the NRF node at which the information indicative of the plurality of criteria and the order of importance of the plurality of criteria is stored. In some embodiments, the method may comprise receiving a third message comprising the identifier from the NRF node. In some embodiments, the third message may be a discovery response and the discovery response may comprise information indicative of the plurality of first NF nodes for providing the service and information indicative that the priority information has been assigned to the plurality of first NF nodes. In some embodiments, the identifier may be a uniform resource identifier (URI). The identifier (e.g. URI) referred to herein can be used to access the information indicative of the plurality of criteria and the order of importance of the plurality of criteria.

In some embodiments, the method may comprise initiating transmission of a discovery request towards the NRF node. The discovery request can be a request for information indicative of the plurality of first NF nodes for providing the service and the discovery request may comprise information indicative that the network node 20 is to be subscribed to updates to the priority information assigned to any first NF nodes of the plurality of first NF nodes.

In some embodiments, the method may comprise initiating transmission of a (new) discovery request towards the NRF node in response to receiving a fourth message from the NRF node. The fourth message may comprise information indicative that the network node 20 is to initiate transmission of a (new) discovery request towards the NRF node. The (new) discovery request can be a request for information indicative of an alternative plurality of first NF nodes for providing the service and may comprise the information indicative of the plurality of criteria and the order of importance of the plurality of criteria. The (new) discovery request can be similar to an earlier discovery request. Thus, it may start the earlier described process again.

Returning back to FIG. 3, alternatively or in addition to initiating transmission of the first message, as illustrated at block 204 of FIG. 3, a fifth message is received from an NRF node. The fifth message comprises priority information assigned to the plurality of first NF nodes. For each first NF node of the plurality of first NF nodes, the priority information assigned to the first NF node is indicative of a priority with which the first NF node is to be selected relative to at least one other first NF node of the plurality of first NF nodes. The first NF node is to be selected to provide (e.g. execute or run) a service. The priority information is assigned to the first NF node based on one or more criteria of the plurality of criteria that the first NF node meets and the position of the one or more criteria in the order of importance of the plurality of criteria.

In some embodiments, the method may comprise selecting a first NF node from the plurality of first NF nodes to provide the service, where the first NF node can be selected based on the priority information. In some embodiments, the priority information assigned to the selected first NF node may be indicative that a priority with which the selected first NF node is to be selected is higher than a priority with which the other first NF nodes are to be selected. As mentioned before, the priority information is indicative of a priority with which the first NF nodes are to be selected relative to each other. Thus, for example, a first NF node that has the highest priority (e.g. indicated by the lower priority value of "1") may be selected. The NRF node can thus prioritise the first NF nodes by assignment of priority information (e.g. a priority value) to each of the first NF nodes. In this way, the first NF nodes can be ordered (or ranked). If multiple first NF nodes are assigned the same priority information, a first NF node may be randomly selected from the first NF nodes for which the priority information indicates a highest priority for selection. In some embodiments, the selection may be based on one or more other criteria as well as the priority information.

The one or more other criteria referred to herein may, for example, be any one or more of a location of each first NF node, a load on each first NF node, a capacity of each first NF node and/or any other criterion, or any combination of criteria. In some embodiments, it may be configured in the NRF node (e.g. by an operator) that the priority information is to take precedence over all other criteria, e.g. including any other criteria provided in the discovery request. In other embodiments, it may be configured in the NRF node (e.g. by an operator) that the priority information is to take precedence over all other criteria, e.g. including any other criteria provided in the discovery request, except for one or more criteria (e.g. except for locality). In other embodiments, the NRF node may be configured to perform health supervision and identify whether any one or more first NF nodes (e.g. regardless of any criteria) are down such that those one or more first NF nodes can be deprioritised.

In some embodiments, the fifth message may be a discovery response. The discovery response may comprise information indicative of the plurality of first NF nodes for providing the service and information indicative that the priority information has been assigned to the plurality of first NF nodes.

In other embodiments, the fifth message may be a subscription response and the subscription response may comprise information indicative of an update to a profile of one or more first NF nodes of the plurality of first NF nodes.

In other embodiments, the fifth message may be a first subscription response and the first subscription response may comprise information indicative of an update to the priority information assigned to one or more first NF nodes of the plurality of first NF nodes. In some embodiments, the first subscription response may be separate from a second subscription response and the second subscription response may comprise information indicative of an update to a profile of one or more first NF nodes of the plurality of first NF nodes.

In some embodiments, the method may comprise receiving a fourth message from the NRF node. The fourth message may comprise information indicative that the network node 20 is to initiate transmission of a (new) discovery request towards the NRF node. The (new) discovery request can be a request for information indicative of an alternative plurality of first NF nodes for providing the service. The (new) discovery request can be similar to an earlier discovery request. Thus, it may start the earlier described process again.

Figure 4:
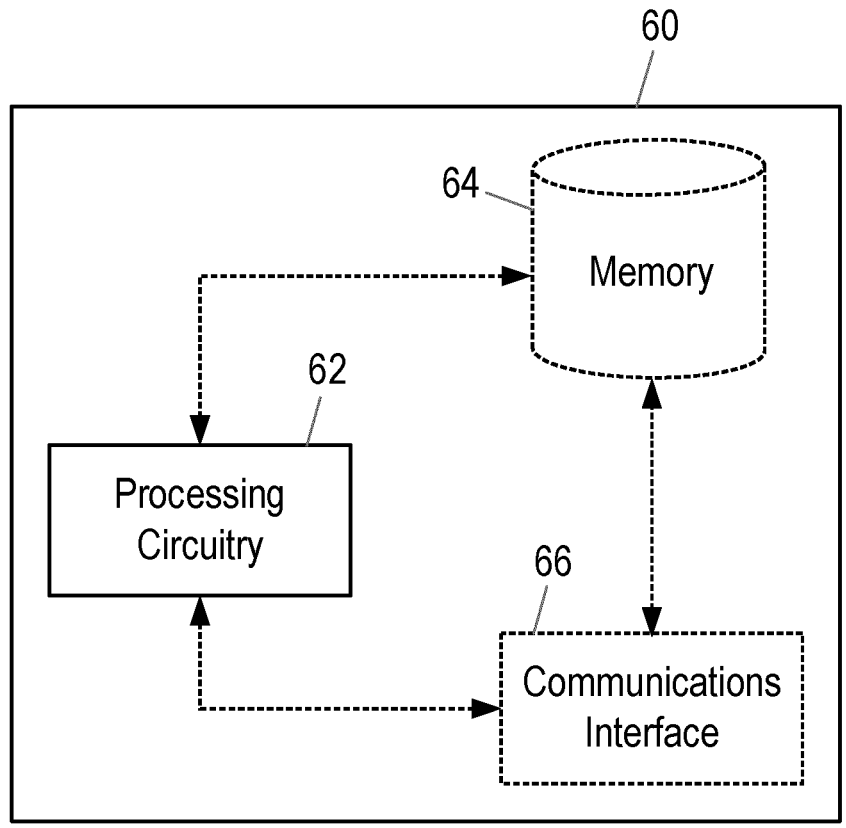
FIG. 4 is a block diagram illustrating an NRF node according to an embodiment.

FIG. 4 illustrates a network repository function (NRF) node 60 in accordance with an embodiment. The NRF node 60 is for prioritising a plurality of first NF nodes of at least one service producer in a network. In some embodiments, the NRF node 60 can, for example, be a physical machine (e.g. a server) or a virtual machine (VM).

As illustrated in FIG. 4, the NRF node 60 comprises processing circuitry (or logic) 62. The processing circuitry 62 controls the operation of the NRF node 60 and can implement the method described herein in respect of the NRF node 60. The processing circuitry 62 can be configured or programmed to control the NRF node 60 in the manner described herein. The processing circuitry 62 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the NRF node 60. In some embodiments, the processing circuitry 62 can be configured to run software to perform the method described herein in respect of the NRF node 60. The software may be containerised according to some embodiments. Thus, in some embodiments, the processing circuitry 62 may be configured to run a container to perform the method described herein in respect of the NRF node 60.

Briefly, the processing circuitry 62 of the NRF node 60 is configured to receive a first message from a network node 20. The first message comprises information indicative of a plurality of criteria and an order of importance of the plurality of criteria. The processing circuitry 62 of the NRF node 60 is configured to assign priority information to the plurality of first NF nodes. Alternatively or in addition, the processing circuitry 62 of the NRF node 60 is configured to initiate transmission of a fifth message towards a network node 20. The fifth message comprises priority information assigned to the plurality of first NF nodes. For each first NF node of the plurality of first NF nodes, the priority information assigned to the first NF node is indicative of a priority with which the first NF node is to be selected relative to at least one other first NF node of the plurality of first NF nodes. The first NF node is to be selected to provide (e.g. execute or run) a service. The priority information is assigned to the first NF node based on one or more criteria of the plurality of criteria that the first NF node meets and the position of the one or more criteria in the order of importance of the plurality of criteria.

As illustrated in FIG. 4, in some embodiments, the NRF node 60 may optionally comprise a memory 64. The memory 64 of the NRF node 60 can comprise a volatile memory or a non-volatile memory. In some embodiments, the memory 64 of the NRF node 60 may comprise a non-transitory media. Examples of the memory 64 of the NRF node 60 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 62 of the NRF node 60 can be connected to the memory 64 of the NRF node 60. In some embodiments, the memory 64 of the NRF node 60 may be for storing program code or instructions which, when executed by the processing circuitry 62 of the NRF node 60, cause the NRF node 60 to operate in the manner described herein in respect of the NRF node 60. For example, in some embodiments, the memory 64 of the NRF node 60 may be configured to store program code or instructions that can be executed by the processing circuitry 62 of the NRF node 60 to cause the NRF node 60 to operate in accordance with the method described herein in respect of the NRF node 60. Alternatively or in addition, the memory 64 of the NRF node 60 can be configured to store any information, data, messages, requests, responses, indications, notifications, signals, or similar, that are described herein. The processing circuitry 62 of the NRF node 60 may be configured to control the memory 64 of the NRF node 60 to store information, data, messages, requests, responses, indications, notifications, signals, or similar, that are described herein.

In some embodiments, as illustrated in FIG. 4, the NRF node 60 may optionally comprise a communications interface 66. The communications interface 66 of the NRF node 60 can be connected to the processing circuitry 62 of the NRF node 60 and/or the memory 64 of the NRF node 60. The communications interface 66 of the NRF node 60 may be operable to allow the processing circuitry 62 of the NRF node 60 to communicate with the memory 64 of the NRF node 60 and/or vice versa. Similarly, the communications interface 66 of the NRF node 60 may be operable to allow the processing circuitry 62 of the NRF node 60 to communicate with the first NF node, the network node (e.g. the second NF node and/or first SCP node) 20, and/or any other node. The communications interface 66 of the NRF node 60 can be configured to transmit and/or receive information, data, messages, requests, responses, indications, notifications, signals, or similar, that are described herein. In some embodiments, the processing circuitry 62 of the NRF node 60 may be configured to control the communications interface 66 of the NRF node 60 to transmit and/or receive information, data, messages, requests, responses, indications, notifications, signals, or similar, that are described herein.

Although the NRF node 60 is illustrated in FIG. 4 as comprising a single memory 64, it will be appreciated that the NRF node 60 may comprise at least one memory (i.e. a single memory or a plurality of memories) 64 that operate in the manner described herein. Similarly, although the NRF node 60 is illustrated in FIG. 4 as comprising a single communications interface 66, it will be appreciated that the NRF node 60 may comprise at least one communications interface (i.e. a single communications interface or a plurality of communications interface) 66 that operate in the manner described herein. It will also be appreciated that FIG. 4 only shows the components required to illustrate an embodiment of the NRF node 60 and, in practical implementations, the NRF node 60 may comprise additional or alternative components to those shown.

Figure 5:
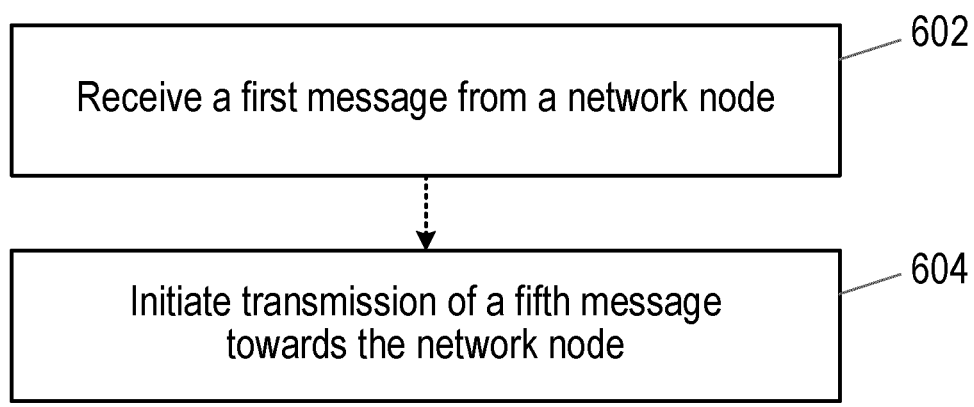
FIG. 5 is a flowchart illustrating a method performed by an NRF node according to an embodiment.

FIG. 5 is a flowchart illustrating a method performed by an NRF node 60 in accordance with an embodiment. The method is for handling an updated profile of a first NF node of a service producer in a network. The NRF node 60 described earlier with reference to FIG. 4 is configured to operate in accordance with the method of FIG. 5. The method can be performed by or under the control of the processing circuitry 62 of the NRF node 60.

As illustrated at block 602 of FIG. 5, a first message is received from a network node and priority information is assigned to the plurality of first NF nodes. The first message comprises information indicative of a plurality of criteria and an order of importance of the plurality of criteria. For each first NF node of the plurality of first NF nodes, the priority information assigned to the first NF node is indicative of a priority with which the first NF node is to be selected relative to at least one other first NF node of the plurality of first NF nodes. The first NF node is to be selected to provide (e.g. execute or run) a service. The priority information is assigned to the first NF node based on one or more criteria of the plurality of criteria that the first NF node meets and the position of the one or more criteria in the order of importance of the plurality of criteria. The priority information can be assigned to the plurality of first NF nodes based on the plurality of criteria and the order of importance of the plurality of criteria. For example, if a first NF node meets the most important criteria of the plurality of criteria, this first NF node may be assigned priority information that indicates that it is to be selected with a higher priority than another first NF node that does not meet the most important criteria.

In some embodiments, the first message may comprise an array and the array may comprise the information indicative of the plurality of criteria and the order of importance of the plurality of criteria. In some of these embodiments, each item of the array may comprise a different criterion of the plurality of criteria and the plurality of criteria are ordered in the array according to their importance.

In some embodiments, the method may comprise receiving a second message from the network node 20. The second message may comprise the information indicative of the plurality of criteria and the order of importance of the plurality of criteria and/or information indicative of the plurality of first NF nodes for providing the service and, for each first NF node of the plurality of first NF nodes, the priority information assigned to the first NF node.

In some embodiments, the second message may be a first subscription request, and the first subscription request may be a request for the NRF node 60 to notify the network node 20 of updates to a profile of any first NF nodes of the plurality of first NF nodes or the first subscription request may be a request for the NRF node 60 to notify the network node 20 of updates to the priority information assigned to any first NF nodes of the plurality of first NF nodes. In some embodiments, the first subscription request may be separate from a second subscription request and the second subscription request may be a request for the NRF node 60 to notify the network node of updates to a profile of any first NF nodes of the plurality of first NF nodes.

In some embodiments, the first message may be a discovery request and the discovery request can be a request for information indicative of the plurality of first NF nodes for providing the service.

In other embodiments, the first message may be a subscription request and the subscription request may be a request for the NRF node 60 to notify the network node 20 of updates to a profile of any first NF nodes of the plurality of first NF nodes.

In other embodiments, the first message may be a first subscription request and the first subscription request may be a request for the NRF node 60 to notify the network node 20 of updates to the priority information assigned to any first NF nodes of the plurality of first NF nodes. In some embodiments, the first subscription request may comprise information indicative of the plurality of first NF nodes for providing the service. In some embodiments, the first subscription request may be separate from a second subscription request and the second subscription request may be a request for the NRF node 60 to notify the network node 20 of updates to a profile of any first NF nodes of the plurality of first NF nodes.

In some embodiments, the method may comprise storing any or more of the priority information, the information indicative of the plurality of criteria and the order of importance of the plurality of criteria, and information indicative of the plurality of first NF nodes for providing the service.

In other embodiments, the first message may comprise an identifier and the identifier may be the information indicative of the plurality of criteria and the order of importance of the plurality of criteria. In some embodiments, the identifier may be a uniform resource identifier (URI). In some embodiments, the information indicative of the plurality of criteria and the order of importance of the plurality of criteria may be an identity of a resource of the NRF node 60 at which the information indicative of the plurality of criteria and the order of importance of the plurality of criteria is stored.

In some embodiments, the method may comprise initiating transmission of a third message comprising the identifier towards the network node 20. In some embodiments, the third message may be a discovery response and the discovery response may comprise information indicative of the plurality of first NF nodes for providing the service and information indicative that the priority information has been assigned to the plurality of first NF nodes.

In some embodiments, the method may comprise receiving a discovery request from the network node 20, where the discovery request can be a request for information indicative of the plurality of first NF nodes for providing the service and the discovery request may comprise information indicative that the network node 20 is to be subscribed to updates to the priority information assigned to any first NF nodes of the plurality of first NF nodes.

In some embodiments, the method may comprise storing, in a memory of the NRF node 60, any one or more of the information indicative of the plurality of first NF nodes for providing the service and the information indicative of the plurality of criteria and the order of importance of the plurality of criteria.

In some embodiments, assigning the priority information to the plurality of first NF nodes may comprise modifying priority information previously assigned to the plurality of first NF nodes. In some embodiments, the priority information may be assigned in response to an update to a profile of one or more first NF nodes of the plurality of first NF nodes or in response to another trigger.

In some embodiments, the update to the profile may comprise any one or more of an update to one or more attributes in the profile, wherein the assigned priority information is based on the one or more attributes and an update to priority information in the profile, wherein the assigned priority information is based on the priority information in the profile.

In some embodiments, the method may comprise receiving a (new) discovery request from the network node 20. The (new) discovery request can be a request for information indicative of an alternative plurality of first NF nodes for providing the service and may comprise the information indicative of the plurality of criteria and the order of importance of the plurality of criteria. The (new) discovery request can be similar to an earlier discovery request. Thus, it may start the earlier described process again.

Returning back to FIG. 5, alternatively or in addition to receiving the first message, as illustrated at block 604 of FIG. 5, transmission of a fifth message is initiated towards a network node 20. Herein, the term "initiate" can mean, for example, cause or establish. Thus, the processing circuitry 62 of the NRF node 60 can be configured to itself transmit the fifth message (e.g. via a communications interface 66 of the NRF node 60) or can be configured to cause another node to transmit the fifth message. The fifth message comprises priority information assigned to the plurality of first NF nodes. For each first NF node of the plurality of first NF nodes, the priority information assigned to the first NF node is indicative of a priority with which the first NF node is to be selected relative to at least one other first NF node of the plurality of first NF nodes. The first NF node is to be selected to provide (e.g. execute or run) a service. The priority information is assigned to the first NF node based on one or more criteria of the plurality of criteria that the first NF node meets and the position of the one or more criteria in the order of importance of the plurality of criteria.

In some embodiments, the fifth message may be a discovery response and the discovery response may comprise information indicative of the plurality of first NF nodes for providing the service and information indicative that the priority information has been assigned to the plurality of first NF nodes.

In other embodiments, the fifth message may be a subscription response and the subscription response may comprise information indicative of an update to a profile of one or more first NF nodes of the plurality of first NF nodes.

In other embodiments, the fifth message may be a first subscription response and the first subscription response may comprise information indicative of an update to the priority information assigned to one or more first NF nodes of the plurality of first NF nodes. In some embodiments, the first subscription response may be separate from a second subscription response and the second subscription response may comprise information indicative of an update to a profile of one or more first NF nodes of the plurality of first NF nodes.

In some embodiments, the method may comprise initiating transmission of a fourth message towards the network node 20. The fourth message can comprise information indicative that the network node 20 is to initiate transmission of a (new) discovery request towards the NRF node 60. The (new) discovery request can be a request for information indicative of an alternative plurality of first NF nodes for providing the service. The (new) discovery request can be similar to an earlier discovery request. Thus, it may start the earlier described process again.

In some embodiments, the plurality of criteria referred to herein may comprise any one or more of a criterion indicative that first NF nodes located at a predefined location are preferred (e.g. "preferred-locality" as defined in Table 6.2.3.2.3.1-1 of 3GPP TS 29.510 V17.2.0), a criterion indicative that first NF nodes serving a predefined tracking area identity (TAI) are preferred (e.g. "preferred-tai" as defined in Table 6.2.3.2.3.1-1 of 3GPP TS 29.510 V17.2.0), a criterion indicative that a predefined instance of first NF nodes are preferred (e.g. "preferred-nf-instances" as defined in Table 6.2.3.2.3.1-1 of 3GPP TS 29.510 V17.2.0), a criterion indicative that first NF nodes supporting a predefined application programming interface (API) version of the service are preferred (e.g. "preferred-api-versions" as defined in Table 6.2.3.2.3.1-1 of 3GPP TS 29.510 V17.2.0), a criterion indicative that first NF nodes serving a full public land mobile network (PLMN) are preferred (e.g. "preferred-full-plmn" as defined in Table 6.2.3.2.3.1-1 of 3GPP TS 29.510 V17.2.0), a criterion indicative that first NF nodes supporting one or more predefined vendor specific features for the service are preferred (e.g. "preferred-vendor-specific-features" as defined in Table 6.2.3.2.3.1-1 of 3GPP TS 29.510 V17.2.0), and a criterion indicative that first NF nodes supporting one or more predefined vendor specific features for the first NF nodes are preferred (e.g. "preferred-vendor-specific-nf-features" as defined in Table 6.2.3.2.3.1-1 of 3GPP TS 29.510 V17.2.0). The plurality of criteria referred to herein may comprise any one or more of a criterion that are preferred by the first NF node, rather than a strict requirement. The plurality of criteria may also be referred to herein as a plurality of (preferred) parameters or a plurality of (preferred) query parameters.

In some embodiments, if multiple preferred parameters are included in a discovery request from the network node 20 to the NRF node 60, the network node 20 may still search into a profile of one or more first NF nodes of the plurality of first NF nodes to select (or reselect) a first NF node from the plurality of first NF nodes to provide the service. In some embodiments, any NF service producer profile updates in the network node 20 may consider the same priority information (e.g. "altered priority") as that returned in the discovery response. In some embodiments, it may be controlled how a change to the priority information for one or more first NF nodes may impact the priority information for other first NF nodes. In some embodiments, a session management function, SMF, node (or any other network node) may use the priority information, such as to identify an active first NF node compared to a first NF node that is in standby. In this situation, it may be that the priority information is not changed by the NRF node 60.

In the manner described herein, a new query parameter is defined that allows the network node 20 to indicate the precedence order among preferred query parameters (when the first message includes more than one preference query parameter for the expected results from the NRF node 60). Based on that, and optionally also other (e.g. internal) criteria, the NRF node 60 can provide results with changed priority information in order to accommodate the preferences of the network node 20 as well as the precedence among them.

In some embodiments, once the discovery results are provided, if the network node 20 may subscribe to get notifications when first NF node profiles are updated, the subscription request from the network node 20 to the NRF node 60 may include the preferences and corresponding node 60 in order to allow the NRF node 60 to update the priority information accordingly. Alternatively, an identifier that identifies the previous discovery results ("search Id") may be included in this subscription request. This identifier can be returned to the network node 20 from the NRF node 60 in a previous discovery response.

In some embodiments, the procedure to change the priority information may take into account that, if a first NF node profile is modified at any time after discovery, then the priority information to be provided (e.g. in the first NF node profile) is to be changed by the NRF node 60 with the same criteria that was considered when all the discovery results are provided. This can ensure consistency among all the returned first NF node profiles. The procedure to modify the priority information used in discovery results can allow the priority information of an individual first NF node profile to be updated without having to update the rest of the first NF node profiles (provided in the same discovery result). In some embodiments, if any criteria that requires modification of the priority information for a first NF node is altered (e.g. as a result of a first NF node attribute that impacts the priority information determination by the NRF node 60, or a configurable event in the NRF node 60), the NRF node 60 may redetermine the affected priority information for the first NF node and optionally also send a notification with the updated priority information (and optionally any other updated attribute, if applicable) to the network node 20. If the modification does not affect the priority information, then it may be that the priority information is not included in the notification and thus the existing priority information at the network node 20 may be kept.

There may be three different variants of the method that can be employed, alone or in combination, according to some embodiments. In a first variant ("Variant A"), an indication that the NRF node 60 has changed priority information may be provided in the discovery response from the NRF node 60 to the network node 20. Instead of including new information in an existing subscription, a new subscription to be notified of a change to priority information may be defined, as well as its corresponding notification. In a second variant ("Variant B"), an identifier (e.g. URI) may be provided in the discovery response from the NRF node 60 to the network node 20. This identifier can allow the network node 20 to subscribe to changes in priority information. It can thus be highlighted that the NRF node 60 has changed priority information (similar to Variant A). Instead of including new information in an existing subscription, a new subscription to be notified of a change to priority information may be defined (to the provided identifier), as well as its corresponding notification. In a third variant ("Variant C"), a new indication that may be included in the discovery response from the NRF node 60 to the network node 20 to indicate that a new discovery request is required. The indication may, for example, indicate that a reorder of first NF nodes is required.

With regard to Variant A and B, an indication of whether the NRF node 60 has changed the priority information can be provided in the discovery results. This has the advantage that the network node 20 may consider whether the results should be cached (e.g. for a limited amount of time) and it allows the network node 20 to have more control over the first NF node selection (or reselection) process. For example, the network node 20 may decide to check locality anyway, or other parameters, when the priority information is not modified, or even when it is modified. With regard to Variant B, there is no need to include the preferences and their precedence used in the discovery request in the subscription request. This helps to decrease overlapping between discovery and NF management services in the NRF node 60. With regard to Variant C, the need for the NRF node 60 to employ a procedure that allows the priority information of one first NF node to be altered independently of the rest of the first NF nodes is avoided. This can support a use case in which an event or modification of attributes in first NF node profile(s) requires a change to previously altered priority information.

The proposed techniques described herein allow the NRF node 60 to change priority information. That is, they allow the NRF node 60 to implement an "altering priority feature". According to some of the proposed techniques described herein, the network node 20 may acquire results from a discovery that are already ordered according to its preferences. In this way, the network node 20 then simply needs to select (or reselect in the case that there has already been a previous selection) a first NF node based on the priority information. This is a simplification for the network node 20 as it avoids the need for the network node 20 to take into account multiple criteria for the selection (or reselection), after parsing first NF node profile contents. The NRF node 60 can be a centralised element that takes care of providing results following the preferences and requirements of the network node 20. In this way, the implementation of that logic is centralised in a single node, while the network node 20 only needs to use the priority information for the selection (or reselection) among provided results. The notifications of modified first NF node profiles may be subject to the same network node 20 preferences and requirements. In this way, the network node 20 can always have a consistent view for the selection among first NF nodes.

There is also provided a method performed by a system. The method comprises the method(s) described herein in respect of the network node 20 and the method(s) described herein in respect of the NRF node 60. There is also provided a system comprising at least one network node 20 as described herein and at least one NRF node 60 as described herein. Some example systems that employ the techniques described herein will now be described with reference to the signalling diagrams of FIGS. 6-11. As will become apparent from this description with reference to FIGS. 6-11, there are various issues with existing techniques that can be addressed using the techniques described herein.

A first issue ("Issue i") is that, if multiple preferred parameters are included in the discovery request, the network node still needs to search into the first NF node profiles in order to select (or reselect) a first NF node to provide a service according to existing the techniques. This first issue can be addressed by the inclusion of network node preferences and their precedence in the discovery request, as illustrated in FIG. 6.

Figure 7:
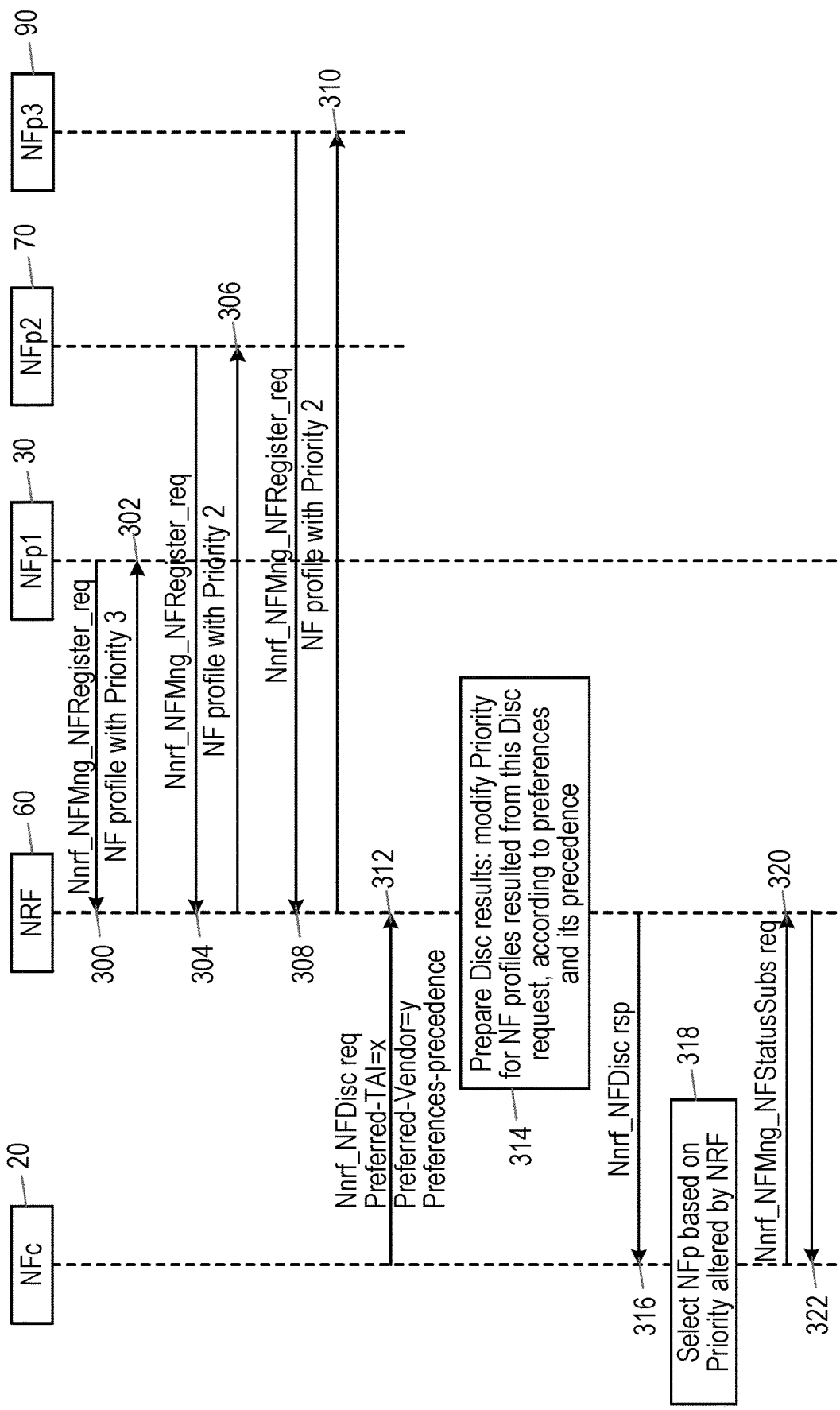
Figure 7:
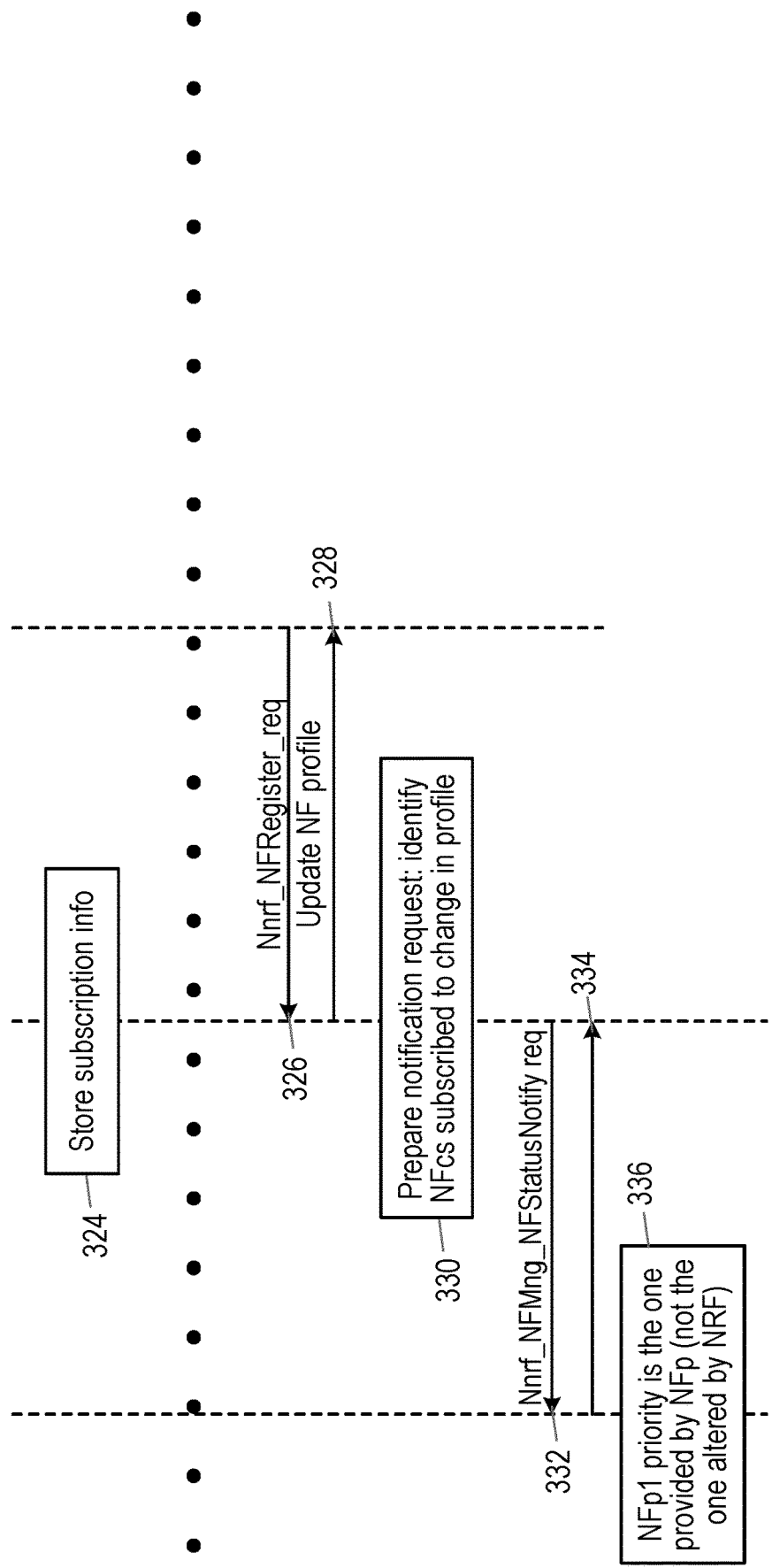
Figure 8:
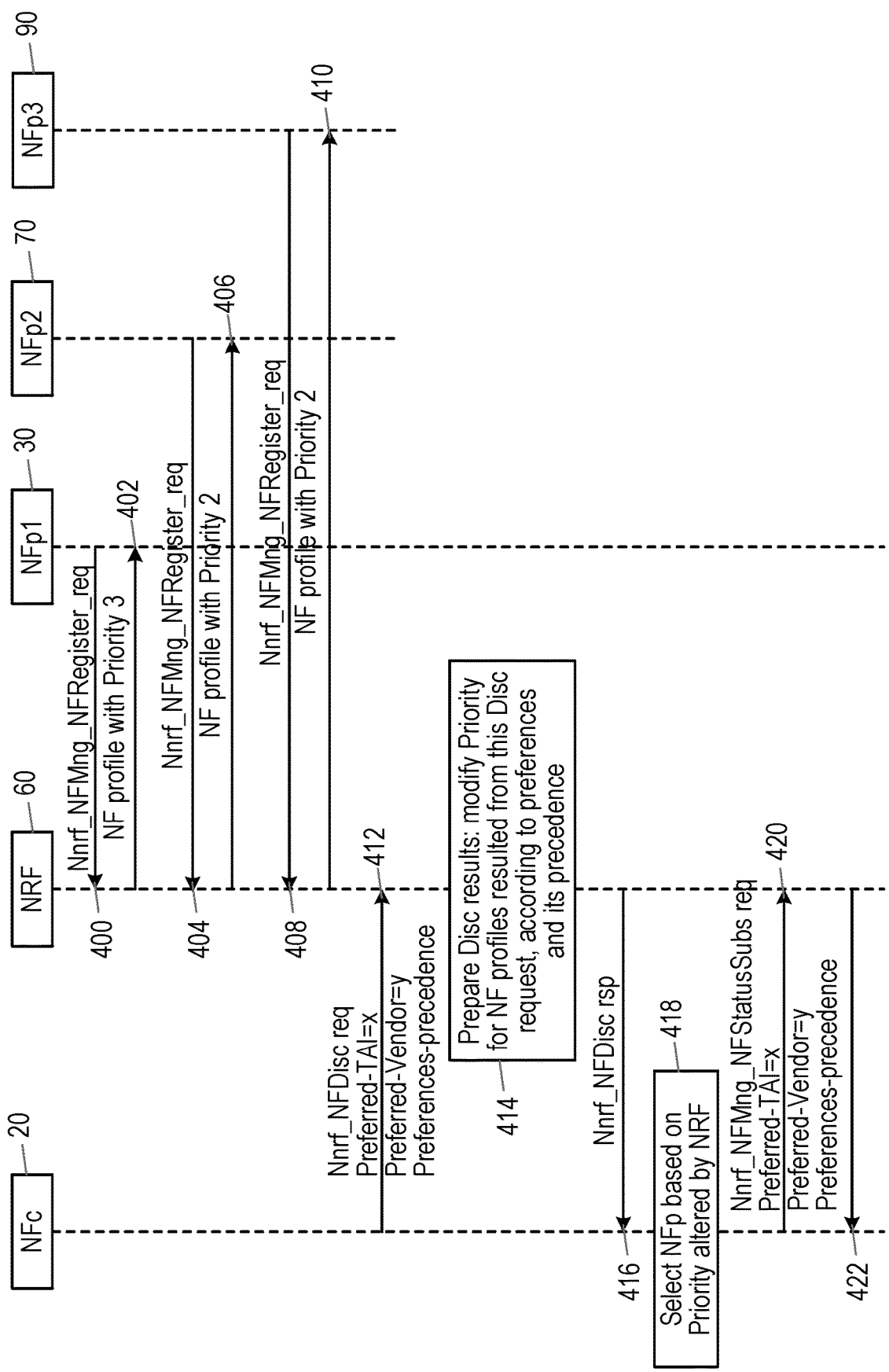
Figure 8:
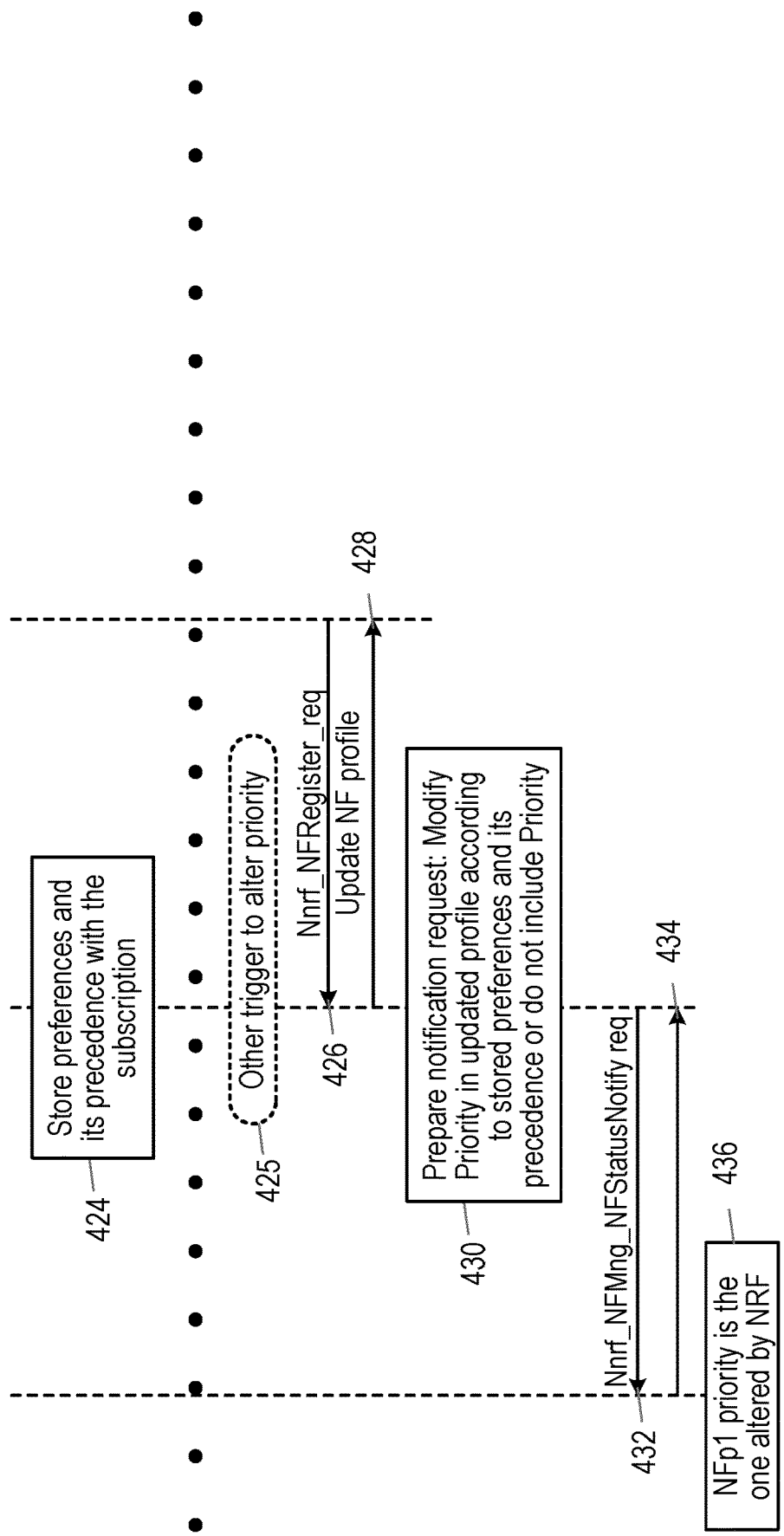
Figure 9:
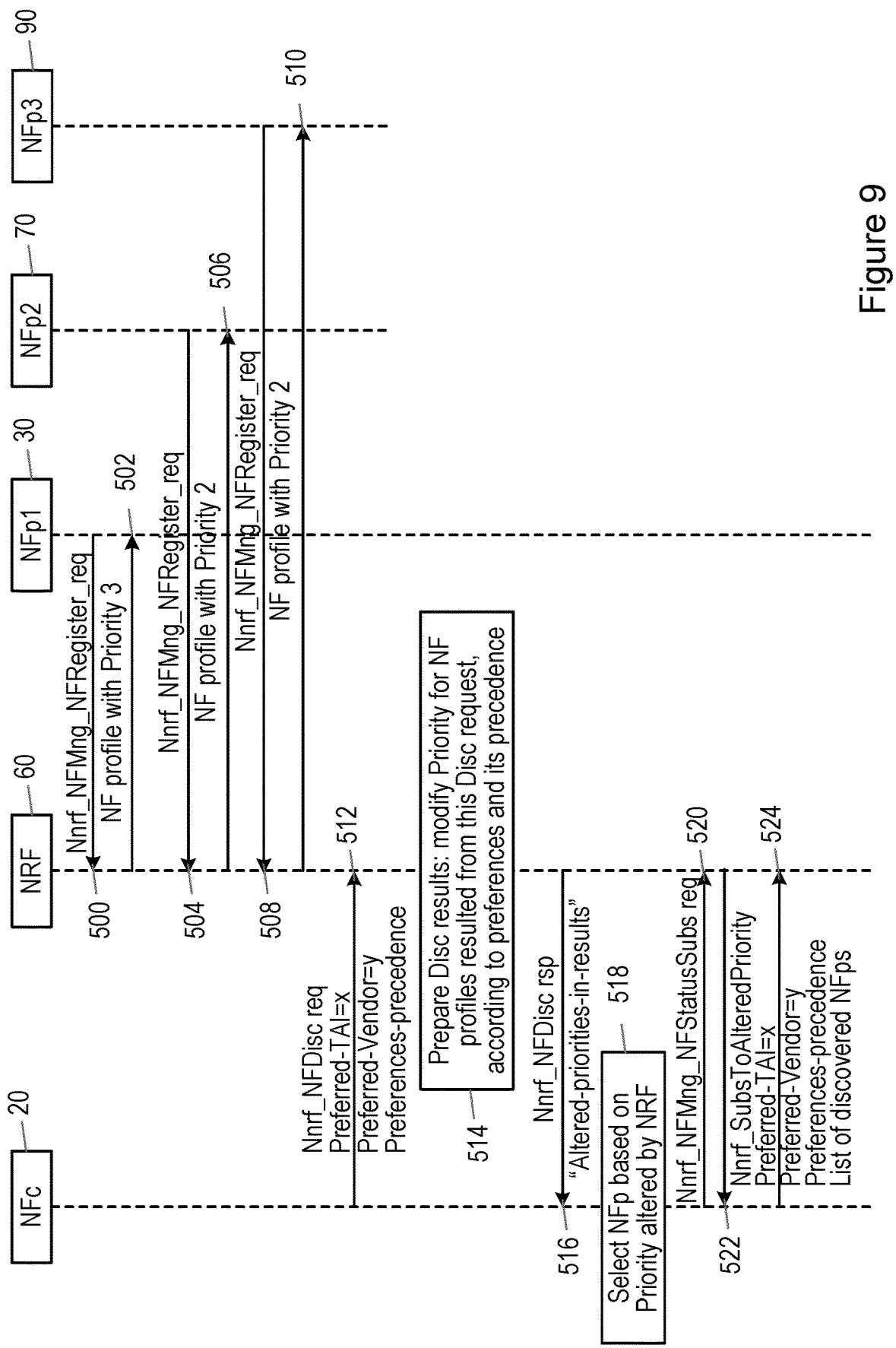
Figure 9:
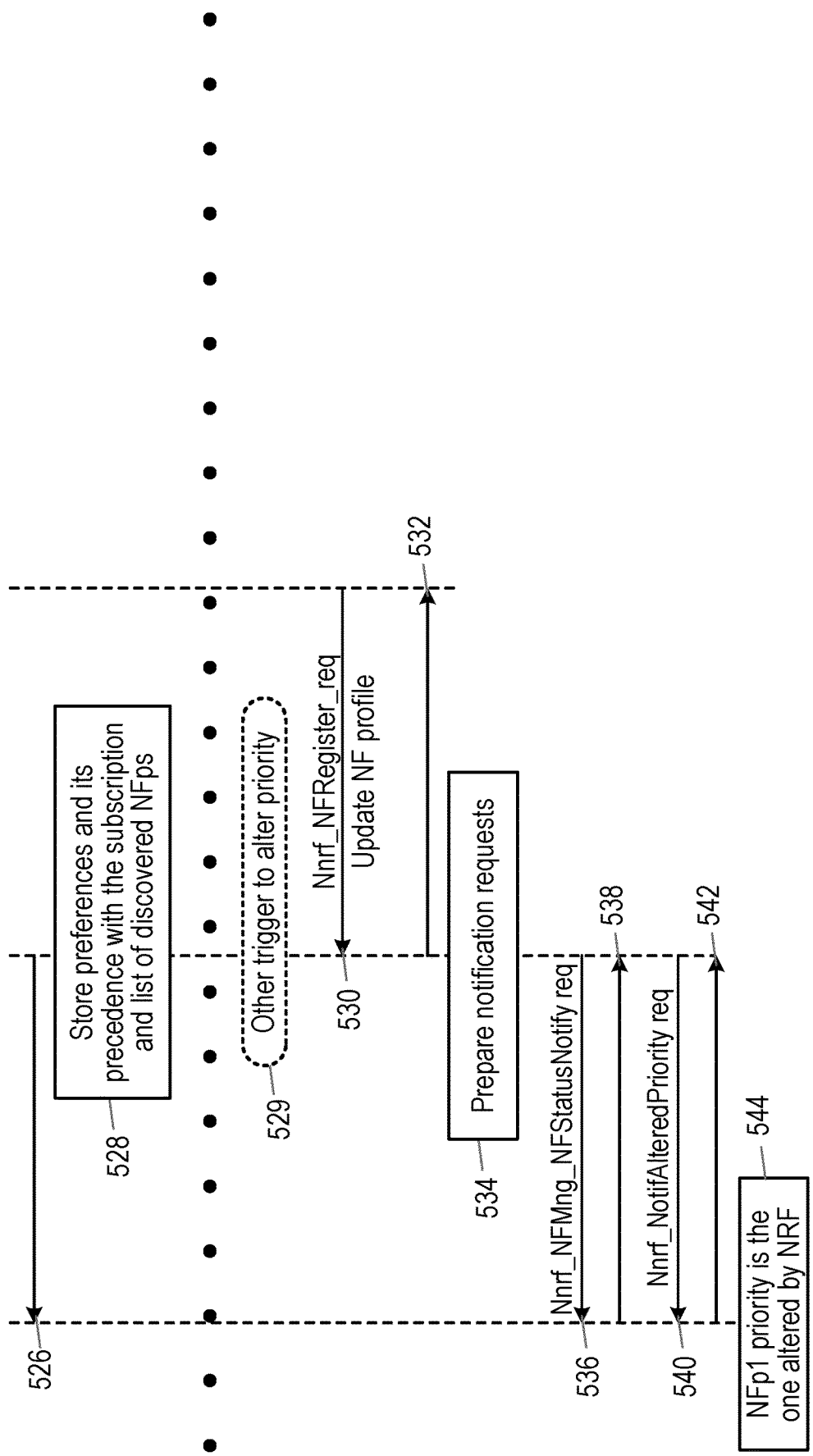
Figure 10:
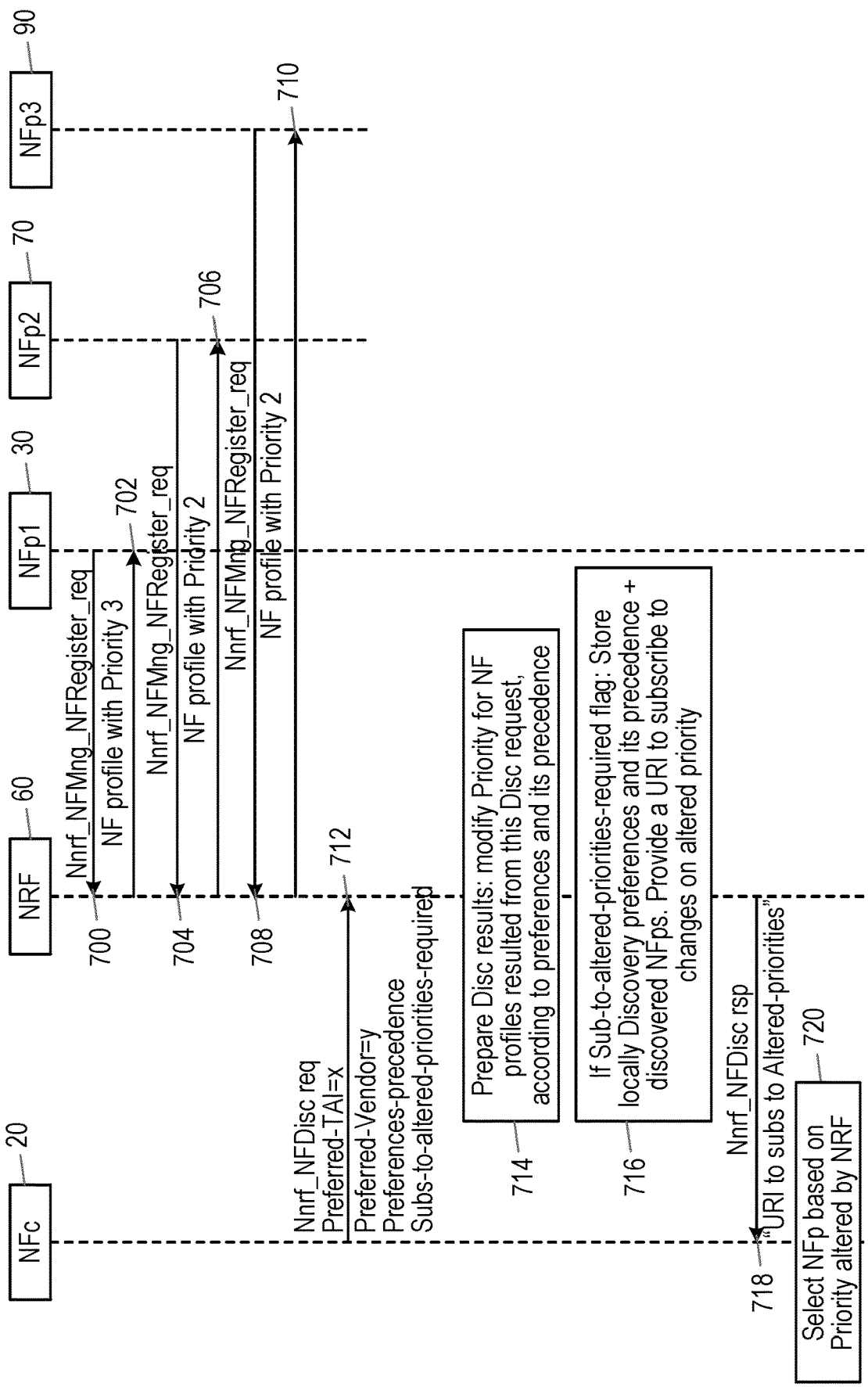
Figure 10:
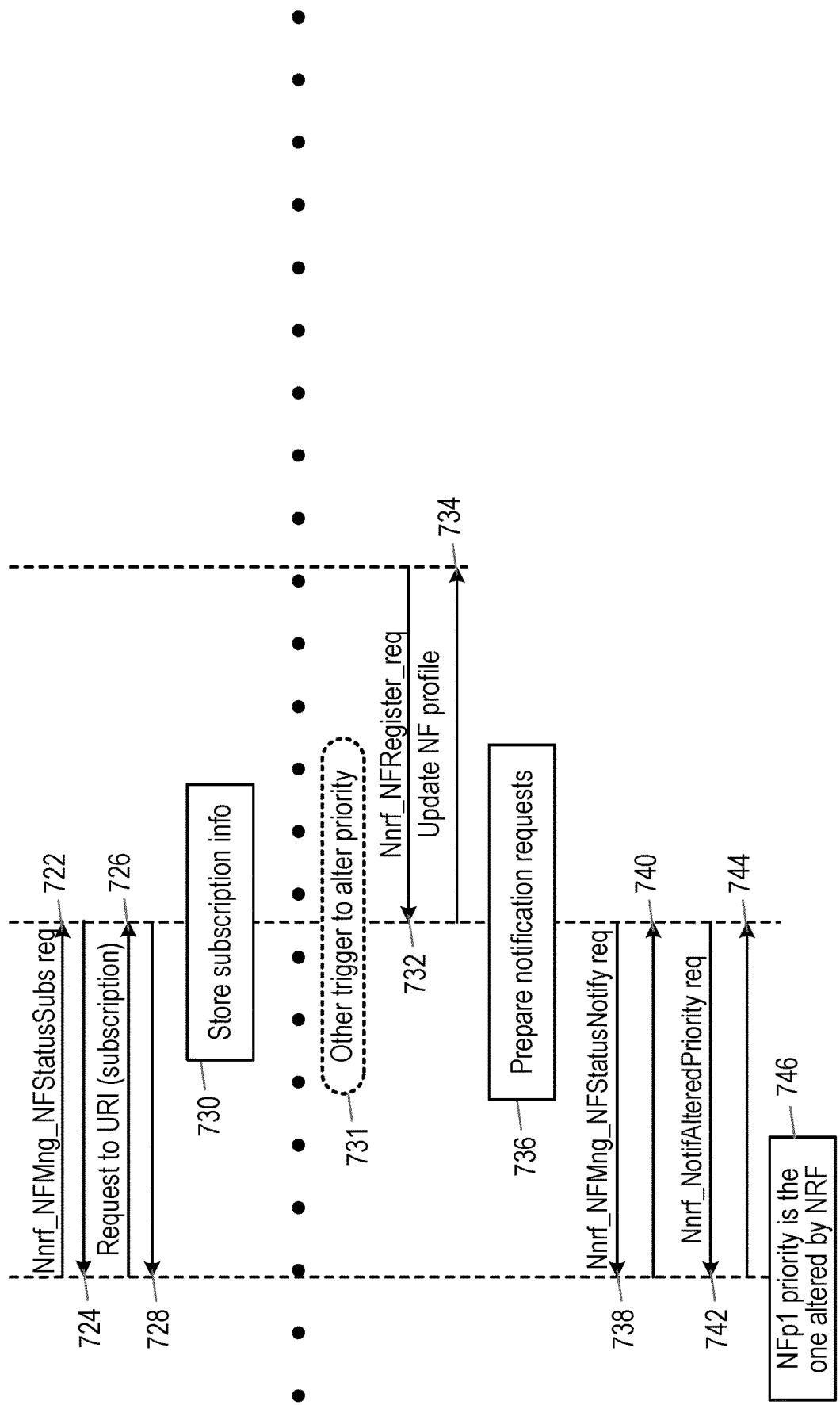

A second issue ("Issue ii"), which is illustrated in FIG. 7, is that the network node 20 considers the subsequently modified priority information in the first NF profile, rather than the priority information originally modified by the NRF node 60 and provided in the discovery response according to the existing techniques. This second issue can be addressed by the inclusion of network node preferences and their precedence in an existing subscription request, as illustrated in FIG. 8. This second issue can alternatively be addressed by the inclusion of network node preferences and their precedence in a new subscription request, as illustrated in FIG. 9. This second issue can alternatively be addressed by storing network node preferences and their precedence in the NRF node 60 and providing an identifier (e.g. URI) to subscribe to that, as illustrated in FIG. 10.

Figure 11:
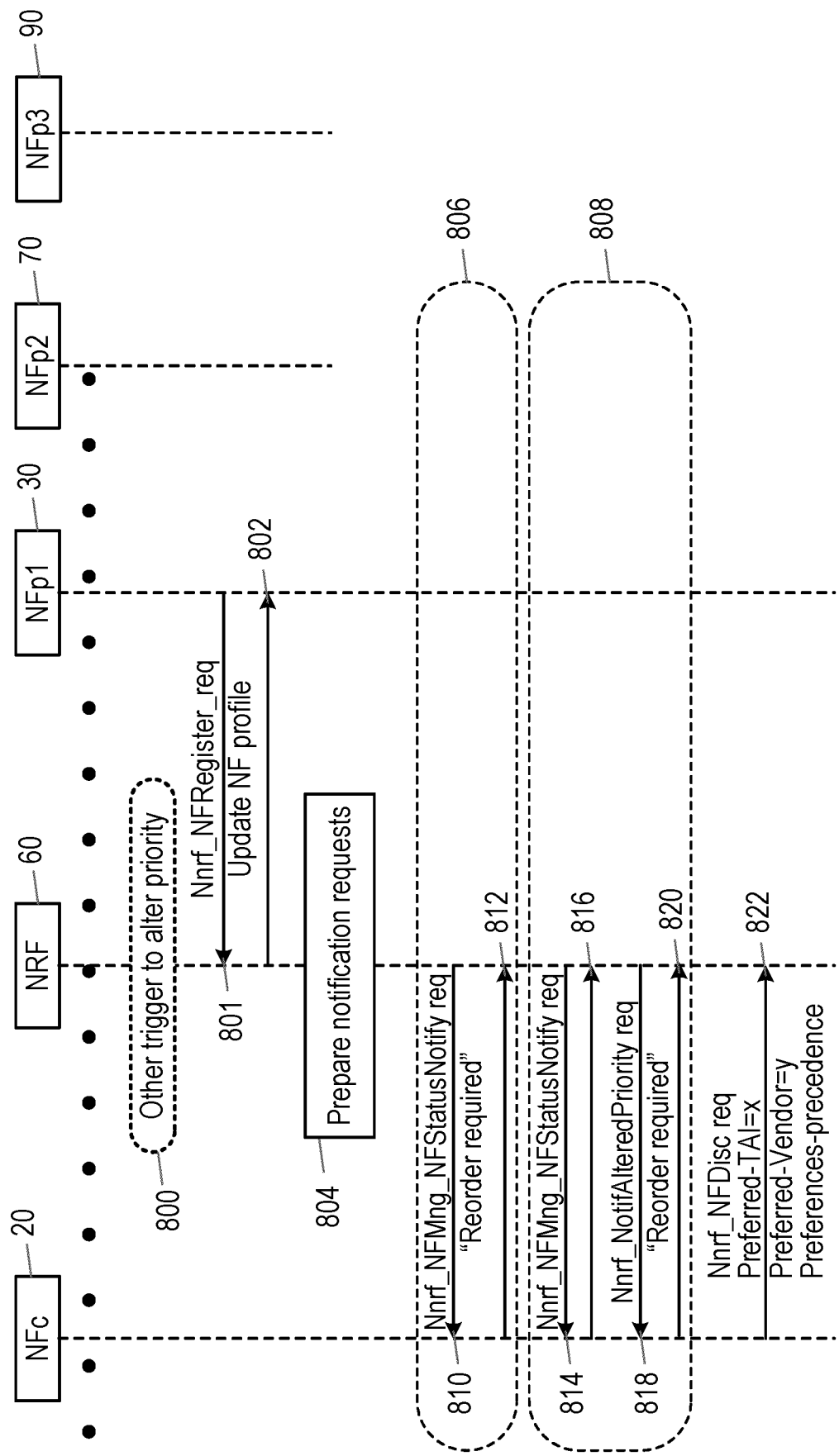

A third issue ("Issue iii") is that there is no control over how modification of the priority of one first NF node profile may impact the altered priority information for other first NF nodes in the existing techniques. This third issue can be addressed by the inclusion of network node preferences and their precedence in a new subscription request, as illustrated in FIG. 9. This third issue can alternatively be addressed by an indication that a new discovery is needed, as illustrated in FIG. 11. This third issue can alternatively be addressed by way of an altered-priority algorithm in the NRF node 60 that determines the priority information for each first NF node independently of others first NF nodes.

Figure 6:
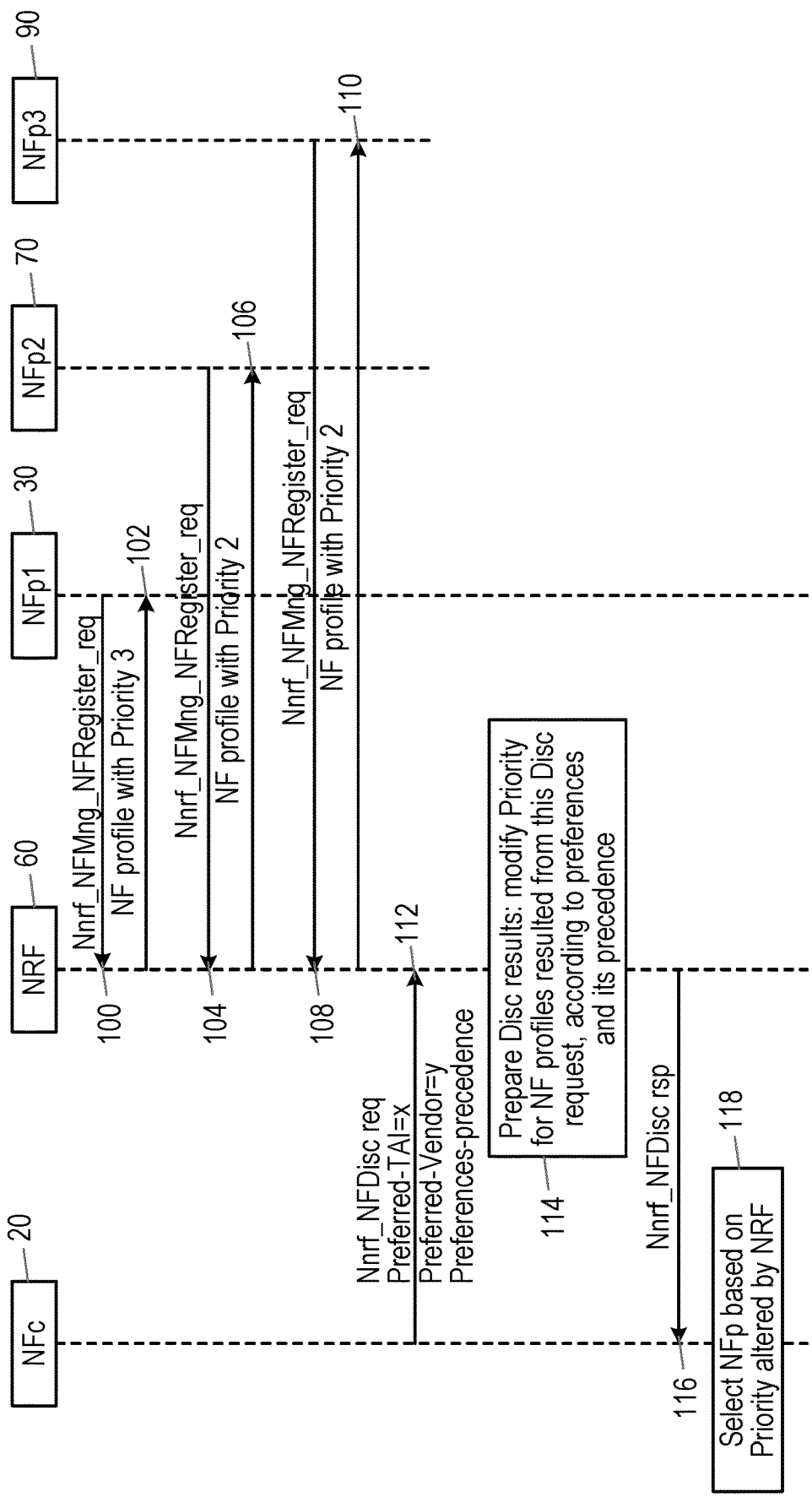
FIGS. 6-11 are signalling diagrams illustrating an exchange of signals in a system according to some embodiments.

FIG. 6 is a signalling diagram illustrating an exchange of signals in a system according to an embodiment. The system illustrated in FIG. 6 comprises a network node 20 and an NRF node 60. The system illustrated in FIG. 6 may optionally also comprise a plurality of first NF nodes 30, 70, 90 of a service producer ("NFp1", "NFp2", "NFp3"). Although three first NF nodes 30, 70, 90 are illustrated, the system illustrated in FIG. 6 can comprise one or more first NF nodes. The plurality of first NF nodes 30, 70, 90 can each be configured to provide a service. The first NF nodes 30, 70, 90 can be part of a set of NF service producer nodes according to some embodiments.

As illustrated in FIG. 6, the network node 20 can be a second NF node of a service consumer ("NFc") according to some embodiments. However, in other embodiments (not illustrated), the network node 20 can be a first SCP node. Thus, the method described herein with respect to the second NF node 20 may instead be performed by the first SCP node. In these embodiments, the first SCP node is configured to operate as an SCP between second NF node 20 and the NRF node 60. Similarly, a second SCP node may be configured to operate as an SCP between the NRF node 60 and any one or more of the first NF nodes 30, 70, 90.

In some embodiments where the system comprises the first SCP node, an entity may comprise the first SCP node and the NRF node 60. That is, in some embodiments, the first SCP node can be merged with the NRF node 60 in a combined entity. In some embodiments where the system comprises the second SCP node, an entity may comprise the second SCP node and the NRF node 60. That is, in some embodiments, the second SCP node can be merged with the NRF node 60 in a combined entity. The system illustrated in FIG. 6 can comprise one or more SCP nodes according to some embodiments.

In some embodiments, the first SCP node and the second NF node 20 may be deployed in independent deployment units, and/or the first SCP node and the NRF node 60 may be deployed in independent deployment units. Thus, an SCP node based on independent deployment units is possible, as described in 3GPP TS 23.501 V16.4.0. In other embodiments, the first SCP node may be deployed as a distributed network element. For example, in some embodiments, part (e.g. a service agent) of the first SCP node may be deployed in the same deployment unit as the second NF node 20, and/or part (e.g. a service agent) of the first SCP node may be deployed in the same deployment unit as the NRF node 60. Thus, an SCP node based on a service mesh is possible, as described in 3GPP TS 23.501 V16.4.0.

In some embodiments, the second SCP node and any one or more of the first NF nodes 30, 70, 90 may be deployed in independent deployment units, and/or the second SCP node and the NRF node 60 may be deployed in independent deployment units. Thus, an SCP node based on independent deployment units is possible, as described in 3GPP TS 23.501 V16.4.0. In other embodiments, the second SCP node may be deployed as a distributed network element. For example, in some embodiments, part (e.g. a service agent) of the second SCP node may be deployed in the same deployment unit as any one or more of the first NF nodes 30, 70, 90 and/or part (e.g. a service agent) of the second SCP node may be deployed in the same deployment unit as the NRF node 60. Thus, an SCP node based on a service mesh is possible, as described in 3GPP TS 23.501 V16.4.0.

In some embodiments, at least one third SCP node may be configured to operate as an SCP between the second NF node 20 and the first SCP node, and/or at least one fourth SCP node may be configured to operate as an SCP between the first SCP node and the NRF node 60. Similarly, in some embodiments, at least one fifth SCP node may be configured to operate as an SCP between the NRF node 60 and the second SCP node, and/or at least one sixth SCP node may be configured to operate as an SCP between the second SCP node and any one or more of the first NF nodes 30, 70, 90. Thus, a multipath of SCP nodes is possible. In some of these embodiments, the first SCP node and one or more of the at least one third SCP node and the at least one fourth SCP node may be deployed in independent deployment units. In some embodiments, the at least one third SCP node and/or the at least one fourth SCP node may be deployed as distributed network elements. In some embodiments, the second SCP node and one or more of the at least one fifth SCP node and the at least one sixth SCP node may be deployed in independent deployment units. In some embodiments, the at least one fifth SCP node and/or the at least one sixth SCP node may be deployed as distributed network elements.

With reference to FIG. 6, registration of a plurality of first NF nodes 30, 70, 90 in the NRF node 60 is performed, with certain priority information, as determined by the respective first NF nodes of the plurality of first NF nodes 30, 70, 90. In more detail, as illustrated by arrows 100, 104, and 108 of FIG. 6, each first NF node of the plurality of NF nodes 30, 70, 90 initiates transmission of a register request ("Nnrf_NFMng_NFRegister_req") towards the NRF node 60. The register requests 100, 104, 108 may be transmitted directly from the respective first NF nodes 30, 70, 90 to the NRF node 60 (as illustrated in FIG. 6) or indirectly from respective first NF nodes 30, 70, 90 to the NRF node 60, e.g. via the second SCP node. The NRF node 60 receives the register requests 100, 104, 108. Each register request 100, 104, 108 is a request for the NRF node 60 to register the respective first NF node 30, 70, 90. For example, each register request 100, 104, 108 can be a request for the NRF node 60 to register the respective first NF node 30, 70, 90 as an NF node of a service producer that is capable of providing a service.

As illustrated in FIG. 6, each register request 100, 104, 108 can comprise a profile of the respective first NF node 30, 70, 90. The profile of each first NF node 30, 70, 90 can comprise priority information for the respective first NF node 30. In the embodiment illustrated in FIG. 6, the priority information for the first NF node 30 is a priority value of "3", the priority information for the first NF node 70 is a priority value of "2", and the priority information for the first NF node 90 is a priority value of "2". The priority information is for use by the network node (e.g. second NF node) 20 in selecting an NF node of a service producer to provide a service requested by the second NF node. The priority information is indicative of a priority with which the first NF node 30 is to be selected relative to at least one other first NF node 70, 90. As illustrated by arrows 102, 106, 110, the NRF node 60 transmits a response to each register request 100, 104, 108 towards the respective first NF node 30, 70, 90.

For the purpose of the embodiment illustrated in FIG. 6, the following data is considered to be present in the first NF profiles:

NFp1: taiList or taiRangeList includes TAI-x, and supported-features includes "y";
NFp2: taiList or taiRangeList includes TAI-x, and supported-features includes "x"; and
NFp3: taiList or taiRangeList includes TAI-y, and supported-features includes "y".

As illustrated by arrow 112 of FIG. 6, the second NF node 20 transmits a message towards the NRF node 60 (e.g. directly or indirectly such as via the first SCP node) and the NRF node 60 receives the message. This message is referred to herein as the "first message". In the embodiment illustrated in FIG. 6, the first message 112 is a discovery request, which is a request for information indicative of the plurality of first NF nodes 30, 70, 90 for providing a service requested by the second NF node 20. The first message 112 comprises information indicative of a plurality of criteria and an order of importance of the plurality of criteria. The information is for use in assigning priority information to the plurality of first NF nodes 30, 70, 90. This information may comprise a new query parameter, which may be referred to as "preferences-precedence". In the embodiment illustrated in FIG. 6, the plurality of criteria comprises "preferred-tai=TAI-x" and "preferred-vendor-specific-nf-features=y" and the order of importance of the plurality of criteria is "preferred-tai, preferred-vendor-specific-nf-features". The first criterion in the list takes precedence over the second criterion in the list (and, similarly, the second criterion in the list takes precedence over the third criterion in the list, the third criterion in the list take precedence over the fourth criterion in the list, and so on). Thus, the order of importance provided indicates that "preferred-tai=TAI-x" takes precedence over "preferred-vendor-specific-nf-features".

As illustrated by block 114 of FIG. 6, the NRF node 60 prepares discovery results derived from the discovery request 112. More specifically, the NRF node 60 assigns (e.g. modified) priority information to the plurality of first NF nodes 30, 70, 90. The plurality of first NF nodes 30, 70, 90 can be analysed according to the plurality of criteria and their order of importance (i.e. the preferences and their precedence) in order to assign (e.g. modified) priority information accordingly. The method to assign (e.g. modified) priority information may allow that, if one single first NF profile is updated, then the NRF node 60 knows which priority information (according to the preferences and their precedence) is to be set. In some embodiments, some other criteria aside from those indicated as query parameters may be used as well.

As illustrated by arrow 116 of FIG. 6, the NRF node 60 transmits a message towards the second NF node 20 (e.g. directly or indirectly such as via the first SCP node) and the second NF node 20 receives the message. This message is referred to herein as the "fifth message". The fifth message 116 comprises priority information assigned to the plurality of first NF nodes 30, 70, 90. For example, the respective NF profiles of the plurality of first NF nodes 30, 70, 90 comprising the priority information assigned by the NRF node 60 may be returned. For each first NF node 30 of the plurality of first NF nodes 30, 70, 90, the priority information assigned to the first NF node 30 is indicative of a priority with which the first NF node 30 is to be selected to provide a service relative to at least one other first NF node 70, 90 of the plurality of first NF nodes 30, 70, 90 and the priority information is assigned to the first NF node 30 based on one or more criteria of the plurality of criteria that the first NF node 30 meets and the position of the one or more criteria in the order of importance of the plurality of criteria.

As illustrated by block 118 of FIG. 6, the second NF node 20 selects a first NF node from the plurality of first NF nodes 30, 70, 90 to provide the service. This selection is based on the priority information assigned by the NRF node 60, e.g. based only on this priority information or based on this priority information in addition to one or more other criteria. In the embodiment illustrated in FIG. 6, the first NF node 30 that has the highest priority is selected. The first NF node 30 has the highest priority since it has the "preferred-tai=TAI-x", which is the most important criteria to meet, and it also has the "preferred-vendor-specific-nf-features=y", which is the next most important criteria to meet. On the other hand, the first NF node 70 also has the "preferred-tai=TAI-x" but does not have the "preferred-vendor-specific-nf-features=y" and the first NF node 90 has the "preferred-vendor-specific-nf-features=y" but not the more important "preferred-tai=TAI-x". The selection of a first NF node 30 is improved due to the advantageous manner in which the priority information is assigned by the NRF node 60.

FIG. 7 is a signalling diagram illustrating an exchange of signals according to an embodiment. The system illustrated in FIG. 7 comprises a network node 20 and an NRF node 60. The system illustrated in FIG. 7 may optionally also comprise a plurality of first NF nodes 30, 70, 90 of a service producer ("NFp1", "NFp2", "NFp3"). Although three first NF nodes 30, 70, 90 are illustrated, the system illustrated in FIG. 7 can comprise one or more first NF nodes. The plurality of first NF nodes 30, 70, 90 can each be configured to provide a service. The first NF nodes 30, 70, 90 can be part of a set of NF service producer nodes according to some embodiments.

As illustrated in FIG. 7, the network node 20 can be a second NF node of a service consumer ("NFc") according to some embodiments. However, in other embodiments (not illustrated), the network node 20 can be a first SCP node. Thus, the method described herein with respect to the second NF node 20 may instead be performed by the first SCP node. In these embodiments, the first SCP node is configured to operate as an SCP between second NF node 20 and the NRF node 60. Similarly, a second SCP node may be configured to operate as an SCP between the NRF node 60 and any one or more of the first NF nodes 30, 70, 90.

In some embodiments where the system comprises the first SCP node, an entity may comprise the first SCP node and the NRF node 60. That is, in some embodiments, the first SCP node can be merged with the NRF node 60 in a combined entity. In some embodiments where the system comprises the second SCP node, an entity may comprise the second SCP node and the NRF node 60. That is, in some embodiments, the second SCP node can be merged with the NRF node 60 in a combined entity. The system illustrated in FIG. 7 can comprise one or more SCP nodes according to some embodiments.

In some embodiments, the first SCP node and the second NF node 20 may be deployed in independent deployment units, and/or the first SCP node and the NRF node 60 may be deployed in independent deployment units. Thus, an SCP node based on independent deployment units is possible, as described in 3GPP TS 23.501 V16.4.0. In other embodiments, the first SCP node may be deployed as a distributed network element. For example, in some embodiments, part (e.g. a service agent) of the first SCP node may be deployed in the same deployment unit as the second NF node 20, and/or part (e.g. a service agent) of the first SCP node may be deployed in the same deployment unit as the NRF node 60. Thus, an SCP node based on a service mesh is possible, as described in 3GPP TS 23.501 V16.4.0.

In some embodiments, the second SCP node and any one or more of the first NF nodes 30, 70, 90 may be deployed in independent deployment units, and/or the second SCP node and the NRF node 60 may be deployed in independent deployment units. Thus, an SCP node based on independent deployment units is possible, as described in 3GPP TS 23.501 V16.4.0. In other embodiments, the second SCP node may be deployed as a distributed network element. For example, in some embodiments, part (e.g. a service agent) of the second SCP node may be deployed in the same deployment unit as any one or more of the first NF nodes 30, 70, 90 and/or part (e.g. a service agent) of the second SCP node may be deployed in the same deployment unit as the NRF node 60. Thus, an SCP node based on a service mesh is possible, as described in 3GPP TS 23.501 V16.4.0.

In some embodiments, at least one third SCP node may be configured to operate as an SCP between the second NF node 20 and the first SCP node, and/or at least one fourth SCP node may be configured to operate as an SCP between the first SCP node and the NRF node 60. Similarly, in some embodiments, at least one fifth SCP node may be configured to operate as an SCP between the NRF node 60 and the second SCP node, and/or at least one sixth SCP node may be configured to operate as an SCP between the second SCP node and any one or more of the first NF nodes 30, 70, 90. Thus, a multipath of SCP nodes is possible. In some of these embodiments, the first SCP node and one or more of the at least one third SCP node and the at least one fourth SCP node may be deployed in independent deployment units. In some embodiments, the at least one third SCP node and/or the at least one fourth SCP node may be deployed as distributed network elements. In some embodiments, the second SCP node and one or more of the at least one fifth SCP node and the at least one sixth SCP node may be deployed in independent deployment units. In some embodiments, the at least one fifth SCP node and/or the at least one sixth SCP node may be deployed as distributed network elements.

At steps 300 to 318 of FIG. 7, the method described earlier with respect to steps 100 to 118 of FIG. 6 respectively is performed.

As illustrated by arrow 320 of FIG. 7, the second NF node 20 transmits a subscription request towards the NRF node 60 (e.g. directly or indirectly such as via the first SCP node) and the NRF node 60 receives the subscription request. The subscription request 320 is a request for the NRF node 60 to notify the second NF node 20 of updates to a profile of any first NF nodes 30 of the plurality of first NF nodes 30, 70, 90. As illustrated by arrow 322 of FIG. 7, the NRF node 60 transmits a response to the subscription request towards the second NF node 20 (e.g. directly or indirectly such as via the first SCP node) and the second NF node 20 receives the response. As illustrated at block 324 of FIG. 7, the NRF node 60 stores subscription information.

There is an update to a profile of a first NF node 30, e.g. an update to an attribute in the profile. As illustrated by arrow 326 of FIG. 7, the first NF node 30 transmits a registration request towards the NRF node 60 and the NRF node 60 receives the registration request 326. The registration request 326 comprises the updated profile for the first NF node 30 and requests that it is registered. The first NF node 30 provides priority information in the profile. As illustrated by arrow 328 of FIG. 7, the NRF node 60 transmits a response to the registration request 326 towards the first NF node 30 and the first NF node 30 receives the response 328.

As illustrated by block 330 of FIG. 7, the NRF node 60 prepares a notification request and identifies any second NF node subscribed to updates to a profile of any first NF nodes 30 of the plurality of first NF nodes 30, 70, 90. As illustrated by arrow 332 of FIG. 7, the NRF node 60 transmits the notification request towards the second NF node 20 (e.g. directly or indirectly such as via the first SCP node) and the second NF node 20 receives the notification request. As illustrated by arrow 334 of FIG. 7, the second NF node 20 transmits a response to the notification request towards the NRF node 60 (e.g. directly or indirectly such as via the first SCP node) and the NRF node 60 receives the response. The notification request comprises the updated profile of the first NF node 30 with the priority information provided by the first NF node 30.

Thus, as illustrated by block 336 of FIG. 7, if the first NF node 30 modifies any attribute in its profile and the second NF node is subscribed to receive notification of any profile modification, the second NF node receives the priority information provided by the first NF node 30 and not the (modified) priority information assigned by the NRF node 60 at block 314 of FIG. 7. As such, the priority information assigned by the NRF node 60 is lost and the selection based on this priority information is spoilt. Therefore, although the initial selection of a first NF node at block 318 is improved by the inclusion of the new information in the discovery request 312, the method may be further improved for any subsequent first NF node selection.

FIG. 8 is a signalling diagram illustrating an exchange of signals in a system according to an embodiment. The system illustrated in FIG. 8 comprises a network node 20 and an NRF node 60. The system illustrated in FIG. 8 may optionally also comprise a plurality of first NF nodes 30, 70, 90 of a service producer ("NFp1", "NFp2", "NFp3"). Although three first NF nodes 30, 70, 90 are illustrated, the system illustrated in FIG. 8 can comprise one or more first NF nodes. The plurality of first NF nodes 30, 70, 90 can each be configured to provide a service. The first NF nodes 30, 70, 90 can be part of a set of NF service producer nodes according to some embodiments.

As illustrated in FIG. 8, the network node 20 can be a second NF node of a service consumer ("NFc") according to some embodiments. However, in other embodiments (not illustrated), the network node 20 can be a first SCP node. Thus, the method described herein with respect to the second NF node 20 may instead be performed by the first SCP node. In these embodiments, the first SCP node is configured to operate as an SCP between the second NF node 20 and the NRF node 60. Similarly, a second SCP node may be configured to operate as an SCP between the NRF node 60 and any one or more of the first NF nodes 30, 70, 90.

In some embodiments where the system comprises the first SCP node, an entity may comprise the first SCP node and the NRF node 60. That is, in some embodiments, the first SCP node can be merged with the NRF node 60 in a combined entity. In some embodiments where the system comprises the second SCP node, an entity may comprise the second SCP node and the NRF node 60. That is, in some embodiments, the second SCP node can be merged with the NRF node 60 in a combined entity. The system illustrated in FIG. 8 can comprise one or more SCP nodes according to some embodiments.

In some embodiments, the first SCP node and the second NF node 20 may be deployed in independent deployment units, and/or the first SCP node and the NRF node 60 may be deployed in independent deployment units. Thus, an SCP node based on independent deployment units is possible, as described in 3GPP TS 23.501 V16.4.0. In other embodiments, the first SCP node may be deployed as a distributed network element. For example, in some embodiments, part (e.g. a service agent) of the first SCP node may be deployed in the same deployment unit as the second NF node 20, and/or part (e.g. a service agent) of the first SCP node may be deployed in the same deployment unit as the NRF node 60. Thus, an SCP node based on a service mesh is possible, as described in 3GPP TS 23.501 V16.4.0.

In some embodiments, the second SCP node and any one or more of the first NF nodes 30, 70, 90 may be deployed in independent deployment units, and/or the second SCP node and the NRF node 60 may be deployed in independent deployment units. Thus, an SCP node based on independent deployment units is possible, as described in 3GPP TS 23.501 V16.4.0. In other embodiments, the second SCP node may be deployed as a distributed network element. For example, in some embodiments, part (e.g. a service agent) of the second SCP node may be deployed in the same deployment unit as any one or more of the first NF nodes 30, 70, 90 and/or part (e.g. a service agent) of the second SCP node may be deployed in the same deployment unit as the NRF node 60. Thus, an SCP node based on a service mesh is possible, as described in 3GPP TS 23.501 V16.4.0.

In some embodiments, at least one third SCP node may be configured to operate as an SCP between the second NF node 20 and the first SCP node, and/or at least one fourth SCP node may be configured to operate as an SCP between the first SCP node and the NRF node 60. Similarly, in some embodiments, at least one fifth SCP node may be configured to operate as an SCP between the NRF node 60 and the second SCP node, and/or at least one sixth SCP node may be configured to operate as an SCP between the second SCP node and any one or more of the first NF nodes 30, 70, 90. Thus, a multipath of SCP nodes is possible. In some of these embodiments, the first SCP node and one or more of the at least one third SCP node and the at least one fourth SCP node may be deployed in independent deployment units. In some embodiments, the at least one third SCP node and/or the at least one fourth SCP node may be deployed as distributed network elements. In some embodiments, the second SCP node and one or more of the at least one fifth SCP node and the at least one sixth SCP node may be deployed in independent deployment units. In some embodiments, the at least one fifth SCP node and/or the at least one sixth SCP node may be deployed as distributed network elements.

At steps 400 to 418 of FIG. 8, the method described earlier with respect to steps 100 to 118 of FIG. 6 respectively is performed.

As illustrated by arrow 420 of FIG. 8, the second NF node 20 transmits a message towards the NRF node 60 (e.g. directly or indirectly such as via the first SCP node) and the NRF node 60 receives the message. This message 420 is referred to herein as the "second message". The second message 420 comprises the information indicative of the plurality of criteria and the order of importance of the plurality of criteria. This is a new query parameter, which may be referred to as "preferences-precedence". In the embodiment illustrated in FIG. 8, the plurality of criteria comprises "preferred-tai=TAI-x" and "preferred-vendor-specific-nf-features=y" and the order of importance of the plurality of criteria is "preferred-tai, preferred-vendor-specific-nf-features". The first criterion in the list takes precedence over the second criterion in the list (and, similarly, the second criterion in the list takes precedence over the third criterion in the list, the third criterion in the list take precedence over the fourth criterion in the list, and so on). Thus, the order of importance provided indicates that "preferred-tai=TAI-x" takes precedence over "preferred-vendor-specific-nf-features".

The second message 420 is a (existing) subscription request, which is a request for the NRF node 60 to notify the second NF node 20 of updates to a profile of any first NF nodes 30 of the plurality of first NF nodes 30, 70, 90. The subscription request thus includes the same preferences and their precedence as in the discovery request 412. Alternatively, an identifier that identifies the previous discovery results ("search Id") may be included in the subscription request. This identifier can be returned to the second NF node 20 from the NRF node 60 in a previous discovery response. In some embodiments, this step may be executed prior to step 412 of FIG. 4. As illustrated by arrow 422 of FIG. 8, the NRF node 60 transmits a response to the subscription request towards the second NF node 20 (e.g. directly or indirectly such as via the first SCP node) and the second NF node 20 receives the response. Thus, the second NF node 20 subscribes to be notified if profile(s) of the first NF node(s) 30, 70, 90 are modified. As illustrated at block 424 of FIG. 8, the NRF node 60 stores the information indicative of the plurality of criteria and the order of importance of the plurality of criteria, and optionally also any other subscription information. This storage can allow the second NF node 20 to subscribe to using this stored information.

There may be a reason for the NRF node 60 to trigger a redetermination of the priority information of a first NF node 30. For example, the former provided altered priority information may be overwritten by an update of the first NF node profile. In this case, the NRF node 60 may either remove the priority information from the updated profile so that the second NF node 20 knows the former one is valid or the NRF node 60 may redetermine the priority information and provide it again to the second NF node 20. In another example, the former provided altered priority information may need to be modified. This can, for example, occur when any parameter (e.g. priority itself, load, capacity, etc.) in the first NF node profile that is used for determination of priority information is modified. This can also occur when there are other criteria (e.g. configurable in the NRF node 60) that affect the priority information, e.g. a health status of the first NF node that is supervised by the NRF node 60. In this case, the NRF node 60 may need to provide new priority information to the second NF node 20.

In the embodiment illustrated in FIG. 8, as illustrated by block 425, there may be a trigger other than an update to a profile of a first NF node 30 that requires that the NRF node 60 provides altered priority information for the first NF node 30. For example, a health supervision of the first NF node 30 may be indicate that this is required. Alternatively, there may be an update to a profile of a first NF node 30 that means that the priority information of a first NF node 30 needs to be altered. For example, it can be a change to the priority information in the profile or a change to another attribute (e.g. load, capacity, allowed NF types, etc.) in the profile that the NRF node 60 previously used to determine the priority information for the first NF node 30. In this case, as illustrated by arrow 426 of FIG. 8, the first NF node 30 transmits a registration request towards the NRF node 60 and the NRF node 60 receives the registration request 426. The registration request 426 comprises the updated profile for the first NF node 30 and requests that it is registered. The first NF node 30 provides priority information in the profile similar to its first registration (e.g. a priority value of "3"). As illustrated by arrow 428 of FIG. 8, the NRF node 60 transmits a response to the registration request 426 towards the first NF node 30 and the first NF node 30 receives the response 428.

As illustrated by block 430 of FIG. 8, the NRF node 60 assigns priority information to the first NF node 30 according to the stored information indicative of the plurality of criteria and the order of importance of the plurality of criteria. This can result in the priority information in the updated profile received from the first NF node 30 being modified. The NRF node 60 prepares a notification request and identifies any second NF node subscribed to updates to a profile of any first NF nodes 30 of the plurality of first NF nodes 30, 70, 90. If the priority information itself, or other parameters that are used by the NRF node 60 to determine priority information (e.g. load, capacity, etc.) are modified, then the NRF node 60 needs to redetermine the previously altered priority information and include that in the notification request. The NRF node 60 updates the priority information according to stored preferences and their precedence and optionally any extra criteria (similarly as for the discovery result 112). It may be that the same criteria are used to obtain the priority information as the criteria that is used at step 414 of FIG. 8. In an example, if the parameter "AllowedNFtypes" is modified but this does not require modification of the first NF node order for selection (or reselection), then the priority information does not need to be changed. In this case, the NRF node 60 may either not include the priority information in the notification request (so that the second NF node 20 knows the former priority information is valid) or the same priority information may be included in the notification request.

As illustrated by arrow 432 of FIG. 8, the NRF node 60 transmits the notification request towards the second NF node 20 (e.g. directly or indirectly such as via the first SCP node) and the second NF node 20 receives the notification request 432. This notification request 432 is referred to herein as the "fifth message". As illustrated by arrow 434 of FIG. 8, the second NF node 20 transmits a response to the notification request 432 towards the NRF node 60 (e.g. directly or indirectly such as via the first SCP node) and the NRF node 60 receives the response. The notification request 432 comprises the updated profile of the first NF node 30 with the priority information assigned by the NRF node 60 at block 430.

Thus, as illustrated by block 436 of FIG. 8, even if the first NF node 30 modifies any attribute in its profile and the second NF node is subscribed to receive notification of any profile modification, the second NF node receives the priority information assigned by the NRF node 60 at block 430 of FIG. 8. The priority information received for the first NF node 30 at step 416 of FIG. 8 (as assigned by the NRF node 60) can be overwritten by the priority information received for the first NF node 30 at step 432 of FIG. 8 (as also assigned by the NRF node 60). Alternatively, where there is no priority information included in the notification request 432, the former priority information that the second NF node 20 received at step 416 of FIG. 8 (as assigned by the NRF node 60) remains valid.

The selection of a first NF node based on the priority information is therefore improved due to the advantageous manner in which this priority information is assigned by the NRF node 60. If the modified attribute in the profile of the first NF node 30 does not impact the determination of the priority information, then the NRF node 60 may not include priority information in the updated profile, which can be interpreted by the as the second NF node 20 that the priority information has not changed.

FIG. 9 is a signalling diagram illustrating an exchange of signals in a system according to an embodiment. The system illustrated in FIG. 9 comprises a network node 20 and an NRF node 60. The system illustrated in FIG. 9 may optionally also comprise a plurality of first NF nodes 30, 70, 90 of a service producer ("NFp1", "NFp2", "NFp3"). Although three first NF nodes 30, 70, 90 are illustrated, the system illustrated in FIG. 9 can comprise one or more first NF nodes. The plurality of first NF nodes 30, 70, 90 can each be configured to provide a service. The first NF nodes 30, 70, 90 can be part of a set of NF service producer nodes according to some embodiments.

As illustrated in FIG. 9, the network node 20 can be a second NF node of a service consumer ("NFc") according to some embodiments. However, in other embodiments (not illustrated), the network node 20 can be a first SCP node. Thus, the method described herein with respect to the second NF node 20 may instead be performed by the first SCP node. In these embodiments, the first SCP node is configured to operate as an SCP between second NF node 20 and the NRF node 60. Similarly, a second SCP node may be configured to operate as an SCP between the NRF node 60 and any one or more of the first NF nodes 30, 70, 90.

In some embodiments where the system comprises the first SCP node, an entity may comprise the first SCP node and the NRF node 60. That is, in some embodiments, the first SCP node can be merged with the NRF node 60 in a combined entity. In some embodiments where the system comprises the second SCP node, an entity may comprise the second SCP node and the NRF node 60. That is, in some embodiments, the second SCP node can be merged with the NRF node 60 in a combined entity. The system illustrated in FIG. 9 can comprise one or more SCP nodes according to some embodiments.

In some embodiments, the first SCP node and the second NF node 20 may be deployed in independent deployment units, and/or the first SCP node and the NRF node 60 may be deployed in independent deployment units. Thus, an SCP node based on independent deployment units is possible, as described in 3GPP TS 23.501 V16.4.0. In other embodiments, the first SCP node may be deployed as a distributed network element. For example, in some embodiments, part (e.g. a service agent) of the first SCP node may be deployed in the same deployment unit as the second NF node 20, and/or part (e.g. a service agent) of the first SCP node may be deployed in the same deployment unit as the NRF node 60. Thus, an SCP node based on a service mesh is possible, as described in 3GPP TS 23.501 V16.4.0.

In some embodiments, the second SCP node and any one or more of the first NF nodes 30, 70, 90 may be deployed in independent deployment units, and/or the second SCP node and the NRF node 60 may be deployed in independent deployment units. Thus, an SCP node based on independent deployment units is possible, as described in 3GPP TS 23.501 V16.4.0. In other embodiments, the second SCP node may be deployed as a distributed network element. For example, in some embodiments, part (e.g. a service agent) of the second SCP node may be deployed in the same deployment unit as any one or more of the first NF nodes 30, 70, 90 and/or part (e.g. a service agent) of the second SCP node may be deployed in the same deployment unit as the NRF node 60. Thus, an SCP node based on a service mesh is possible, as described in 3GPP TS 23.501 V16.4.0.

In some embodiments, at least one third SCP node may be configured to operate as an SCP between the second NF node 20 and the first SCP node, and/or at least one fourth SCP node may be configured to operate as an SCP between the first SCP node and the NRF node 60. Similarly, in some embodiments, at least one fifth SCP node may be configured to operate as an SCP between the NRF node 60 and the second SCP node, and/or at least one sixth SCP node may be configured to operate as an SCP between the second SCP node and any one or more of the first NF nodes 30, 70, 90. Thus, a multipath of SCP nodes is possible. In some of these embodiments, the first SCP node and one or more of the at least one third SCP node and the at least one fourth SCP node may be deployed in independent deployment units. In some embodiments, the at least one third SCP node and/or the at least one fourth SCP node may be deployed as distributed network elements. In some embodiments, the second SCP node and one or more of the at least one fifth SCP node and the at least one sixth SCP node may be deployed in independent deployment units. In some embodiments, the at least one fifth SCP node and/or the at least one sixth SCP node may be deployed as distributed network elements.

At steps 500 to 518 of FIG. 9, the method described earlier with respect to steps 100 to 118 of FIG. 6 respectively is performed. The only exception is that at step 516 of FIG. 9, the discovery response comprises a flag that indicates to the second NF node that the NRF node 60 has altered the priority information, e.g. "altered-priorities-in-results". This flag allows the second NF node 20 to consider its policy with respect to the caching of profiles, as well as allowing a new subscription request (which will be discussed below).

As illustrated by arrow 520 of FIG. 9, the second NF node 20 transmits a (existing) subscription request towards the NRF node 60 (e.g. directly or indirectly such as via the first SCP node) and the NRF node 60 receives the subscription request. The subscription request is a request for the NRF node 60 to notify the second NF node 20 of updates to a profile of any first NF nodes 30 of the plurality of first NF nodes 30, 70, 90. This is a standard subscription request. In some embodiments, it may instead be executed prior to step 512 of FIG. 9. As illustrated by arrow 522 of FIG. 9, the NRF node 60 transmits a response to the subscription request towards the second NF node 20 (e.g. directly or indirectly such as via the first SCP node) and the second NF node receives the response. Thus, the second NF node 20 subscribes to be notified if profile(s) of the first NF node(s) 30, 70, 90 are modified.

As illustrated by arrow 524 of FIG. 9, the second NF node 20 transmits a message towards the NRF node 60 (e.g. directly or indirectly such as via the first SCP node) and the NRF node 60 receives the message. This message 524 is referred to herein as the "second message". The second message 524 comprises the information indicative of the plurality of criteria and the order of importance of the plurality of criteria. This is a new query parameter, which may be referred to as "preferences-precedence". In the embodiment illustrated in FIG. 9, the plurality of criteria comprises "preferred-tai=TAI-x" and "preferred-vendor-specific-nf-features=y" and the order of importance of the plurality of criteria is "preferred-tai, preferred-vendor-specific-nf-features". The first criterion in the list takes precedence over the second criterion in the list (and, similarly, the second criterion in the list takes precedence over the third criterion in the list, the third criterion in the list take precedence over the fourth criterion in the list, and so on).

Thus, the order of importance provided indicates that "preferred-tai=TAI-x" takes precedence over "preferred-vendor-specific-nf-features". The second message 524 also comprises information indicative (e.g. a list) of the plurality of first NF nodes 30, 70, 90 for providing the service. This allows that the NRF node 60 to identify to which first NF nodes the subscription corresponds. A single second message 524 may be sent for all first NF nodes 30, 70, 90, as illustrated in FIG. 9, or a separate second message 524 may be sent for each of the first NF nodes 30, 70, 90.

The second message 524 is a (new) subscription request. The subscription request 524 is a request for the NRF node 60 to notify the second NF node 20 of updates to the priority information assigned to any first NF nodes 30 of the plurality of first NF nodes 30, 70, 90. The subscription request 524 may be a new service of the NRF node 60 or a new operation of an existing service of the NRF node 60 (e.g. Nnrf_NFMng). The subscription request thus includes the same preferences and their precedence as in the discovery request 112. Alternatively, an identifier that identifies the previous discovery results ("search Id") may be included in the subscription request. This identifier can be returned to the second NF node 20 from the NRF node 60 in a previous discovery response. In some embodiments, this step may be executed prior to step 512 of FIG. 9.

As illustrated by arrow 526 of FIG. 9, the NRF node 60 transmits a response to the subscription request towards the second NF node 20 (e.g. directly or indirectly such as via the first SCP node) and the second NF node 20 receives the response. Thus, the second NF node 20 subscribes to be notified if the priority information of the first NF node(s) 30, 70, 90 is modified. As illustrated at block 528 of FIG. 9, the NRF node 60 stores the information indicative of the plurality of criteria and the order of importance of the plurality of criteria, optionally with the information indicative of the plurality of first NF nodes 30, 70, 90 for providing the service, and optionally also with any other subscription information.

There may be a reason for the NRF node 60 to trigger a redetermination of the priority information of a first NF node 30. For example, the former provided altered priority information may be overwritten by an update of the first NF node profile. In this case, the NRF node 60 may either remove the priority information from the updated profile that so the second NF node 20 knows the former one is valid or the NRF node 60 may redetermine the priority information and provide it again to the second NF node 20. In another example, the former provided altered priority information may need to be modified. This can, for example, occur when any parameter (e.g. priority itself, load, capacity, etc.) in the first NF node profile that is used for determination of priority information is modified. This can also occur when there are other criteria (e.g. configurable in the NRF node 60) that affect the priority information, e.g. a health status of the first NF node that is supervised by the NRF node 60. In this case, the NRF node 60 may need to provide new priority information to the second NF node 20.

In the embodiment illustrated in FIG. 9, as illustrated by block 529, there may be a trigger other than an update to a profile of a first NF node 30 that requires that the NRF node 60 provides altered priority information for the first NF node 30. For example, a health supervision of the first NF node 30 may indicate that this is required. Alternatively, there may be an update to a profile of the first NF node 30 that means that the priority information of the first NF node 30 needs to be altered. For example, it can be a change to the priority information in the profile or a change to another attribute (e.g. load, capacity, allowed NF types, etc.) in the profile that the NRF node 60 previously used to determine the priority information for the first NF node 30. In this case, as illustrated by arrow 530 of FIG. 9, the first NF node 30 transmits a registration request towards the NRF node 60 and the NRF node 60 receives the registration request 530. The registration request 530 comprises the updated profile for the first NF node 30 and requests that it is registered. The first NF node 30 provides priority information in the profile similar to its first registration (e.g. a priority value of "3"). As illustrated by arrow 532 of FIG. 9, the NRF node 60 transmits a response to the registration request 530 towards the first NF node 30 and the first NF node 30 receives the response 532.

As illustrated by block 534 of FIG. 9, the NRF node 60 assigns priority information to the first NF node 30 according to the stored information indicative of the plurality of criteria and the order of importance of the plurality of criteria. This can result in the priority information in the updated profile received from the first NF node 30 being modified. The NRF node 60 prepares a notification request and identifies any second NF node subscribed to updates to a profile of any first NF nodes 30 of the plurality of first NF nodes 30, 70, 90. If the priority information itself, or other parameters that are used by the NRF node 60 to determine priority information (e.g. load, capacity, etc.) are modified, then the NRF node 60 needs to redetermine the previously altered priority information and include that in the notification request. The NRF node 60 updates the priority information according to stored preferences and their precedence and optionally any extra criteria (similarly as for the discovery result 112). It may be that the same criteria are used to obtain the priority information as the criteria that is used at step 414 of FIG. 8. In an example, if the parameter "AllowedNFtypes" is modified but this does not require modification of the first NF node order for selection (or reselection), then the priority information does not need to be changed. In this case, the NRF node 60 may either not include the priority information in the notification request (so that the second NF node 20 knows the former priority information is valid) or the same priority information may be included in the notification request.

The storage of the information indicative of the plurality of first NF nodes 30, 70, 90 for providing the service (as part of the subscription) allows the NRF node 60 to modify the priority information not only for one individual first NF node but, if required, the priority information for more than one first NF node. This allows the NRF node 60 to perform a reordering of the previous priority information provided in the former discovery response 516 and send the corresponding notification with the updated priority information, e.g. to all the affected first NF nodes.

As illustrated by arrow 536 of FIG. 9, the NRF node 60 transmits a notification request towards the second NF node 20 (e.g. directly or indirectly such as via the first SCP node) and the second NF node 20 receives the notification request 532. This is a standard notification request. As illustrated by arrow 538 of FIG. 9, the second NF node 20 transmits a response to the notification request 536 towards the NRF node 60 (e.g. directly or indirectly such as via the first SCP node) and the NRF node 60 receives the response. The notification request 538 may comprise information indicative of an update to a profile of one or more first NF nodes 30 of the plurality of first NF nodes 30, 70, 90.

As illustrated by arrow 540 of FIG. 9, the NRF node 60 transmits another notification request towards the second NF node 20 (e.g. directly or indirectly such as via the first SCP node) and the second NF node 20 receives the notification request 432. This notification request 540 is referred to herein as the "fifth message". As illustrated by arrow 542 of FIG. 9, the second NF node 20 transmits a response to the notification request 540 towards the NRF node 60 (e.g. directly or indirectly such as via the first SCP node) and the NRF node 60 receives the response. The notification request 540 comprises information indicative of an update to the priority information assigned to one or more first NF nodes 30 of the plurality of first NF nodes 30, 70, 90. The notification requests 536, 540 may also be referred to herein as subscription responses. The notification request 540 is separate from the notification request 536.

Thus, if priority information needs to be altered, the NRF node 60 can send a new notification request 540 with the corresponding altered priority information. If priority information needs to be modified for more than one first NF node, then either this notification request 540 includes the modified priority information for all of those first NF nodes or multiple notification requests may be sent. This allows the NRF node 60 to inform the second NF node 20 about a reordering of the previously discovered results.

Thus, as illustrated by block 544 of FIG. 9, the second NF node 20 receives the priority information assigned by the NRF node 60 at block 534 of FIG. 9. The priority information received for the first NF node 30 at step 515 of FIG. 9 (as assigned by the NRF node 60) can be overwritten by the priority information received for the first NF node 30 at step 540 of FIG. 9 (as also assigned by the NRF node 60). The priority information in the updated profile received for the first NF node 30 in the regular notification request 536 (and that is not assigned by the NRF node 60) can also be overwritten by the priority information received for the first NF node 30 in the new notification request 540 (and that is assigned by the NRF node 60). Alternatively, where there is no priority information included in the notification request 540, the former priority information that the second NF node 20 received at step 516 of FIG. 9 (as assigned by the NRF node 60) remains valid.

The selection of a first NF node based on the priority information is therefore improved due to the advantageous manner in which this priority information is assigned by the NRF node 60. In the embodiment illustrated in FIG. 9, the new subscription may be to only get altered priority information whenever it is necessary to refresh it. The existing subscription request 536 remains unchanged and the new notification request 540 is used to notify the altered priority information. This can be beneficial to avoid impacting existing NRF subscription to allow the second NF node 20 to receive the real first NF node profile and to avoid a close linkage between two different services in the NRF node 60 due to the need to include preferences and their precedence as input parameters to the discovery process.

FIG. 10 is a signalling diagram illustrating an exchange of signals in a system according to an embodiment. The system illustrated in FIG. 10 comprises a network node 20 and an NRF node 60. The system illustrated in FIG. 10 may optionally also comprise a plurality of first NF nodes 30, 70, 90 of a service producer ("NFp1", "NFp2", "NFp3").

Although three first NF nodes 30, 70, 90 are illustrated, the system illustrated in FIG. 10 can comprise one or more first NF nodes. The plurality of first NF nodes 30, 70, 90 can each be configured to provide a service. The first NF nodes 30, 70, 90 can be part of a set of NF service producer nodes according to some embodiments.

Figure 1:
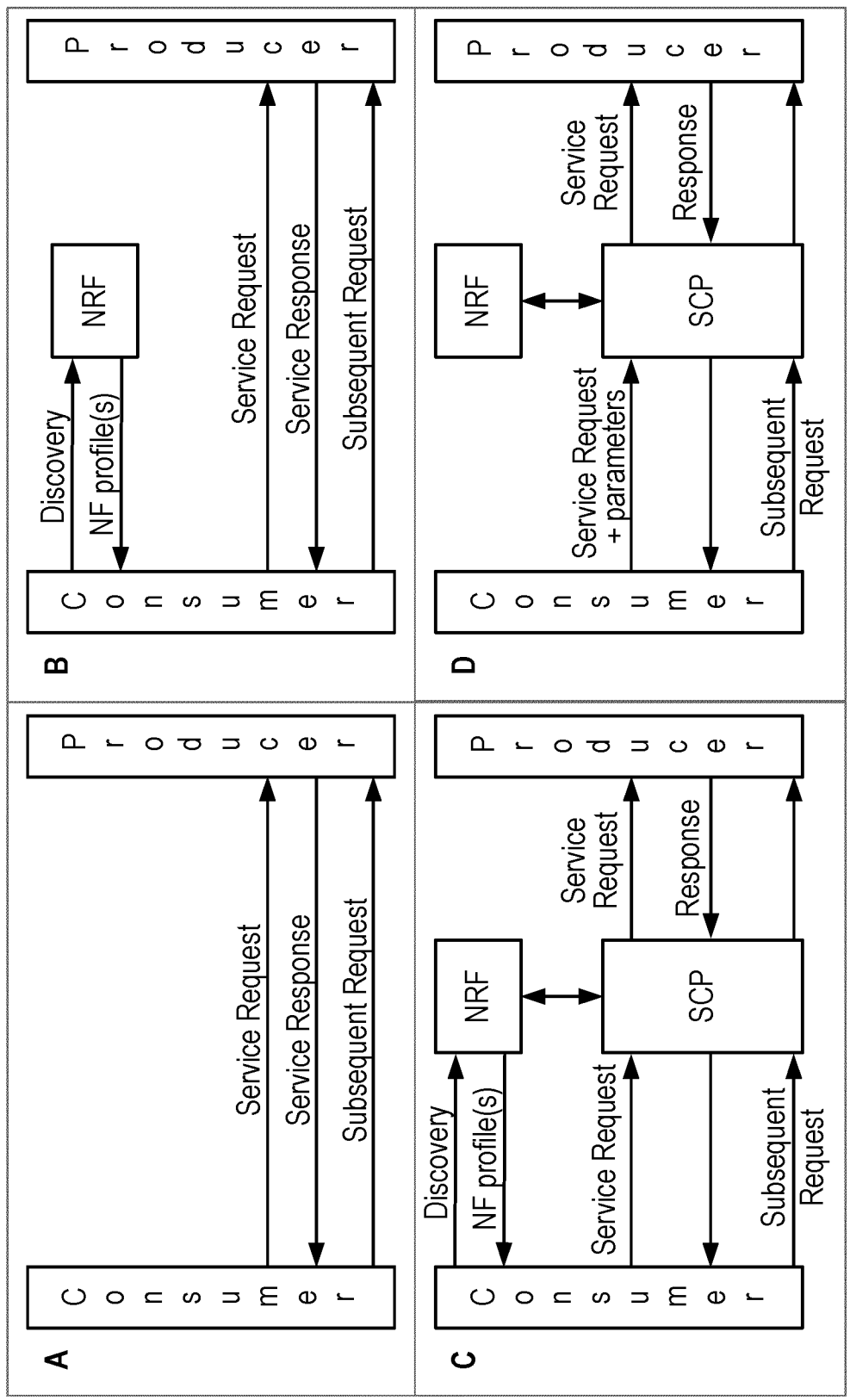
FIG. 1A-D is a block diagram illustrating different existing systems.

As illustrated in FIG. 1C, the network node 20 can be a second NF node of a service consumer ("NFc") according to some embodiments. However, in other embodiments (not illustrated), the network node 20 can be a first SCP node. Thus, the method described herein with respect to the second NF node 20 may instead be performed by the first SCP node. In these embodiments, the first SCP node is configured to operate as an SCP between second NF node 20 and the NRF node 60. Similarly, a second SCP node may be configured to operate as an SCP between the NRF node 60 and any one or more of the first NF nodes 30, 70, 90.

In some embodiments where the system comprises the first SCP node, an entity may comprise the first SCP node and the NRF node 60. That is, in some embodiments, the first SCP node can be merged with the NRF node 60 in a combined entity. In some embodiments where the system comprises the second SCP node, an entity may comprise the second SCP node and the NRF node 60. That is, in some embodiments, the second SCP node can be merged with the NRF node 60 in a combined entity. The system illustrated in FIG. 10 can comprise one or more SCP nodes according to some embodiments.

In some embodiments, the first SCP node and the second NF node 20 may be deployed in independent deployment units, and/or the first SCP node and the NRF node 60 may be deployed in independent deployment units. Thus, an SCP node based on independent deployment units is possible, as described in 3GPP TS 23.501 V16.4.0. In other embodiments, the first SCP node may be deployed as a distributed network element. For example, in some embodiments, part (e.g. a service agent) of the first SCP node may be deployed in the same deployment unit as the second NF node 20, and/or part (e.g. a service agent) of the first SCP node may be deployed in the same deployment unit as the NRF node 60. Thus, an SCP node based on a service mesh is possible, as described in 3GPP TS 23.501 V16.4.0.

In some embodiments, the second SCP node and any one or more of the first NF nodes 30, 70, 90 may be deployed in independent deployment units, and/or the second SCP node and the NRF node 60 may be deployed in independent deployment units. Thus, an SCP node based on independent deployment units is possible, as described in 3GPP TS 23.501 V16.4.0. In other embodiments, the second SCP node may be deployed as a distributed network element. For example, in some embodiments, part (e.g. a service agent) of the second SCP node may be deployed in the same deployment unit as any one or more of the first NF nodes 30, 70, 90 and/or part (e.g. a service agent) of the second SCP node may be deployed in the same deployment unit as the NRF node 60. Thus, an SCP node based on a service mesh is possible, as described in 3GPP TS 23.501 V16.4.0.

In some embodiments, at least one third SCP node may be configured to operate as an SCP between the second NF node 20 and the first SCP node, and/or at least one fourth SCP node may be configured to operate as an SCP between the first SCP node and the NRF node 60. Similarly, in some embodiments, at least one fifth SCP node may be configured to operate as an SCP between the NRF node 60 and the second SCP node, and/or at least one sixth SCP node may be configured to operate as an SCP between the second SCP node and any one or more of the first NF nodes 30, 70, 90.

Thus, a multipath of SCP nodes is possible. In some of these embodiments, the first SCP node and one or more of the at least one third SCP node and the at least one fourth SCP node may be deployed in independent deployment units. In some embodiments, the at least one third SCP node and/or the at least one fourth SCP node may be deployed as distributed network elements. In some embodiments, the second SCP node and one or more of the at least one fifth SCP node and the at least one sixth SCP node may be deployed in independent deployment units. In some embodiments, the at least one fifth SCP node and/or the at least one sixth SCP node may be deployed as distributed network elements.

At steps 700 to 714 of FIG. 10, the method described earlier with respect to steps 100 to 114 of FIG. 6 respectively is performed. The only exception is that at step 712 of FIG. 10, the discovery response comprises a flag to indicate to the NRF node 60 that the second NF node 20 requires to subscribe to changes to priority information. This allows the second NF node 20 to cache discovered results (even with altered priority information) since the second NF node 20 is able to acquire priority information updates from a notification request (which will be discussed below).

As illustrated at block 716 of FIG. 10, the NRF node 60 (locally) stores in a memory 64 of the NRF node 60 any one or more of the information indicative of the plurality of first NF nodes 30, 70, 90 for providing the service and the information indicative of the plurality of criteria and the order of importance of the plurality of criteria. This storage is performed if the flag is present in the discovery response 712. Thus, the NRF node 60 stores locally the received preferences and their precedence and/or the discovered first NF nodes 30, 70, 90 based on the executed discovery. This allows the NRF node 60 to redetermine the priority information for any of the discovered first NF nodes 30, 70, 90. The storage also enables execution of what the subscription requires.

As illustrated by arrow 718 of FIG. 10, the NRF node 60 transmits a message towards the second NF node 20 (e.g. directly or indirectly such as via the first SCP node) and the second NF node 20 receives the message. This message is referred to herein as the "third message". The third message 718 comprises an identifier (e.g. URI). The identifier indicates to the second NF node 20 that the NRF node 60 has altered the priority information. The second NF node 20 can offer the identifier to send a new subscription request to the NRF node 60 to be informed of changes to priority information. The identifier allows the second NF node 20 to consider its policy with respect to the caching of first NF profiles, as well as allowing a new subscription request (which will be described below).

At steps 720 to 724 of FIG. 10, the method described earlier with respect to steps 518 to 522 of FIG. 9 respectively is performed.

As illustrated by arrow 726 of FIG. 10, the second NF node 20 transmits a message towards the NRF node 60 (e.g. directly or indirectly such as via the first SCP node) and the NRF node 60 receives the message. This message is referred to herein as the "first message". In the embodiment illustrated in FIG. 10, the first message 726 comprises the identifier and thus the identifier is the information indicative of the plurality of criteria and the order of importance of the plurality of criteria. More specifically, the identifier allows the information indicative of the plurality of criteria and the order of importance of the plurality of criteria to be retrieved from the memory 64 of the NRF node 60. This first message enables a new subscription to the identifier provided in discovery results at step 718 of FIG. 10. The second NF node 20 subscribes to be notified if the received priority information needs to be modified. In this case, however, it is not necessary to include the same preferences and their precedence as in the discovery request 712, or any other information, since the identifier provided by the NRF node 60 is specifically for this type of subscription and holds the information provided by the discovery request 712.

As illustrated by arrow 728 of FIG. 10, the NRF node 60 transmits a response to the first message and the second NF node 20 receives the response. As illustrated at block 730 of FIG. 10, the NRF node 60 stores subscription information to be able to send notifications to the indicated destination.

At steps 731 to 746 of FIG. 10, the method described earlier with respect to steps 529 to 544 of FIG. 9 respectively is performed. The only exception is that, with respect to block 736 of FIG. 10, the information about preferences, their precedence, and discovered first NF node(s) 30, 70, 90 is cached by the NRF node 60 at step 716 (as a result of the discovery), rather than at step 730 (as a result of the new subscription). As with the other embodiments, the selection of a first NF node based on the priority information is advantageously improved due to the advantageous manner in which this priority information is assigned by the NRF node 60.

FIG. 11 is a signalling diagram illustrating an exchange of signals in a system according to an embodiment. The system illustrated in FIG. 11 comprises a network node 20 and an NRF node 60. The system illustrated in FIG. 11 may optionally also comprise a plurality of first NF nodes 30, 70, 90 of a service producer ("NFp1", "NFp2", "NFp3"). Although three first NF nodes 30, 70, 90 are illustrated, the system illustrated in FIG. 11 can comprise one or more first NF nodes. The plurality of first NF nodes 30, 70, 90 can each be configured to provide a service. The first NF nodes 30, 70, 90 can be part of a set of NF service producer nodes according to some embodiments.

As illustrated in FIG. 11, the network node 20 can be a second NF node of a service consumer ("NFc") according to some embodiments. However, in other embodiments (not illustrated), the network node 20 can be a first SCP node. Thus, the method described herein with respect to the second NF node 20 may instead be performed by the first SCP node. In these embodiments, the first SCP node is configured to operate as an SCP between second NF node 20 and the NRF node 60. Similarly, a second SCP node may be configured to operate as an SCP between the NRF node 60 and any one or more of the first NF nodes 30, 70, 90.

In some embodiments where the system comprises the first SCP node, an entity may comprise the first SCP node and the NRF node 60. That is, in some embodiments, the first SCP node can be merged with the NRF node 60 in a combined entity. In some embodiments where the system comprises the second SCP node, an entity may comprise the second SCP node and the NRF node 60. That is, in some embodiments, the second SCP node can be merged with the NRF node 60 in a combined entity. The system illustrated in FIG. 11 can comprise one or more SCP nodes according to some embodiments.

In some embodiments, the first SCP node and the second NF node 20 may be deployed in independent deployment units, and/or the first SCP node and the NRF node 60 may be deployed in independent deployment units. Thus, an SCP node based on independent deployment units is possible, as described in 3GPP TS 23.501 V16.4.0. In other embodiments, the first SCP node may be deployed as a distributed network element. For example, in some embodiments, part (e.g. a service agent) of the first SCP node may be deployed in the same deployment unit as the second NF node 20, and/or part (e.g. a service agent) of the first SCP node may be deployed in the same deployment unit as the NRF node 60. Thus, an SCP node based on a service mesh is possible, as described in 3GPP TS 23.501 V16.4.0.

In some embodiments, the second SCP node and any one or more of the first NF nodes 30, 70, 90 may be deployed in independent deployment units, and/or the second SCP node and the NRF node 60 may be deployed in independent deployment units. Thus, an SCP node based on independent deployment units is possible, as described in 3GPP TS 23.501 V16.4.0. In other embodiments, the second SCP node may be deployed as a distributed network element. For example, in some embodiments, part (e.g. a service agent) of the second SCP node may be deployed in the same deployment unit as any one or more of the first NF nodes 30, 70, 90 and/or part (e.g. a service agent) of the second SCP node may be deployed in the same deployment unit as the NRF node 60. Thus, an SCP node based on a service mesh is possible, as described in 3GPP TS 23.501 V16.4.0.

In some embodiments, at least one third SCP node may be configured to operate as an SCP between the second NF node 20 and the first SCP node, and/or at least one fourth SCP node may be configured to operate as an SCP between the first SCP node and the NRF node 60. Similarly, in some embodiments, at least one fifth SCP node may be configured to operate as an SCP between the NRF node 60 and the second SCP node, and/or at least one sixth SCP node may be configured to operate as an SCP between the second SCP node and any one or more of the first NF nodes 30, 70. Thus, a multipath of SCP nodes is possible. In some of these embodiments, the first SCP node and one or more of the at least one third SCP node and the at least one fourth SCP node may be deployed in independent deployment units. In some embodiments, the at least one third SCP node and/or the at least one fourth SCP node may be deployed as distributed network elements. In some embodiments, the second SCP node and one or more of the at least one fifth SCP node and the at least one sixth SCP node may be deployed in independent deployment units. In some embodiments, the at least one fifth SCP node and/or the at least one sixth SCP node may be deployed as distributed network elements.

The method illustrated in FIG. 11 can follow on from the methods described earlier with respect to FIG. 8, 9 or 10, as illustrated by the dotted lines in each of these figures. At steps 800 to 804 of FIG. 11, the method described earlier with respect to steps 425 to 430 of FIG. 8 respectively, steps 529 to 534 of FIG. 9 respectively, or steps 731 to 736 of FIG. 10 respectively is performed.

At block 806 of FIG. 11, the method described earlier with respect to steps 432 to 436 of FIG. 8 respectively is performed. The only exception is that, unlike the notification request 432 in FIG. 8, the notification request 810 in FIG. 11 includes an indication of "Reorder required". This indication can be optionally included by the NRF node 60 when it identifies that reordering of the first NF nodes 30, 70, 90 previously provided in a discovery result is needed. This may occur, for example, when the criteria to modify priority information is dependent on the time of the day, or another variable, that will simultaneously affect multiple or all first NF nodes 30, 70, 90.

The notification request 810 is referred to herein as the "fourth message". In more detail, as illustrated by arrow 810 of FIG. 11, the NRF node 60 transmits the fourth message towards the network node 20. The fourth message 810 comprises information indicative that the network node 20 is to initiate transmission of a discovery request towards the NRF node 60. The discovery request is a request for information indicative of an alternative plurality of first NF nodes 30, 70, 90 for providing the service and comprises the information indicative of the plurality of criteria and the order of importance of the plurality of criteria. At step 812 of FIG. 11, the method described earlier with respect to step 434 of FIG. 8 is performed.

At block 808 of FIG. 11, the method described earlier with respect to steps 536 to 544 of FIG. 9 respectively or the method described earlier with respect to steps 738 to 746 of FIG. 10 respectively are performed. The only exception is that, unlike the notification request 540 in FIG. 9 or the notification request 742 in FIG. 10, the notification request 818 in FIG. 11 includes an indication of "Reorder required". This functionality can be used when the NRF node 60 knows that the provided discovery results may not (or may no longer) be valid, for example, due to some NRF node 60 processing or alteration. For example, the NRF node 60 may have a policy to filter out some first NF nodes, which means that the discovered first NF nodes will not be valid and alternative first NF nodes need to be provided.

The notification request 818 is referred to herein as the "fourth message". In more detail, as illustrated by arrow 818 of FIG. 11, the NRF node 60 transmits the fourth message towards the network node 20. The fourth message 818 comprises information indicative that the network node 20 is to initiate transmission of a discovery request towards the NRF node 60. The discovery request is a request for information indicative of an alternative plurality of first NF nodes 30, 70, 90 for providing the service and comprises the information indicative of the plurality of criteria and the order of importance of the plurality of criteria. At steps 814, 816, 820 of FIG. 11, the method described earlier with respect to steps 536, 538, 542 of FIG. 9 respectively or steps 738, 740, 744 of FIG. 10 respectively are performed.

In some embodiments, the stored cache of former discovery results may be refreshed or cleaned at the NRF node 60 and/or the second NF node 20. In some embodiments, the former discovery results may be deleted at the NRF node 60 and/or the second NF node 20. If the "Reorder required" indication is not received, the NRF node 60 and/or the second NF node 20 may keep the priority information as it is.

As illustrated by arrow 822 of FIG. 11, the second NF node 20 transmits a discovery request towards the NRF node 60 in response to receiving the fourth message 810, 818 from the NRF node 60. The NRF node 60 receives the discovery request 822 from the network node 20. The discovery request 822 is a request for information indicative of an alternative plurality of first NF nodes 30, 70, 90 for providing the service and comprises the information indicative of the plurality of criteria and the order of importance of the plurality of criteria. Thus, the discovery request 822 can start any of the processes described earlier from the original discovery request again.

As described with reference to FIG. 11, the NRF node 60 can inform the second NF node 20 that a re-ordering of previously altered priorities is required. In some embodiments described herein, it may be required that the NRF node 60 is able to alter the priority of one first NF node independently of the rest of the first NF nodes. This can require a priority alteration procedure that takes into account all possible modifications that may occur, e.g. along the lifetime of the caching of discovery results. The method described with respect to FIG. 11 can avoid the need for this procedure and allow that an event or modification of attributes in first NF profile(s) requires a modification to formerly altered priorities. The notification requests 810, 818 in FIG. 11 may not include the (e.g. modified) priority information or, if they do, the second NF node 20 may be configured not to consider them.

Figure 12:
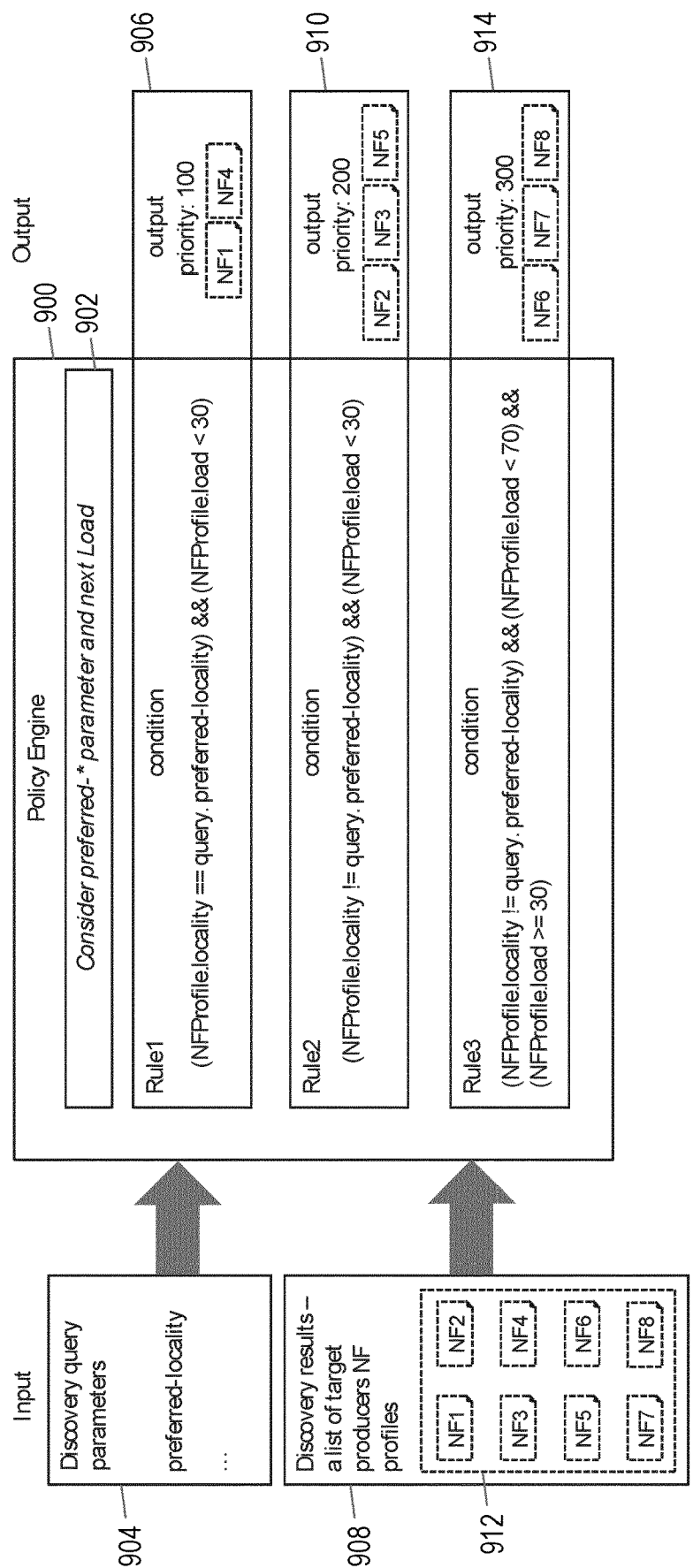
FIG. 12 is a schematic illustration of a system according to an embodiment.

FIG. 12 illustrates a system according to an embodiment. As illustrated in FIG. 12, the system comprises a policy engine 900. The NRF node 60 can comprise the policy engine 900. The system of FIG. 12 illustrates an example way in which priority information may be assigned to a plurality of first NF nodes. The input into the policy engine 900 can comprise the one or more discovery query parameters 904 (e.g. preferred-locality and/or any other query parameters) and discovery results 908. The discovery results can, for example, comprise a list 912 of profiles for the plurality of first NF nodes. As illustrated by block 902 of FIG. 12, the policy engine 900 considers the one or more preferred parameters. The policy engine applies a plurality of rules to output priority information 906, 910, 914 for the plurality of first NF nodes.

In some embodiments, an altered-priority algorithm may be used to modify the priority information for each first NF node independently. This can allow control over how modification of the priority information for one first NF node may impact altered priority information for other first NF nodes.

In some embodiments, the rules used by the NRF node 60 to modify the priority information is based on the second NF node 20 preferences (e.g. preferred locality) and their precedence, and optionally also the first NF node attributes (e.g. locality, priority, load). The rules may also be based on other parameters/configurations, which are not dependent on the first NF profiles. An example is as follows, where "NFpX" represents a first NF node:

NFp1: Locality X, Priority 1, Load: 50
NFp2: Locality X, Priority 1, Load: 40
NFp3: Locality X, Priority 3, Load: 10
NFp4: Locality X, Priority 2, Load: 70
NFp5: Locality Y, Priority 1, Load: 80
NFp6: Locality Y, Priority 2, Load: 30
NFp7: Locality Z, Priority 1, Load: 0

The NRF node 60 may define the priority information based on offsets to allow priority information for each first NF node to be determined independently of other first NF nodes. A possible algorithm for assigning modified priority information to the above first NF nodes is as follows:

```
Offset=0
IF NFp Locality = preferredLocality THEN
    For each NFpx from lowest Priority repeat
        if there are more than one with same Priority repeat:
            NFp Priority=Offset+NFpPriority+Load
        Offset=Offset+100
        NFp Priority=Offset+NFpPriority+Load
IF NFp Locality != preferredLocality THEN
    For each NFpx from lowest Priority repeat
        if there are more than one with same Priority repeat:
            NFp Priority=Offset+NFpPriority+Load
        Offset=Offset+100
        NFp Priority=Offset+NFpPriority+Load
```

For the above example, the results will be:

NFp1: 0+1+50=52
NFp2: 0+1+40=41
NFp4: 100+2+70=272
NFp3: 200+3+10=313
NFp5: 300+1+80=381
NFp7: 300+1+0=301
NFp6: 400+2+30=432

Another example is as follows, where "NFpX" represents a first NF node and "NFpX-Y" represents an instance of a network node:

NFp1-B: with Load: 50%: priority: 50
NFp1-A: with Load: 70%: priority: 70
NFp2: priority 101
NFp3: priority 201

A possible algorithm for assigning modified priority information to the above first NF nodes and instances thereof is as follows:

```
Rule1 IF (NFprofile.load >=50)
THEN priority=original priority+load value
EXEC NEXT RULE
Rule2 IF (subsc/discovery.preferred-tai in
NFprofile.taList)&(subscription/discovery.preferred-features=NFprofile.supportfeatures)
THEN priority=original priority
EXIT
Rule3 IF (subsc/discovery.preferred-tai in NFprofile.taList)
THEN priority=original priority + 100
EXIT
Rule4 IF (subscription/discovery.preferred-features=NFprofile.supportfeatures)
THEN priority=original priority + 200
EXIT
```

There is also provided a computer program comprising instructions which, when executed by processing circuitry (such as the processing circuitry 22 of the network node 20 described earlier and/or the processing circuitry 62 of the NRF node 60 described earlier), cause the processing circuitry to perform at least part of the method described herein. There is provided a computer program product, embodied on a non-transitory machine-readable medium, comprising instructions which are executable by processing circuitry (such as the processing circuitry 22 of the network node 20 described earlier and/or the processing circuitry 62 of the NRF node 60 described earlier) to cause the processing circuitry to perform at least part of the method described herein. There is provided a computer program product comprising a carrier containing instructions for causing processing circuitry (such as the processing circuitry 22 of the network node 20 described earlier and/or the processing circuitry 62 of the NRF node 60 described earlier) to perform at least part of the method described herein. In some embodiments, the carrier can be any one of an electronic signal, an optical signal, an electromagnetic signal, an electrical signal, a radio signal, a microwave signal, or a computer-readable storage medium.

Other embodiments include those defined in the following numbered statements:

Embodiment 1. A method for prioritising a plurality of first NF nodes (30, 70, 90) of at least one service producer in a network, wherein the method is performed by a network node (20), the method comprising:
  initiating transmission of a first message (112, 420, 524, 726) towards a network repository function, NRF, node (60),
    wherein the first message (112, 420, 524, 726) comprises information indicative of a plurality of criteria and an order of importance of the plurality of criteria,
    wherein the information is for use in assigning priority information to the plurality of first NF nodes (30, 70, 90), and
    wherein, for each first NF node (30) of the plurality of first NF nodes (30, 70, 90), the priority information assigned to the first NF node (30) is indicative of a priority with which the first NF node (30) is to be selected to provide a service relative to at least one other first NF node (70, 90) of the plurality of first NF nodes (30, 70, 90) and the priority information is assigned to the first NF node (30) based on one or more criteria of the plurality of criteria that the first NF node (30) meets and the position of the one or more criteria in the order of importance of the plurality of criteria.

Embodiment 2. A method according to Embodiment 1, wherein:
  the first message (112, 420, 524, 726) comprises an array and the array comprises the information indicative of the plurality of criteria and the order of importance of the plurality of criteria,
    wherein each item of the array comprises a different criterion of the plurality of criteria and the plurality of criteria are ordered in the array according to their importance.

Embodiment 3. A method according to Embodiment 1 or 2, wherein:
  the plurality of criteria comprise any one or more of:
    a criterion indicative that first NF nodes (30, 70, 90) located at a predefined location are preferred;
    a criterion indicative that first NF nodes (30, 70, 90) serving a predefined tracking area identity, TAI, are preferred;
    a criterion indicative that a predefined instance of first NF nodes (30, 70, 90) are preferred;
    a criterion indicative that first NF nodes (30, 70, 90) supporting a predefined application programming interface, API, version of the service are preferred;
    a criterion indicative that first NF nodes (30, 70, 90) serving a full public land mobile network, PLMN, are preferred;
    a criterion indicative that first NF nodes (30, 70, 90) supporting one or more predefined vendor specific features for the service are preferred; and
    a criterion indicative that first NF nodes (30, 70, 90) supporting one or more predefined vendor specific features for the first NF nodes are preferred.

Embodiment 4. A method according to any of the preceding Embodiments, the method comprising:
  initiating transmission of a second message (420, 524) towards the network repository function, NRF, node (60),
    wherein the second message (420, 524) comprises:
      the information indicative of the plurality of criteria and the order of importance of the plurality of criteria; and/or
      information indicative of the plurality of first NF nodes (30, 70, 90) for providing the service and, for each first NF node (30) of the plurality of first NF nodes (30, 70, 90), the priority information assigned to the first NF node (30).

Embodiment 5. A method according to Embodiment 4, wherein:
  the second message (420, 524) is a first subscription request; and
  the first subscription request (420) is a request for the NRF node (60) to notify the network node (20) of updates to a profile of any first NF nodes (30) of the plurality of first NF nodes (30, 70, 90); or
  the first subscription request (524) is a request for the NRF node (60) to notify the network node (20) of updates to the priority information assigned to any first NF nodes (30) of the plurality of first NF nodes (30, 70, 90).

Embodiment 6. A method according to Embodiment 5, wherein:
  the first subscription request (524) is separate from a second subscription request (520); and
  the second subscription request (520) is a request for the NRF node (60) to notify the network node (20) of updates to a profile of any first NF nodes (30) of the plurality of first NF nodes (30, 70, 90).

Embodiment 7. A method according to any of Embodiments 1 to 3, wherein:
  the first message (112) is a discovery request; and
  the discovery request is a request for information indicative of the plurality of first NF nodes (30, 70, 90) for providing the service.

Embodiment 8. A method according to any of Embodiments 1 to 3, wherein:
  the first message (420) is a subscription request; and
  the subscription request is a request for the NRF node (60) to notify the network node (20) of updates to a profile of any first NF nodes (30) of the plurality of first NF nodes (30, 70, 90).

Embodiment 9. A method according to any of Embodiments 1 to 3, wherein:
  the first message (524) is a first subscription request; and
  the first subscription request (524) is a request for the NRF node (60) to notify the network node (20) of updates to the priority information assigned to any first NF nodes (30) of the plurality of first NF nodes (30, 70, 90).

Embodiment 10. A method according to Embodiment 9, wherein:
  the first subscription request (524) comprises information indicative of the plurality of first NF nodes (30, 70, 90) for providing the service.

Embodiment 11. A method according to Embodiment 9 or 10, wherein:
  the first subscription request (524) is separate from a second subscription request (520); and
  the second subscription request (520) is a request for the NRF node (60) to notify the network node (20) of updates to a profile of any first NF nodes (30) of the plurality of first NF nodes (30, 70, 90).

Embodiment 12. A method according to any of Embodiments 1 to 3, wherein:
the first message (726) comprises an identifier; and
the identifier is the information indicative of the plurality of criteria and the order of importance of the plurality of criteria.

Embodiment 13. A method according to Embodiment 12, wherein:
the information indicative of the plurality of criteria and the order of importance of the plurality of criteria is an identity of a resource of the NRF (60) at which the information indicative of the plurality of criteria and the order of importance of the plurality of criteria is stored.

Embodiment 14. A method according to Embodiment 12 or 13, the method comprising:
receiving a third message (718) comprising the identifier from the NRF node (60).

Embodiment 15. A method according to Embodiment 14, wherein:
the third message (718) is a discovery response; and
the discovery response comprises information indicative of the plurality of first NF nodes (30, 70, 90) for providing the service and information indicative that the priority information has been assigned to the plurality of first NF nodes (30, 70, 90).

Embodiment 16. A method according to any of Embodiments 12 to 15, wherein:
the identifier is a uniform resource identifier, URI.

Embodiment 17. A method according to any of Embodiments 12 to 16, the method comprising:
initiating transmission of a discovery request (712) towards the NRF node (60),
wherein the discovery request (712) is a request for information indicative of the plurality of first NF nodes (30, 70, 90) for providing the service, and
wherein the discovery request (712) comprises information indicative that the network node (20) is to be subscribed to updates to the priority information assigned to any first NF node (30) of the plurality of first NF nodes (30, 70, 90).

Embodiment 18. A method according to any of the preceding Embodiments, the method comprising:
initiating transmission of a discovery request (822) towards the NRF node (60) in response to receiving a fourth message (810, 818) from the NRF node (60),
wherein the fourth message (810, 818) comprises information indicative that the network node (20) is to initiate transmission of a discovery request towards the NRF node (60), and
wherein the discovery request is a request for information indicative of an alternative plurality of first NF nodes (30, 70, 90) for providing the service and comprises the information indicative of the plurality of criteria and the order of importance of the plurality of criteria.

Embodiment 19. A method according to any of the preceding Embodiments, wherein:
the network node is a second NF node (20) of a service consumer; or
the network node is a first service communication proxy, SCP, node that is configured to operate as an SCP between the second NF node (20) and the NRF node (60).

Embodiment 20. A method for prioritising a plurality of first NF nodes (30, 70, 90) of at least one service producer in a network, wherein the method is performed by a network repository function, NRF, node (60), the method comprising:
receiving a first message (112, 420, 524, 726) from a network node (20),
wherein the first message (112, 420, 524, 726) comprises information indicative of a plurality of criteria and an order of importance of the plurality of criteria; and
assigning (114, 430, 534, 736) priority information to the plurality of first NF nodes (30, 70, 90),
wherein, for each first NF node (30) of the plurality of first NF nodes (30, 70, 90), the priority information assigned to the first NF node (30) is indicative of a priority with which the first NF node (30) is to be selected to provide a service relative to at least one other first NF node (70, 90) of the plurality of first NF nodes (30, 70, 90) and the priority information is assigned to the first NF node (30) based on one or more criteria of the plurality of criteria that the first NF node (30) meets and the position of the one or more criteria in the order of importance of the plurality of criteria.

Embodiment 21. A method according to Embodiment 20, wherein:
the first message (112, 420, 524, 726) comprises an array and the array comprises the information indicative of the plurality of criteria and the order of importance of the plurality of criteria,
wherein each item of the array comprises a different criterion of the plurality of criteria and the plurality of criteria are ordered in the array according to their importance.

Embodiment 22. A method according to Embodiment 20 or 21, wherein:
the plurality of criteria comprise any one or more of:
a criterion indicative that first NF nodes (30, 70, 90) located at a predefined location are preferred;
a criterion indicative that first NF nodes (30, 70, 90) serving a predefined tracking area identity, TAI, are preferred;
a criterion indicative that a predefined instance of first NF nodes (30, 70, 90) are preferred;
a criterion indicative that first NF nodes (30, 70, 90) supporting a predefined application programming interface, API, version of the service are preferred;
a criterion indicative that first NF nodes (30, 70, 90) serving a full public land mobile network, PLMN, are preferred;
a criterion indicative that first NF nodes (30, 70, 90) supporting one or more predefined vendor specific features for the service are preferred; and
a criterion indicative that first NF nodes (30, 70, 90) supporting one or more predefined vendor specific features for the first NF nodes are preferred.

Embodiment 23. A method according to any of Embodiments 20 to 22, the method comprising:
receiving a second message (420, 524) from the network node (20),
wherein the second message (420, 524) comprises:
the information indicative of the plurality of criteria and the order of importance of the plurality of criteria; and/or
information indicative of the plurality of first NF nodes (30, 70, 90) for providing the service and, for each first NF node (30) of the plurality of first NF nodes (30, 70, 90), the priority information assigned to the first NF node (30).

Embodiment 24. A method according to Embodiment 23, wherein:
the second message (420, 524) is a first subscription request; and
the first subscription request (420) is a request for the NRF node (60) to notify the network node (20) of updates to a profile of any first NF nodes (30) of the plurality of first NF nodes (30, 70, 90); or
the first subscription request (524) is a request for the NRF node (60) to notify the network node (20) of updates to the priority information assigned to any first NF nodes (30) of the plurality of first NF nodes (30, 70, 90).

Embodiment 25. A method according to Embodiment 24, wherein:
the first subscription request (524) is separate from a second subscription request (520); and
the second subscription request (520) is a request for the NRF node (60) to notify the network node (20) of updates to a profile of any first NF nodes (30) of the plurality of first NF nodes (30, 70, 90).

Embodiment 26. A method according to any of Embodiments 20 to 22, wherein:
the first message (112) is a discovery request; and
the discovery request is a request for information indicative of the plurality of first NF nodes (30, 70, 90) for providing the service.

Embodiment 27. A method according to any of Embodiments 20 to 22, wherein:
the first message (420) is a subscription request; and
the subscription request is a request for the NRF node (60) to notify the network node (20) of updates to a profile of any first NF nodes (30) of the plurality of first NF nodes (30, 70, 90).

Embodiment 28. A method according to any of Embodiments 20 to 22, wherein:
the first message (524) is a first subscription request; and
the first subscription request (524) is a request for the NRF node (60) to notify the network node (20) of updates to the priority information assigned to any first NF nodes (30) of the plurality of first NF nodes (30, 70, 90).

Embodiment 29. A method according to Embodiment 28, wherein:
the first subscription request (524) comprises information indicative of the plurality of first NF nodes (30, 70, 90) for providing the service.

Embodiment 30. A method according to Embodiment 28 or 29, wherein:
the first subscription request (524) is separate from a second subscription request (520); and
the second subscription request (520) is a request for the NRF node (60) to notify the network node (20) of updates to a profile of any first NF nodes (30) of the plurality of first NF nodes (30, 70, 90).

Embodiment 31. A method according to any of Embodiments 27 to 30, the method comprising:
storing (424, 528) any or more of:
the priority information;
the information indicative of the plurality of criteria and the order of importance of the plurality of criteria; and
information indicative of the plurality of first NF nodes (30, 70, 90) for providing the service.

Embodiment 32. A method according to any of Embodiments 20 to 22, wherein:
the first message (726) comprises an identifier; and
the identifier is the information indicative of the plurality of criteria and the order of importance of the plurality of criteria.

Embodiment 33. A method according to Embodiment 32, wherein:
the information indicative of the plurality of criteria and the order of importance of the plurality of criteria is an identity of a resource of the NRF (60) at which the information indicative of the plurality of criteria and the order of importance of the plurality of criteria is stored.

Embodiment 34. A method according to any of Embodiments 32 or 33, the method comprising:
initiating transmission of a third message (718) comprising the identifier towards the network node (20).

Embodiment 35. A method according to Embodiment 34, wherein:
the third message (718) is a discovery response; and
the discovery response comprises information indicative of the plurality of first NF nodes (30, 70, 90) for providing the service and information indicative that the priority information has been assigned to the plurality of first NF nodes (30, 70, 90).

Embodiment 36. A method according to any of Embodiments 32 to 35, wherein:
the identifier is a uniform resource identifier, URI.

Embodiment 37. A method according to any of Embodiments 32 to 36, the method comprising:
receiving a discovery request (712) from the network node (20),
wherein the discovery request (712) is a request for information indicative of the plurality of first NF nodes (30, 70, 90) for providing the service, and
wherein the discovery request (712) comprises information indicative that the network node (20) is to be subscribed to updates to the priority information assigned to any first NF nodes (30) of the plurality of first NF nodes (30, 70, 90).

Embodiment 38. A method according to Embodiment 37, the method comprising:
storing (716), in a memory (64) of the NRF node (60), any one or more of:
the information indicative of the plurality of first NF nodes (30, 70, 90) for providing the service; and
the information indicative of the plurality of criteria and the order of importance of the plurality of criteria.

Embodiment 39. A method according to any of Embodiments 27 to 38, wherein:
assigning (430, 534, 736) the priority information to the plurality of first NF nodes (30, 70, 90) comprises:
modifying priority information previously assigned to the plurality of first NF nodes (30, 70, 90).

Embodiment 40. A method according to any of Embodiments 27 to 39, wherein:
the priority information is assigned in response to an update to a profile of one or more first NF nodes (30) of the plurality of first NF nodes (30, 70, 90) or in response to another trigger.

Embodiment 41. A method according to Embodiment 40, wherein:
the update to the profile comprises any one or more of:
an update to one or more attributes in the profile, wherein the assigned priority information is based on the one or more attributes; and
an update to priority information in the profile, wherein the assigned priority information is based on the priority information in the profile.

Embodiment 42. A method according to any of Embodiments 20 to 41, the method comprising:
receiving a discovery request (822) from the network node (20),
wherein the discovery request is a request for information indicative of an alternative plurality of first NF nodes (30, 70, 90) for providing the service and comprises the information indicative of the plurality of criteria and the order of importance of the plurality of criteria.

Embodiment 43. A method according to any of Embodiments 20 to 42, wherein:
the network node is a second NF node (20) of a service consumer; or
the network node is a first service communication proxy, SCP, node that is configured to operate as an SCP between the second NF node (20) and the NRF node (60).

Embodiment 44. A method for prioritising a plurality of first NF nodes (30, 70, 90) of at least one service producer in a network, wherein the method is performed by a network repository function, NRF, node (60), the method comprising:
initiating transmission of a fifth message (116, 432, 540, 742) towards a network node (20),
wherein the fifth message (116, 432, 540, 742) comprises priority information assigned to the plurality of first NF nodes (30, 70, 90),
wherein, for each first NF node (30) of the plurality of first NF nodes (30, 70, 90), the priority information assigned to the first NF node (30) is indicative of a priority with which the first NF node (30) is to be selected to provide a service relative to at least one other first NF node (70, 90) of the plurality of first NF nodes (30, 70, 90) and the priority information is assigned to the first NF node (30) based on one or more criteria of the plurality of criteria that the first NF node (30) meets and the position of the one or more criteria in the order of importance of the plurality of criteria.

Embodiment 45. A method according to Embodiment 44, wherein:
the plurality of criteria comprise any one or more of:
a criterion indicative that first NF nodes (30, 70, 90) located at a predefined location are preferred;
a criterion indicative that first NF nodes (30, 70, 90) serving a predefined tracking area identity, TAI, are preferred;
a criterion indicative that a predefined instance of first NF nodes (30, 70, 90) are preferred;
a criterion indicative that first NF nodes (30, 70, 90) supporting a predefined application programming interface, API, version of the service are preferred;
a criterion indicative that first NF nodes (30, 70, 90) serving a full public land mobile network, PLMN, are preferred;
a criterion indicative that first NF nodes (30, 70, 90) supporting one or more predefined vendor specific features for the service are preferred; and
a criterion indicative that first NF nodes (30, 70, 90) supporting one or more predefined vendor specific features for the first NF nodes are preferred.

Embodiment 46. A method according to Embodiment 44 or 45, wherein:
the fifth message (116) is a discovery response; and
the discovery response comprises information indicative of the plurality of first NF nodes (30, 70, 90) for providing the service and information indicative that the priority information has been assigned to the plurality of first NF nodes (30, 70, 90).

Embodiment 47. A method according to Embodiment 44 or 45, wherein:
the fifth message (432) is a subscription response; and
the subscription response comprises information indicative of an update to a profile of one or more first NF nodes (30) of the plurality of first NF nodes (30, 70, 90).

Embodiment 48. A method according to Embodiment 44 or 45, wherein:
the fifth message (540, 742) is a first subscription response; and
the first subscription response (540, 742) comprises information indicative of an update to the priority information assigned to one or more first NF nodes (30) of the plurality of first NF nodes (30, 70, 90).

Embodiment 49. A method according to Embodiment 48, wherein:
the first subscription response (540, 742) is separate from a second subscription response (738, 536); and
the second subscription response (738, 536) comprises information indicative of an update to a profile of one or more first NF nodes (30) of the plurality of first NF nodes (30, 70, 90).

Embodiment 50. A method according to any of Embodiments 44 to 49, the method comprising:
initiating transmission of a fourth message (810, 818) towards the network node (20),
wherein the fourth message (810, 818) comprises information indicative that the network node (20) is to initiate transmission of a discovery request towards the NRF node (60), and
wherein the discovery request is a request for information indicative of an alternative plurality of first NF nodes (30, 70, 90) for providing the service.

51. A method according to any of Embodiments 44 to 50, wherein:
the network node is a second NF node (20) of a service consumer; or
the network node is a first service communication proxy, SCP, node that is configured to operate as an SCP between the second NF node (20) and the NRF node (60).

Embodiment 52. A method for prioritising a plurality of first NF nodes (30, 70, 90) of at least one service producer in a network, wherein the method is performed by a network node (20), the method comprising:
receiving a fifth message (116, 432, 540, 742) from a network repository function, NRF, node (60),
wherein the fifth message (116, 432, 540, 742) comprises priority information assigned to the plurality of first NF nodes (30, 70, 90),
wherein, for each first NF node (30) of the plurality of first NF nodes (30, 70, 90), the priority information assigned to the first NF node (30) is indicative of a priority with which the first NF node (30) is to be selected to provide a service relative to at least one other first NF node (70, 90) of the plurality of first NF nodes (30, 70, 90) and the priority information is assigned to the first NF node (30) based on one or more criteria of the plurality of criteria that the first NF node (30) meets and the position of the one or more criteria in the order of importance of the plurality of criteria.

Embodiment 53. A method according to Embodiment 52, the method comprising:
selecting (118) a first NF node (30) from the plurality of first NF nodes (30, 70, 90) to provide the service, wherein the first NF node (30) is selected based on the priority information.

Embodiment 54. A method according to Embodiment 52 or 53, wherein:
the priority information assigned to the selected first NF node (30) is indicative that a priority with which the selected first NF node (30) is to be selected is higher than a priority with which the other first NF nodes (70, 90) are to be selected.

Embodiment 55. A method according to any of Embodiments 52 to 54, wherein:
the plurality of criteria comprise any one or more of:
a criterion indicative that first NF nodes (30, 70, 90) located at a predefined location are preferred;
a criterion indicative that first NF nodes (30, 70, 90) serving a predefined tracking area identity, TAI, are preferred;
a criterion indicative that a predefined instance of first NF nodes (30, 70, 90) are preferred;
a criterion indicative that first NF nodes (30, 70, 90) supporting a predefined application programming interface, API, version of the service are preferred;
a criterion indicative that first NF nodes (30, 70, 90) serving a full public land mobile network, PLMN, are preferred;
a criterion indicative that first NF nodes (30, 70, 90) supporting one or more predefined vendor specific features for the service are preferred; and
a criterion indicative that first NF nodes (30, 70, 90) supporting one or more predefined vendor specific features for the first NF nodes are preferred.

Embodiment 56. A method according to any of Embodiments 52 to 55, wherein:
the fifth message (116) is a discovery response; and
the discovery response comprises information indicative of the plurality of first NF nodes (30, 70, 90) for providing the service and information indicative that the priority information has been assigned to the plurality of first NF nodes (30, 70, 90).

Embodiment 57. A method according to any of Embodiments 52 to 55, wherein:
the fifth message (432) is a subscription response; and
the subscription response comprises information indicative of an update to a profile of one or more first NF nodes (30) of the plurality of first NF nodes (30, 70, 90).

Embodiment 58. A method according to any of Embodiments 52 to 55, wherein:
the fifth message (540, 742) is a first subscription response; and
the first subscription response (540, 742) comprises information indicative of an update to the priority information assigned to one or more first NF nodes (30) of the plurality of first NF nodes (30, 70, 90).

Embodiment 59. A method according to Embodiment 58, wherein:
the first subscription response (540, 742) is separate from a second subscription response (738, 536); and
the second subscription response (738, 536) comprises information indicative of an update to a profile of one or more first NF nodes (30) of the plurality of first NF nodes (30, 70, 90).

Embodiment 60. A method according to any of Embodiments 52 to 59, the method comprising:
receiving a fourth message (810, 818) from the NRF node (60),
wherein the fourth message (810, 818) comprises information indicative that the network node (20) is to initiate transmission of a discovery request towards the NRF node (60), and
wherein the discovery request is a request for information indicative of an alternative plurality of first NF nodes (30, 70, 90) for providing the service.

Embodiment 61. A method according to any of Embodiments 52 to 60, wherein:
the network node is a second NF node (20) of a service consumer; or
the network node is a first service communication proxy, SCP, node that is configured to operate as an SCP between the second NF node (20) and the NRF node (60).

Embodiment 62. A method performed by a system, the method comprising:
the method according to any of Embodiments 1 to 19 and/or any of Embodiments 52 to 61; and
the method according to any of Embodiments 20 to 43 and/or any of Embodiments 44 to 51.

Embodiment 63. A network node (20) comprising:
processing circuitry (22) configured to operate in accordance with any of Embodiments 1 to 19 and/or any of Embodiments 52 to 61.

Embodiment 64. A network node (20) according to Embodiment 63, wherein:
the network node (20) comprises:
at least one memory (24) for storing instructions which, when executed by the processing circuitry (22), cause the network node (20) to operate in accordance with any of Embodiments 1 to 19 and/or any of Embodiments 52 to 61.

Embodiment 65. A network repository function, NRF, node (60) comprising:
processing circuitry (62) configured to operate in accordance with any of Embodiments 20 to 43 and/or any of Embodiments 44 to 51.

Embodiment 66. An NRF node (60) according to Embodiment 65, wherein:
the NRF node (60) comprises:
at least one memory (64) for storing instructions which, when executed by the processing circuitry (62), cause the NRF node (60) to operate in accordance with any of Embodiments 20 to 43 and/or any of Embodiments 44 to 51.

Embodiment 67. A system comprising:
at least one network node (20) according to Embodiment 63 or 64; and
at least one NRF node (60) according to Embodiment 65 or 66.

Embodiment 68. A computer program comprising instructions which, when executed by processing circuitry, cause the processing circuitry to perform the method according to any of Embodiments 1 to 19, any of Embodiments 20 to 43, any of Embodiments 44 to 51, and/or any of Embodiments 52 to 61.

Embodiment 69. A computer program product, embodied on a non-transitory machine-readable medium, comprising instructions which are executable by processing circuitry to cause the processing circuitry to perform the method according to any of Embodiments 1 to 19, any of Embodiments 20 to 43, any of Embodiments 44 to 51, and/or any of Embodiments 52 to 61.

In some embodiments, the network node functionality and/or the NRF node functionality described herein can be performed by hardware. Thus, in some embodiments, any one or more of the network node 20 and the NRF node 60 described herein can be a hardware node. However, it will also be understood that optionally at least part or all of the network node functionality and/or the NRF node functionality described herein can be virtualized. For example, the functions performed by any one or more of the network node 20 and the NRF node 60 described herein can be implemented in software running on generic hardware that is configured to orchestrate the node functionality. Thus, in some embodiments, any one or more of the network node 20 and the NRF node 60 described herein can be a virtual node. In some embodiments, at least part or all of the network node functionality and/or the NRF node functionality described herein may be performed in a network enabled cloud. The network node functionality and/or the NRF node functionality described herein may all be at the same location or at least some of the node functionality may be distributed.

It will be understood that at least some or all of the method steps described herein can be automated in some embodiments. That is, in some embodiments, at least some or all of the method steps described herein can be performed automatically. The method described herein can be a computer-implemented method.

Thus, in the manner described herein, there are advantageously provided improved techniques for prioritising a plurality of first NF nodes of at least one service producer in a network. The appendices define some embodiments of the disclosure.

It should be noted that the above-mentioned embodiments illustrate rather than limit the idea, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

Appendix 1

3GPP TSG-CT WG4 Meeting #106-e                                         C4-21xxxx
E-Meeting, 11th – 15th October 2021

*CR-Form-v12.0*

CHANGE REQUEST

29.510 CR xxxx rev - Current version: 17.3.0

*For HELP on using this form: comprehensive instructions can be found at http://www.3gpp.org/Change-Requests.*

Proposed change affects: UICC apps ☐    ME ☐   Radio Access Network ☐   Core Network ☒

| | |
|---|---|
| Title: | Precedence of Preferred Parameters |
| Source to WG: | Ericsson |
| Source to TSG: | CT4 |
| Work item code: | SBIProtoc17                  Date: 2021-09-02 |
| Category: | B                                                                                        Release: Rel-17 |
| | *Use one of the following categories:*                         *Use one of the following releases:* <br>     F *(correction)*                                                 *Rel-8*     *(Release 8)* <br>     A *(mirror corresponding to a change in an earlier*         *Rel-9*     *(Release 9)* <br>     *release)*                                                      *Rel-10*   *(Release 10)* <br>     B *(addition of feature),*                                 *Rel-11*   *(Release 11)* <br>     C *(functional modification of feature)*             *Rel-12*   *(Release 12)* <br>     D *(editorial modification)*                         *Rel-13*   *(Release 13)* <br> *Detailed explanations of the above categories can*     *Rel-14*   *(Release 14)* <br> *be found in 3GPP TR 21.900.*                                *Rel-15*   *(Release 15)* <br>                                                                                  *Rel-16*   *(Release 16)* |
| Reason for change: | 3GPP TS 29.510 has specified NRF service which allow NF producer to register NF profile in NRF and NF consumer to discover the NF instances matching certain query parameters. <br><br> For the NRF discovery service, NF consumer may provide optional preferred parameters which are used by NRF to preferably find the candidate NF instances and prioritize the NF candidates in the search result. After NRF selected all full matching instances or no full matched instances found, the NRF may also select NF instances that are not matching preferred parameters in search result. When multiple preferred parameters are provided and not all these parameters are fully matched, the NRF doesn't aware the precedence of these parameters thus cannot decide to which preferred parameter can be ignored in partial matching. As a consequence, the NRF may provide the candidates in search result which are not interested by the NF consumer. <br><br> This CR proposes that the NF consumer indicates the preference of preferred parameters in the discovery. |
| Summary of change: | 1/ Add new query parameter to allow NF consumer to indicate the precedence of the preferred parameters. <br><br> 2/ Update supported features for the new query parameter <br><br> 3/ Update OpenAPI accordingly |
| Consequences if not approved: | NRF cannot identify the precedence of preferred query parameters and may select candidates not following NF consumer preference. |

| | | | | |
|---|---|---|---|---|
| Clauses affected: | 6.2.3.2.3.1, 6.2.9, A.3 | | | |
| | Y | N | | |
| Other specs | | X | Other core specifications | TS/TR ... CR ... |
| affected: | | X | Test specifications | TS/TR ... CR ... |
| (show related CRs) | | X | O&M Specifications | TS/TR ... CR ... |
| Other comments: | This CR introduces backward compatible new feature in OpenAPI files Nnrf_NFDiscovery APIs. | | | |

| This CR's revision history: |
|---|

* * * First Change * * * *

6.2.3.2.3.1    GET

This operation retrieves a list of NF Instances, and their offered services, currently registered in the NRF, satisfying a number of filter criteria, such as those NF Instances offering a certain service name, or those NF Instances of a given NF type (e.g., AMF).

Table 6.2.3.2.3.1-1: URI query parameters supported by the GET method on this resource

| Name | Data type | P | Cardinality | Description | Applicability |
|---|---|---|---|---|---|
| target-nf-type | NFType | M | 1 | This IE shall contain the NF type of the target NF being discovered. | |
| requester-nf-type | NFType | M | 1 | This IE shall contain the NF type of the Requester NF that is invoking the Nnrf_NFDiscovery service. | |
| requester-nf-instance-id | NfInstanceId | O | 0..1 | If included, this IE shall contain the NF instance id of the Requester NF. | Query-Params-Ext2 |
| service-names | array(ServiceName) | O | 1..N | If included, this IE shall contain an array of service names for which the NRF is queried to provide the list of NF profiles.<br><br>The NRF shall return the NF profiles that have at least one NF service matching the NF service names in this list.<br><br>The NF services returned by the NRF (inside the nfServices or nfServiceList attributes) in each matching NFProfile shall be those services whose service name matches one of the service names included in this list.<br><br>If not included, the NRF shall not filter based on service name.<br><br>This array shall contain unique items.<br><br>Example:<br><br>```
NF1 supports services: A, B, C
NF2 supports services:    C, D, E
NF3 supports services: A,  C,   E
NF4 supports services:    B, C, D Consumer asks for service-names = [A, E]

NRF returns:

NF1 containing service A
NF2 containing service E
NF3 containing services A, E
NF4 is not returned
``` | |
| requester-nf-instance-fqdn | Fqdn | O | 0..1 | This IE may be present for an NF discovery request within the same PLMN as the NRF.<br>If included, this IE shall contain the FQDN of the Requester NF that is invoking the Nnrf_NFDiscovery service.<br>The NRF shall use this to return only those NF profiles that include at least one NF service containing an entry in the "allowedNfDomains" list (see clause 6.1.6.2.3) that matches the domain of the requester NF.<br>This IE shall be ignored by the NRF if it is received from a requester NF belonging to a different PLMN.<br>(NOTE 12) | |
| target-plmn-list | array(PlmnId) | C | 1..N | This IE shall be included when NF services in a different PLMN, or NF services of specific PLMN ID(s) in a same PLMN comprising multiple PLMN IDs, need to be discovered. When included, this IE shall contain the PLMN ID of the target NF. If more than one PLMN ID is included, NFs from any PLMN ID present in the list matches the query parameter.<br>This IE shall also be included in SNPN scenarios, when the entity owning the subscription, the Credentials Holder | |

| | | | | (see clause 5.30.2.9 in 3GPP TS 23.501 [2]) is a PLMN. For inter-PLMN service discovery, at most 1 PLMN ID shall be included in the list; it shall be included in the service discovery from the NF in the source PLMN sent to the NRF in the same PLMN, while it may be absent in the service discovery request sent from the source NRF to the target NRF. In such case, if the NRF receives more than 1 PLMN ID, it shall only consider the first element of the array, and ignore the rest. | |
|---|---|---|---|---|---|
| requester-plmn-list | array(PlmnId) | C | 1..N | This IE shall be included when NF services in a different PLMN need to be discovered. When included, this IE shall contain the PLMN ID(s) of the requester NF. (NOTE 12) | |
| requester-snpn-list | array(PlmnIdNid) | C | 1..N | This IE shall be included when the Requester NF belongs to one or several SNPNs, and NF services of a specific SNPN need to be discovered. When present, this IE shall contain the SNPN ID(s) of the requester NF. The NRF shall use this to return only those NF profiles of NF Instances allowing to be discovered from the SNPNs identified by this IE, according to the "allowedSnpns" list in the NF Profile and NF Service (see clauses 6.1.6.2.2 and 6.1.6.2.3). | Query-Params-Ext2 |
| target-nf-instance-id | NfInstanceId | O | 0..1 | Identity of the NF instance being discovered. | |
| target-nf-fqdn | Fqdn | O | 0..1 | FQDN of the target NF instance being discovered. | |
| hnrf-uri | Uri | C | 0..1 | If included, this IE shall contain the API URI of the NFDiscovery Service (see clause 6.2.1) of the home NRF. It shall be included if the Requester NF has previously received such API URI to be used for service discovery (e.g., from the NSSF in the home PLMN as specified in clause 6.1.6.2.11 of 3GPP TS 29.531 [42]). | |
| snssais | array(Snssai) | O | 1..N | If included, this IE shall contain the list of S-NSSAIs that are served by the NF (Service) Instances being discovered. The NRF shall return those NF profiles/NF services of NF (Service) Instances that have at least one of the S-NSSAIs in this list. The S-NSSAIs included in the NF profiles/NF services of NF (Service) Instances returned by the NRF shall be an interclause of the S-NSSAIs requested and the S-NSSAIs supported by those NF (Service) Instances. (NOTE 10) When the NF Profile of the NF Instances being discovered has defined the list of supported S-NSSAIs in the "perPlmnSnssaiList", the discovered NF Instances shall be those having any of the S-NSSAIs included in this "snssais" parameter in any of the PLMNs included in the "target-plmn-list" attribute, if present; if the "target-plmn-list" is not included, the NRF shall assume that the discovery request is for any of the PLMNs it supports. | |
| requester-snssais | array(Snssai) | O | 1..N | If included, this IE shall contain the list of S-NSSAI of the requester NF. If this IE is included in a service discovery in a different PLMN, the requester NF shall provide S-NSSAI values of the target PLMN, that correspond to the S-NSSAI values of the requester NF. The NRF shall use this to return only those NF profiles of NF Instances allowing to be discovered from at least one network slice identified by this IE, according to the "allowedNssais" list in the NF Profile and NF Service (see clause 6.1.6.2.2 and 6.1.6.2.3). (NOTE 12) | |
| plmn-specific-snssai-list | array(PlmnSnssai) | O | 1..N | If included, this IE shall contain the list of S-NSSAI that are served by the NF service being discovered for the corresponding PLMN provided. The NRF shall use this to | |

| | | | | identify the NF services that have registered their support for the S-NSSAIs for the corresponding PLMN given. The NRF shall return the NF profiles that have at least one S-NSSAI supported in any of the PLMNs provided in this list. The per PLMN list of S-NSSAIs included in the NF profile returned by the NRF shall be an interclause of the list requested and the list registered in the NF profile. (NOTE 10). | |
|---|---|---|---|---|---|
| requester-plmn-specific-snssai-list | array(PlmnSnssai) | O | 1..N | If included, this IE shall contain the list of S-NSSAI of the requester NF, for each of the PLMNs it supports. The NRF shall use this to return only those NF profiles of NF Instances allowing to be discovered from at least one network slice identified by this IE, according to the "allowedNssais" and "allowedPlmns" attributes in the NF Profile and NF Service (see clause 6.1.6.2.2 and 6.1.6.2.3). (NOTE 12) | Query-Params-Ext3 |
| nsi-list | array(string) | O | 1..N | If included, this IE shall contain the list of NSI IDs that are served by the services being discovered. | |
| dnn | Dnn | O | 0..1 | If included, this IE shall contain the DNN for which NF services serving that DNN is discovered. DNN may be included if the target NF type is e.g. "BSF", "SMF", "PCF", "PCSCF", "UPF", "EASDF", "TSCTSF" or "MB-SMF". The DNN shall contain the Network Identifier and it may additionally contain an Operator Identifier. (NOTE 11). If the Snssai(s) are also included, the NF services serving the DNN shall be available in the network slice(s) identified by the Snssai(s). | |
| smf-serving-area | string | O | 0..1 | If included, this IE shall contain the serving area of the SMF. It may be included if the target NF type is "UPF". | |
| tai | Tai | O | 0..1 | Tracking Area Identity. | |
| amf-region-id | AmfRegionId | O | 0..1 | AMF Region Identity. | |
| amf-set-id | AmfSetId | O | 0..1 | AMF Set Identity. | |
| guami | Guami | O | 0..1 | Guami used to search for an appropriate AMF. (NOTE 1) | |
| supi | Supi | O | 0..1 | If included, this IE shall contain the SUPI of the requester UE to search for an appropriate NF. SUPI may be included if the target NF type is e.g. "PCF", "CHF", "AUSF", "UDM" or "UDR". | |
| ue-ipv4-address | Ipv4Addr | O | 0..1 | The IPv4 address of the UE for which a BSF or P-CSCF needs to be discovered. | |
| ip-domain | string | O | 0..1 | The IPv4 address domain of the UE for which a BSF needs to be discovered. | |
| ue-ipv6-prefix | Ipv6Prefix | O | 0..1 | The IPv6 prefix of the UE for which a BSF or P-CSCF needs to be discovered. | |
| pgw-ind | boolean | O | 0..1 | When present, this IE indicates whether a combined SMF/PGW-C or a standalone SMF needs to be discovered.<br><br>true: A combined SMF/PGW-C is requested to be discovered;<br>false: A standalone SMF is requested to be discovered. (See NOTE 2) | |
| pgw | Fqdn | O | 0..1 | If included, this IE shall contain the PGW FQDN which is used by the AMF to find the combined SMF/PGW-C. | |
| pgw-ip | IpAddr | O | 0..1 | If included, this IE shall contain the PGW IP Address used by the AMF to find the combined SMF/PGW-C. | Query-SBIProtoc17 |
| gpsi | Gpsi | O | 0..1 | If included, this IE shall contain the GPSI of the requester UE to search for an appropriate NF. GPSI may be included if the target NF type is "CHF", "PCF", "UDM" or | |

| | | | | | |
|---|---|---|---|---|---|
| | | | | "UDR". | |
| external-group-identity | ExtGroupId | O | 0..1 | If included, this IE shall contain the external group identifier of the requester UE to search for an appropriate NF. This may be included if the target NF type is "UDM", "UDR" or "TSCTSF". | |
| pfd-data | PfdData | O | 0..1 | When present, this IE shall contain the application identifiers and/or application function identifiers in PFD management. This may be included if the target NF type is "NEF".<br>The NRF shall return those NEF instances which can provide the PFDs for at least one of the provided application identifiers, or for at least one of the provided application function identifiers. | Query-Params-Ext2 |
| data-set | DataSetId | O | 0..1 | Indicates the data set to be supported by the NF to be discovered. May be included if the target NF type is "UDR". | |
| routing-indicator | string | O | 0..1 | Routing Indicator information that allows to route network signalling with SUCI (see 3GPP TS 23.003 [12]) to an AUSF, AAnF and UDM instance capable to serve the subscriber. May be included if the target NF type is "AUSF", "AANF" or "UDM".<br>Pattern: "^[0-9]{1,4}$" | |
| group-id-list | array(NfGroupId) | O | 1..N | Identity of the group(s) of the NFs of the target NF type to be discovered. May be included if the target NF type is "UDR", "UDM", "HSS", "PCF", "AUSF" or "CHF". | |
| dnai-list | array(Dnai) | O | 1..N | If included, this IE shall contain the Data network access identifiers. It may be included if the target NF type is "UPF", "SMF", "EASDF" or "NEF". | |
| upf-iwk-eps-ind | boolean | O | 0..1 | When present, this IE indicates whether a UPF supporting interworking with EPS needs to be discovered.<br><br>true: A UPF supporting interworking with EPS is requested to be discovered;<br>false: A UPF not supporting interworking with EPS is requested to be discovered.<br>(NOTE 3) | |
| chf-supported-plmn | PlmnId | O | 0..1 | If included, this IE shall contain the PLMN ID that a CHF supports (i.e., in the PlmnRange of ChfInfo attribute in the NFProfile). This IE may be included when the target NF type is "CHF". | |
| preferred-locality | string | O | 0..1 | Preferred target NF location (e.g. geographic location, data center).<br>When present, the NRF shall prefer NF profiles with a locality attribute that matches the preferred-locality.<br>The NRF may return additional NFs in the response not matching the preferred target NF location, e.g. if no NF profile is found matching the preferred target NF location.<br>The NRF should set a lower priority for any additional NFs on the response not matching the preferred target NF location than those matching the preferred target NF location.<br>(NOTE 6) | |
| access-type | AccessType | C | 0..1 | If included, this IE shall contain the Access type which is required to be supported by the target Network Function (i.e. SMF). | |
| supported-features | SupportedFeatures | O | 0..1 | List of features required to be supported by the target Network Function.<br>This IE may be present only if the service-names attribute is present and if it contains a single service-name. It shall be ignored by the NRF otherwise.<br>(NOTE 4) | |
| required-features | array(SupportedFeatures) | O | 1..N | List of features required to be supported by the target Network Function, as defined by the supportedFeatures | Query-Params |

| | | | | attribute in NFService (see clauses 6.1.6.2.3 and 6.2.6.2.4).<br>This IE may be present only if the service-names attribute is present.<br>When present, the required-features attribute shall contain as many entries as the number of entries in the service-names attribute. The n$^{th}$ entry in the required-features attribute shall correspond to the n$^{th}$ entry in the service-names attribute. An entry corresponding to a service for which no specific feature is required shall be encoded as "0". | -Ext1 |
|---|---|---|---|---|---|
| complex-query | ComplexQuery | O | 0..1 | This query parameter is used to override the default logical relationship of query parameters. | Complex-Query |
| limit | integer | O | 0..1 | Maximum number of NFProfiles to be returned in the response.<br>Minimum: 1 | Query-Params-Ext1 |
| max-payload-size | integer | O | 0..1 | Maximum payload size (before compression, if any) of the response, expressed in kilo octets.<br>When present, the NRF shall limit the number of NF profiles returned in the response such as to not exceed the maximum payload size indicated in the request.<br>Default: 124. Maximum: 2000 (i.e. 2 Mo). | Query-Params-Ext1 |
| max-payload-size-ext | integer | O | 0..1 | Maximum payload size (before compression, if any) of the response, expressed in kilo octets.<br>When present, the NRF shall limit the number of NF profiles returned in the response such as to not exceed the maximum payload size indicated in the request.<br>This query parameter is used when the consumer supports payload size bigger than 2 million octets.<br>Default: 124 | Query-Params-Ext2 |
| pdu-session-types | array(PduSessionType) | O | 1..N | List of the PDU session type (s) requested to be supported by the target Network Function (i.e UPF). | Query-Params-Ext1 |
| event-id-list | array(EventId) | O | 1..N | If present, this attribute shall contain the list of events requested to be supported by the Nnwdaf AnalyticsInfo Service, the NRF shall return NF which support all the requested events. | Query-Param-Analytics |
| nwdaf-event-list | array(NwdafEvent) | O | 1..N | If present, this attribute shall contain the list of events requested to be supported by the Nnwdaf_EventsSubscription service, the NRF shall return NF which support all the requested events. | Query-Param-Analytics |
| atsss-capability | AtsssCapability | O | 0..1 | When present, this IE indicates the ATSSS capability of the target UPF needs to be supported. | MAPDU |
| upf-ue-ip-addr-ind | boolean | O | 0..1 | When present, this IE indicates whether a UPF supporting allocating UE IP addresses/prefixes needs to be discovered.<br><br>true: a UPF supporting UE IP addresses/prefixes allocation is requested to be discovered;<br>false: a UPF not supporting UE IP addresses/prefixes allocation is requested to be discovered. | Query-Params-Ext2 |
| client-type | ExternalClientType | O | 0..1 | When present, this IE indicates that NF(s) dedicatedly serving the specified Client Type needs to be discovered. This IE may be included when target NF Type is "LMF" and "GMLC".<br><br>If no NF profile is found dedicately serving the requested client type, the NRF may return NF(s) not dedicatedly serving the request client type in the response. | Query-Params-Ext2 |
| lmf-id | LMFIdentification | O | 0..1 | When present, this IE shall contain LMF identification to be discovered.This may be included if the target NF type is "LMF". | Query-Params-Ext2 |
| an-node- | AnNodeType | O | 0..1 | If included, this IE shall contain the AN Node type which | Query- |

| type | | | | is required to be supported by the target Network Function (i.e. LMF). | Params-Ext2 |
|---|---|---|---|---|---|
| rat-type | RatType | O | 0..1 | If included, this IE shall contain the RAT type which is required to be supported by the target Network Function (i.e. LMF). | Query-Params-Ext2 |
| target-snpn | PlmnIdNid | C | 0..1 | This IE shall be included when NF services of a specific SNPN need to be discovered. When included, this IE shall contain the PLMN ID and NID of the target NF. This IE shall also be included in SNPN scenarios, when the entity owning the subscription, the Credentials Holder (see clause 5.30.2.9 in 3GPP TS 23.501 [2]) is an SNPN. | Query-Params-Ext2 |
| af-ee-data | AfEventExposureData | O | 0..1 | When present, this shall contain the application events, and optionally application function identifiers, application identifiers of the AF(s). This may be included if the target NF type is "NEF". | Query-Params-Ext2 |
| w-agf-info | WAgfInfo | O | 0..1 | If included, this IE shall contain the W-AGF identifiers of N3 terminations which is received by the SMF to find the combined W-AGF/UPF. | Query-Params-Ext2 |
| tngf-info | TngfInfo | O | 0..1 | If included, this IE shall contain the TNGF identifiers of N3 terminations which is received by the SMF to find the combined TNGF/UPF. | Query-Params-Ext2 |
| twif-info | TwifInfo | O | 0..1 | If included, this IE shall contain the TWIF identifiers of N3 terminations which is received by the SMF to find the combined TWIF/UPF. | Query-Params-Ext2 |
| target-nf-set-id | NfSetId | O | 0..1 | When present, this IE shall contain the target NF Set ID (as defined in clause 28.12 of 3GPP TS 23.003 [12]) of the NF instances being discovered. | Query-Params-Ext2 |
| target-nf-service-set-id | NfServiceSetId | O | 0..1 | When present, this IE shall contain the target NF Service Set ID (as defined in clause 28.13 of 3GPP TS 23.003 [12]) of the NF service instances being discovered.<br><br>If this IE is provided together with the target-nf-set-id IE, the NRF shall return service instances of the NF Service Set indicated in the request and should additionally return equivalent ones, if any. | Query-Params-Ext2 |
| preferred-tai | Tai | O | 0..1 | When present, the NRF shall prefer NF profiles that can serve the TAI, or the NRF shall return NF profiles not matching the TAI if no NF profile is found matching the TAI.<br>(NOTE 5) | Query-Params-Ext2 |
| nef-id | NefId | O | 0..1 | When present, this IE shall contain the NEF ID of the NEF to be discovered. This may be included if the target NF type is "NEF". (NOTE 7) | Query-Params-Ext2 |
| preferred-nf-instances | array(NfInstanceId) | O | 1..N | When present, this IE shall contain a list of preferred candidate NF instance IDs. (NOTE 8) | Query-Params-Ext2 |
| notification-type | NotificationType | O | 0..1 | If included, this IE shall contain the notification type of default notification subscriptions that shall be registered in the NFProfile or NFService of the NF Instances being discovered. The NF profiles returned by the NRF shall contain all the registered default notification subscriptions, including the one corresponding to the notification-type parameter.<br>(NOTE 9) | Query-Params-Ext2 |
| n1-msg-class | N1MessageClass | O | 0..1 | This IE may be included when "notification-type" IE is present with value "N1_MESSAGES".<br><br>When included, this IE shall contain the N1 message class of default notification subscriptions that shall be registered in the NFProfile or NFService of the NF Instances being discovered. The NF profiles returned by the NRF shall contain all the registered default notification subscriptions, including the one | Query-Params-Ext3 |

| | | | | corresponding to the n1-msg-class parameter. (NOTE 9) | |
|---|---|---|---|---|---|
| n2-info-class | N2Information Class | O | 0..1 | This IE may be included when "notification-type" IE is present with value "N2_INFORMATION".<br><br>If included, this IE shall contain the notification type of default notification subscriptions that shall be registered in the NFProfile or NFService of the NF Instances being discovered. The NF profiles returned by the NRF shall contain all the registered default notification subscriptions, including the one corresponding to the n2-info-class parameter.<br>(NOTE 9) | Query-Params-Ext3 |
| serving-scope | array(string) | O | 1..N | If present, this attribute shall contain the list of areas that can be served by the NF instances to be discovered. The NRF shall return NF profiles of NFs which can serve all the areas requested in this query parameter.<br>(NOTE 18) | Query-Params-Ext2 |
| imsi | string | O | 0..1 | If included, this IE shall contain the IMSI of the requester UE to search for an appropriate NF. IMSI may be included if the target NF type is "HSS".<br>pattern: "^[0-9]{5,15}$" | Query-Params-Ext2 |
| ims-private-identity | string | O | 0..1 | If included, this IE shall contain the IMS Private Identity of the requester UE to search for an appropriate NF. IMS Private Identity may be included if the target NF type is "HSS". | Query-Params-Ext3 |
| ims-public-identity | string | O | 0..1 | If included, this IE shall contain the IMS Public Identity of the requester UE to search for an appropriate NF. IMS Public Identity may be included if the target NF type is "HSS". | Query-Params-Ext3 |
| msisdn | string | O | 0..1 | If included, this IE shall contain the MSISDN of the requester UE to search for an appropriate NF. IMS Public Identity may be included if the target NF type is "HSS". | Query-Params-Ext3 |
| internal-group-identity | GroupId | O | 0..1 | If included, this IE shall contain the internal group identifier of the UE to search for an appropriate NF. This may be included if the target NF type is "UDM" | Query-Params-Ext2 |
| preferred-api-versions | map(string) | O | 1..N | When present, this IE indicates the preferred API version of the services that are supported by the target NF instances. The key of the map is the ServiceName (see clause 6.1.6.3.11) for which the preferred API version is indicated. Each element carries the API Version Indication for the service indicated by the key. The NRF may return additional NFs in the response not matching the preferred API versions, e.g. if no NF profile is found matching the preferred-api-versions.<br><br>An API Version Indication is a string formatted as {operator}+{API Version}.<br><br>The following operators shall be supported:<br><br>"="     match a version equals to the version value indicated.<br>">"     match any version greater than the version value indicated<br>">="   match any version greater than or equal to the version value indicated<br>"<"     match any version less than the version value indicated<br>"<="   match any version less than or equal to the version value indicated<br>"^"     match any version compatible with the version indicated, i.e. any version with the same major | Query-Params-Ext2 |

| | | | | version as the version indicated.<br><br>Precedence between versions is identified by comparing the Major, Minor, and Patch version fields numerically, from left to right.<br><br>If no operator or an unknown operator is provided in API Version Indication, "=" operator is applied.<br><br>Example of API Version Indication:<br><br>Case1: "=1.2.4.operator-ext" or "1.2.4.operator-ext" means matching the service with API version "1.2.4.operator-ext"<br>Case2: ">1.2.4" means matching the service with API versions greater than "1.2.4"<br>Case3: "^2.3.0" or "^2" means matching the service with all API versions with major version "2". | |
|---|---|---|---|---|---|
| v2x-support-ind | boolean | O | 0..1 | When present, this IE indicates whether a PCF supporting V2X Policy/Parameter provisioning needs to be discovered.<br><br>true: a PCF supporting V2X Policy/Parameter provisioning is requested to be discovered;<br>false: a PCF not supporting V2X Policy/Parameter provisioning is requested to be discovered. | Query-Params-Ext2 |
| redundant-gtpu | boolean | O | 0..1 | When present, this IE indicates whether a UPF supporting redundant GTP-U path needs to be discovered.<br><br>true: a UPF supporting redundant GTP-U path is requested to be discovered;<br>false: a UPF not supporting redundant GTP-U path is requested to be discovered. | Query-Params-Ext2 |
| redundant-transport | boolean | O | 0..1 | When present, this IE indicates whether a UPF supporting redundant transport path on the transport layer in the corresponding network slice needs to be discovered.<br><br>true: a UPF supporting redundant transport path on the transport layer is requested to be discovered;<br>false: a UPF not supporting redundant transport path on the transport layer is requested to be discovered.<br><br>If the Snssai(s) are also included, the UPF supporting redundant transport path on the transport layer shall be available in the network slice(s) identified by the Snssai(s). | Query-Params-Ext2 |
| ipups | boolean | O | 0..1 | When present, this IE indicates whether a UPF which is configured for IPUPS is requested to be discovered.<br><br>true: a UPF which is configured for IPUPS is requested to be discovered;<br>false: a UPF which is not configured for IPUPS is requested to be discovered. | Query-Params-Ext2 |
| scp-domain-list | array(string) | O | 1..N | When present, this IE shall contain the SCP domain(s) the target NF, SCP or SEPP belongs to. The NRF shall return NF, SCP or SEPP profiles that belong to all the SCP domains provided in this list. | Query-Params-Ext2 |
| address-domain | Fqdn | O | 0..1 | If included, this IE shall contain the address domain that shall be reachable through the SCP. This IE may be included when the target NF type is "SCP". | Query-Params-Ext2 |
| ipv4-addr | Ipv4Addr | O | 0..1 | If included, this IE shall contain the IPv4 address that shall be reachable through the SCP. This IE may be | Query-Params |

| | | | | | |
|---|---|---|---|---|---|
| | | | | included when the target NF type is "SCP". | -Ext2 |
| ipv6-prefix | Ipv6Prefix | O | 0..1 | If included, this IE shall contain the IPv6 prefix that shall be reachable through the SCP. This IE may be included when the target NF type is "SCP". | Query-Params-Ext2 |
| served-nf-set-id | NfSetId | O | 0..1 | When present, this IE shall contain the NF Set ID that shall be reachable through the SCP. This IE may be included when the target NF type is "SCP". | Query-Params-Ext2 |
| remote-plmn-id | PlmnId | O | 0..1 | If included, this IE shall contain the remote PLMN ID that shall be reachable through the SCP or SEPP. This IE may be included when the target NF type is "SCP" or "SEPP". | Query-Params-Ext2 |
| data-forwarding | boolean | O | 0..1 | This may be included if the target NF type is "UPF". (NOTE 13)<br><br>When present, the IE indicates whether UPF(s) configured for data forwarding needs to be discovered.<br><br>true: UPF(s) configured for data forwarding is requested to be discovered;<br>false: UPF(s) not configured for data forwarding is requested to be discovered. | Query-Params-Ext2 |
| preferred-full-plmn | boolean | O | 0..1 | When present, the NRF shall prefer NF profile(s) that can serve the full PLMN (i.e. can serve any TAI in the PLMN), or the NRF shall return other NF profiles if no NF profile serving the full PLMN is found:<br><br>- true: NF instance(s) serving the full PLMN is preferred;<br>- false: NF instance(s) serving the full PLMN is not preferred.<br><br>(NOTE 14) | Query-Params-Ext2 |
| requester-features | SupportedFeatures | C | 0..1 | Nnrf_NFDiscovery features supported by the Requester NF that is invoking the Nnrf_NFDiscovery service.<br>This IE shall be included if at least one feature is supported by the Requester NF. | |
| realm-id | string | O | 0..1 | May be included if the target NF type is "UDSF". If included, this IE shall contain the realm-id for which a UDSF shall be discovered. | Query-Params-Ext4 |
| storage-id | string | O | 0..1 | May be included if the target NF type is "UDSF" and realm-id is included. If included, this IE shall contain the storage-id for the realm-id indicated in the realm-id IE for which a UDSF shall be discovered. | Query-Params-Ext4 |
| vsmf-support-ind | boolean | O | 0..1 | If included, this IE shall indicate that target SMF(s) that support V-SMF Capability are preferred.<br><br>This IE may be included when the target NF type is "SMF".<br><br>(NOTE 15) | Query-Param-vSmf-Capability |
| nrf-disc-uri | Uri | C | 0..1 | If included, this IE shall contain the API URI of the NFDiscovery Service (see clause 6.2.1) of the NRF holding the NF Profile.<br><br>It shall be included if:<br>- the target-nf-instance-id is present;<br><br>- the NF Service Consumer has previously received such API URI in an earlier NF service discovery, i.e. if the target NF instance was provided in the nfInstanceList attribute in SearchResult (see clause 6.2.6.2.2) and the nrfDiscApiUri attribute was present in the NfInstanceInfo (see clause 6.2.6.2.x); and | Enh-NF-Discovery |

| | | | - the service discovery request is addressed to a different NRF than the NRF holding the NF profile. | |
|---|---|---|---|---|

| preferred-vendor-specific-features | map(map(array(VendorSpecificFeature))) | O | 1..N(1..M(1..L)) | When present, this IE indicates the list of preferred vendor-specific features supported by the target Network Function, as defined by the supportedVendorSpecificFeatures attribute in NFService (see clauses 6.1.6.2.3 and 6.2.6.2.4). NF profiles that support all the preferred features, or by default, NF profiles that contain at least one service supporting the preferred features, should be preferentially returned in the response; NF profiles in the response may not support the preferred features.<br><br>The key of the external map is the ServiceName (see clause 6.1.6.3.11) for which the preferred vendor-specific features is indicated. Each element carries the preferred vendor-specific features for the service indicated by the key.<br><br>The key of the internal map is the IANA-assigned "SMI Network Management Private Enterprise Codes" [38]. The string used as key of the internal map shall contain 6 decimal digits; if the SMI code has less than 6 digits, it shall be padded with leading digits "0" to complete a 6-digit string value.<br>The value of each entry of the map shall be a list (array) of VendorSpecificFeature objects.<br><br>The NF profiles returned by the NRF shall include the full list of vendor-specific-features and not just the interclause of supported and preferred vendor-specific features. | Query-SBIProtoc17 |
|---|---|---|---|---|---|
| preferred-vendor-specific-nf-features | map(array(VendorSpecificFeature)) | O | 1..N(1..M) | When present, this IE indicates the list of preferred vendor-specific features supported by the target Network Function, as defined by the supportedVendorSpecificFeatures attribute in NF profile (see clause 6.1.6.2.2 and 6.2.6.2.3). NF profiles that support all the preferred features should be preferentially returned in the response. NF profiles in the response may not support the preferred features.<br><br>The key of the map is the IANA-assigned "SMI Network Management Private Enterprise Codes" [38]. The value of each entry of the map shall be a list (array) of VendorSpecificFeature objects.<br><br>The NF profiles returned by the NRF shall include the full list of vendor-specific features and not just the interclause of supported and preferred vendor-specific features. | Query-SBIProtoc17 |
| required-pfcp-features | string | O | 0..1 | List of features required to be supported by the target UPF (when selecting a UPF), encoded as defined for the supportedPfcpFeatures attribute in UpfInfo (see clause 6.1.6.2.13).<br><br>(NOTE 16) | Query-Upf-Pfcp |
| home-pub-key-id | integer | O | 0..1 | When present, this IE shall indicate the Home Network Public Key ID which shall be able to be served by the NF instance.<br>May be included if the target NF type is "AUSF" or "UDM". (NOTE 17) | Query-SBIProtoc17 |
| prose-support-ind | boolean | O | 0..1 | When present, this IE indicates whether supporting ProSe capability by PCF needs to be discovered.<br><br>true: a PCF supporting ProSe capability is requested to be discovered; | Query-5G-ProSe |

| | | | | false: a PCF not ProSe capability is requested to be discovered. | |
|---|---|---|---|---|---|
| analytics-aggregation-ind | boolean | O | 0..1 | If included, this IE shall contain the analytics aggregation capability indication of the NF being discovered. This IE may be included when the target NF type is "NWDAF". | Query-eNA-PH2 |
| analytics-metadata-prov-ind | boolean | O | 0..1 | If included, this IE shall contain the analytics metadata provisioning capability indication of the NF being discovered. This IE may be included when the target NF type is "NWDAF". | Query-eNA-PH2 |
| serving-nf-set-id | NfSetId | O | 0..1 | When present, this IE shall contain the NF Set ID that is served by the DCCF, NWDAF or MFAF. This IE may be included when the target NF type is "DCCF" or "NWDAF" or "MFAF". | Query-eNA-PH2 |
| serving-nf-type | NFType | O | 0..1 | When present, this IE shall contain the NF type that is served by the DCCF, NWDAF or MFAF. This IE may be included when the target NF type is "DCCF" or "NWDAF" or "MFAF". | Query-eNA-PH2 |
| ml-analytics-id-list | array(NwdafEvent) | O | 1..N | If present, this attribute shall contain the list of analytics Id(s) requested to be supported by the Nnwdaf_MLModelProvision Service, the NRF shall return NF which support all the requested analytics Id(s). | Query-eNA-PH2 |
| nsacf-serving-area | string | O | 0..1 | If included, this IE shall contain the serving area of the NSACF. It may be included if the target NF type is "NSACF". | NSAC |
| nsacf-capability | NsacfCapability | O | 0..1 | When present, this IE indicates the service capability that the target NSACF needs to support. | NSAC |
| mbs-session-id-list | array(MbsSessionId) | O | 0..1 | This IE may be present if the target NF type is "MB-SMF".<br>When present, it shall contain the list of MBS Session ID(s) for which MB-SMF(s) are to be discovered.<br>When present, for each mbs-session-id in the list, the NRF shall determine whether an MB-SMF supporting the mbs-session-id and complying with the other query parameters (if any) exists. An MB-SMF shall be considered to support the mbs-session-id if:<br>   - the mbs-session-id contains a TMGI that is part of a TMGI range (see tmgiRangeList attribute in clause 6.1.6.2.85) registered by the MB-SMF and, if the tai query parameter is present:<br>      - if the TAI indicated in the tai query parameter can be served by the MB-SMF (see taiList and taiRangeList attributes in clause 6.1.6.2.85);<br>or<br>   - the mbs-session-id contains a TMGI or an SSM address, that is part of the list of MBS sessions currently served by the MB-SMF (see mbsSessionList attribute in clause 6.1.6.2.85) and, if the tai query parameter is present and the MBS session is registered with an MBS Service Area (see mbsServiceArea in clause 6.1.6.2.90):<br>      - if the TAI indicated in the tai query parameter is supported by the MBS Service Area of the MBS session.<br>If so, the NRF shall return the profile of this MB-SMF. If no MB-SMF supporting the mbs-session-id and complying with the other query parameters exists, the NRF shall return MB-SMF profiles based on the other query parameters, e.g. profiles of MB-SMF(s) that can serve the TAI indicated in the tai query parameters. | Query-MBS |

| | | | | See clause 7.1.2 of 3GPP TS 23.247 [43]. | |
|---|---|---|---|---|---|
| preferred-para-precedence | array(string) | O | 2..N | This IE may be present when multiple preferred query parameters are included for the discovery.<br><br>When present, this IE shall indicate the precedence of the preferred query parameters (from higher precedence to lower precedence). The NRF shall use the indicated precedence to decide the priority for candidate NFs in the search result.<br><br>Example:<br><br>preferred-para-precedence=[preferred-tai, preferred-vendor-specific-features]<br><br>The above value indicates that "preferred-tai" parameter has higher precedence than "preferred-vendor-specific-features" parameter. | Query-SBIProtoc17 |

NOTE 1: If this parameter is present and no AMF supporting the requested GUAMI is available due to AMF Failure or planned AMF removal, the NRF shall return in the response AMF instances acting as a backup for AMF failure or planned AMF removal respectively for this GUAMI (see clause 6.1.6.2.11). The NRF can detect if an AMF has failed, using the Heartbeat procedure. The NRF will receive a de-registration request from an AMF performing a planned removal.

NOTE 2: If the combined SMF/PGW-C is requested to be discovered, the NRF shall return in the response the SMF instances registered with the SmfInfo containing pgwFqdn.

NOTE 3: If a UPF supporting interworking with EPS is requested to be discovered, the NRF shall return in the response the UPF instances registered with the upfInfo containing iwkEpsInd set to true.

NOTE 4: This attribute has a different semantic than what is defined in clause 6.6.2 of 3GPP TS 29.500 [4], i.e. it is not used to signal optional features of the Nnrf_NFDiscovery Service API supported by the requester NF.

NOTE 5: The AMF may perform the SMF discovery based on the dnn, snssais and preferred-tai during a PDU session establishment procedure, and the NRF shall return the SMF profiles matching all if possible, or the SMF profiles only matching dnn and snssais. If the SMF profiles only matching dnn and snssais are returned, the AMF shall insert an I-SMF. An SMF may also perform a UPF discovery using this parameter.

NOTE 6: The SMF may select the P-CSCF close to the UPF by setting the preferred-locality to the value of the locality of the UPF.

NOTE 7: During EPS to 5GS idle mobility procedure, the Requester NF (i.e. SMF) discovers the anchor NEF for NIDD using the SCEF ID received from EPS as the value of the NEF ID, as specified in clause 4.11.1.3.3 of 3GPP TS 23.502 [3].

NOTE 8: The service consumer may include a list of preferred-nf-instance-ids in the query. If so, the NRF shall first check if the NF profiles of the preferred NF instances match the other query parameters, and if so, then the NRF shall return the corresponding NF profiles; otherwise, the NRF shall return a list of candidate NF profiles matching the query parameters other than the preferred-nf-instance-ids. For example, the target AMF may set this query parameter to the SMF Instance ID and I-SMF Instance ID during an inter AMF mobility procedure to select an I-SMF.

NOTE 9: This parameter may be used by the SCP (with other query parameters) to discover and select a NF service consumer with a default notification subscription supporting the notification type of a notification request (see clause 6.10.3.3 of 3GPP TS 29.500 [4]).

NOTE 10: An S-NSSAI value used in discovery request query parameters shall be considered as matching the S-NSSAI value in the NF Profile or NF Service of a given NF Instance if both the SST and SD components are identical (i.e. an S-NSSAI value where SD is absent, shall not be considered as matching an S-NSSAI where SD is present, regardless if SST is equal in both).

NOTE 11: The dnn query parameter shall be considered as matching a DNN attribute in the NF Profile of a given NF Instance if:
- both contain the same Network Identifier and Operator Identifier;
- both contain the same Network Identifier and none contains an Operator Identifier;
- the dnn query parameter contains the Network Identifier only, the DNN value in the NF Profile contains both the Network Identifier and Operator Identifier, and both contain the same Network Identifier; or
- the dnn query parameter contains both the Network Identifier and Operator Identifier, the DNN value in the NF Profile contains the Network Identifier only, both contain the same Network Identifier and the Operator Identifier matches one PLMN of the NF (i.e. plmnList of the NF

| | Profile). |
|---|---|
| NOTE 12: | Based on operator's policies, a discovery request not including the requester's information necessary to validate the authorization parameters in NF Profiles may be rejected or accepted but with only returning in the discovery response NF Instances whose authorization parameters allow any NF Service Consumer to access their services. The authorization parameters in NF Profile are those used by NRF to determine whether a given NF Instance / NF Service Instance can be discovered by an NF Service Consumer in order to consume its offered services (e.g. "allowedNfTypes", "allowedNfDomains", etc.). |
| NOTE 13: | Different UPF instances for data forwarding may be configured in the network e.g. for different serving areas. The SMF may use this query parameter together with others (like SMF Serving Area or TAI) in discovery to select the UPF candidate for data forwarding. |
| NOTE 14: | For HR roaming, if the V-PLMN requires Deployments Topologies with specific SMF Service Areas (DTSSA) but no H-SMF can be selected supporting V-SMF change, AMF may use this query parameter to select a V-SMF serving the full VPLMN if available. |
| NOTE 15: | The AMF may perform discovery with this parameter to find V-SMF(s), and the NRF shall return the SMF profiles that explicitly indicated support of V-SMF capability. When performing discovery, the AMF shall use other query parameters together with this IE to ensure the required configurations and/or features are supported by the V-SMF, e.g. required Slice for the PDU session, support of DTSSA feature if V-SMF change is required for PDU Session, etc. If no SMF instances that explicitly indicated support of V-SMF capability can be matched for the discovery, the NRF shall return matched SMF instances not indicating support of V-SMF capability explicitly, i.e. the SMF instances not registered vsmfSupportInd IE in the NF profile but matched to the rest query parameters, if available. |
| NOTE 16: | When required-pfcp-features is used as query parameter, the NRF shall return a list of candidate UPFs supporting all the required PFCP features. The NRF may also return UPF profiles not including the "SupportedPfcpFeatures" attribute (e.g. pre-Rel-17 UPFs) but matching the other query parameters. The NF Service Consumer, e.g. a SMF, when using required-pfcp-features as query parameter, shall also include the query parameter corresponding to the UPF features (atsss-capability, upf-ue-ip-addr-ind, redundant-gtpu) which correspond to the PFCP feature flags MPTCP and ATSSS_LL, UEIP, and RTTL respectively, if the corresponding PFCP feature is required. For example an SMF, that wishes to select a UPF supporting UE IP Address Allocation by the UP function, shall set the UEIP flag to "1" in the required-pfcp-features and also include the upf-ue-ip-addr-ind parameter set to "true". |
| NOTE 17: | This may only be used by the HPLMN in roaming scenarios in this release of the specification, i.e. an AMF in a visited network does not use the Home Network Public Key ID for AUSF/UDM selection. |
| NOTE 18: | The NF service consumer may derive the serving scope from e.g. the TAI of the UE, using local configuration. This parameter may be used to discover any NF that registers to the NRF, e.g. a 5GC NF or a P-CSCF. |

The default logical relationship among the query parameters is logical "AND", i.e. all the provided query parameters shall be matched, with the exception of the "preferred-locality", "preferred-nf-instances", "preferred-tai", "preferred-api-versions", "preferred-full-plmn" and "mbs-session-id" query parameters (see Table 6.2.3.2.3.1-1).

The NRF may support the Complex query expression as defined in 3GPP TS 29.501 [5] for the NF Discovery service. If the "complexQuery" query parameter is included, then the logical relationship among the query parameters contained in "complexQuery" query parameter is as defined in 3GPP TS 29.571 [7].

A NRF not supporting Complex query expression shall reject a NF service discovery request including a complexQuery parameter, with a ProblemDetails IE including the cause attribute set to INVALID_QUERY_PARAM and the invalidParams attribute indicating the complexQuery parameter.

This method shall support the request data structures specified in table 6.1.3.2.3.1-2 and the response data structures and response codes specified in table 6.1.3.2.3.1-3.

Table 6.2.3.2.3.1-2: Data structures supported by the GET Request Body on this resource

| Data type | P | Cardinality | Description |
|---|---|---|---|
| n/a | | | |

Table 6.2.3.2.3.1-3: Data structures supported by the GET Response Body on this resource

| Data type | P | Cardinality | Response codes | Description |
|---|---|---|---|---|
| SearchResult | M | 1 | 200 OK | The response body contains the result of the search over the list of registered NF Instances. |
| RedirectResponse | O | 0..1 | 307 Temporary Redirect | The response shall be used when the intermediate NRF redirects the service discovery request.<br>The NRF shall include in this response a Location header field containing a URI pointing to the resource located on the redirect target NRF.<br>If an SCP redirects the message to another SCP then the location header field shall contain the same URI or a different URI pointing to the endpoint of the NF service producer to which the request should be sent. |
| ProblemDetails | O | 0..1 | 400 Bad Request | The response body contains the error reason of the request message.<br><br>If the query parameter used to match the authorization parameter is required but not provided in the NF discovery request, the "cause" attribute shall be set to "MANDATORY_QUERY_PARAM_MISSING", and the missing query parameter shall be indicated. |
| ProblemDetails | O | 0..1 | 403 Forbidden | This response shall be returned if the Requester NF is not allowed to discover the NF Service(s) being queried. |
| ProblemDetails | O | 0..1 | 404 Not Found | This response shall be returned if the requested resource URI as defined in clause 6.2.3.2.2 (query parameter not considered) is not found in the server.<br><br>It may also be sent in hierarchical NRF deployments when the NRF needs to forward/redirect the request to another NRF but lacks information in the request to do so; similarly, the NRF shall return this response code when it is received from the upstream NRF. |
| ProblemDetails | O | 0..1 | 500 Internal Server Error | The response body contains the error reason of the request message. |

Table 6.2.3.2.3.1-4: Headers supported by the GET method on this endpoint

| Name | Data type | P | Cardinality | Description |
|---|---|---|---|---|
| If-None-Match | string | C | 0..1 | Validator for conditional requests, as described in IETF RFC 7232 [19], clause 3.2 |

Table 6.2.3.2.3.1-5: Headers supported by the 200 Response Code on this endpoint

| Name | Data type | P | Cardinality | Description |
|---|---|---|---|---|
| Cache-Control | string | C | 0..1 | Cache-Control containing max-age, described in IETF RFC 7234 [20], clause 5.2 |
| ETag | string | C | 0..1 | Entity Tag containing a strong validator, described in IETF RFC 7232 [19], clause 2.3 |

Table 6.2.3.2.3.1-6: Headers supported by the 307 Response Code on this endpoint

| Name | Data type | P | Cardinality | Description |
|---|---|---|---|---|
| Location | string | M | 1 | The URI pointing to the resource located on the redirect target NRF |

Table 6.2.3.2.3.1-7: Links supported by the 200 Response Code on this endpoint

| Name | Resource name | HTTP method or custom operation | Parameters table | Description |
|---|---|---|---|---|
| search | Stored Search (Document) | GET | 6.2.3.2.3.1-8 | The 'searchId' parameter returned in the response can be used as the 'searchId' parameter in the GET request to '/searches/{searchId}' |
| completeSearch | Complete Stored Search (Document) | GET | 6.2.3.2.3.1-9 | The 'searchId' parameter returned in the response can be used as the 'searchId' parameter in the GET request to '/searches/{searchId}/complete' |

* * * Next Change * * * *

6.2.9 Features supported by the NFDiscovery service

The syntax of the supportedFeatures attribute is defined in clause 5.2.2 of 3GPP TS 29.571 [7].

The following features are defined for the Nnrf_NFDiscovery service.

Table 6.2.9-1: Features of supportedFeatures attribute used by Nnrf_NFDiscovery service

| Feature Number | Feature | M/O | Description |
|---|---|---|---|
| 1 | Complex-Query | O | Support of Complex Query expression (see clause 6.2.3.2.3.1) |
| 2 | Query-Params-Ext1 | O | Support of the following query parameters:<br>- limit<br>- max-payload-size<br>- required-features<br>- pdu-session-types |
| 3 | Query-Param-Analytics | O | Support of the query parameters for Analytics identifier:<br>- event-id-list<br>- nwdaf-event-list |
| 4 | MAPDU | O | This feature indicates whether the NRF supports selection of UPF with ATSSS capability. |
| 5 | Query-Params-Ext2 | O | Support of the following query parameters:<br>- requester-nf-instance-id<br>- upf-ue-ip-addr-ind<br>- pfd-data<br>- target-snpn<br>- af-ee-data<br>- w-agf-info<br>- tngf-info<br>- twif-info<br>- target-nf-set-id<br>- target-nf-service-set-id<br>- preferred-tai<br>- nef-id<br>- preferred-nf-instances<br>- notification-type<br>- serving-scope<br>- internal-group-identity<br>- preferred-api-versions<br>- v2x-support-ind<br>- redundant-gtpu<br>- redundant-transport<br>- lmf-id<br>- an-node-type<br>- rat-type<br>- ipups<br>- scp-domain-list<br>- address-domain<br>- ipv4-addr<br>- ipv6-prefix<br>- served-nf-set-id<br>- remote-plmn-id<br>- data-forwarding<br>- preferred-full-plmn<br>- requester-snpn-list<br>- max-payload-size-ext<br>- client-type |
| 6 | Service-Map | M | This feature indicates whether it is supported to identify the list of NF Service Instances as a map (i.e. the "nfServiceList" attribute of NFProfile is supported). |
| 7 | Query-Params-Ext3 | O | Support of the following query parameters:<br>- ims-private-identity<br>- ims-public-identity<br>- msisdn<br>- requester-plmn-specific-snssai-list<br>- n1-msg-class<br>- n2-info-class |

| | | | |
|---|---|---|---|
| 8 | Query-Params-Ext4 | O | Support of the following query parameters:<br>- realm-id<br>- storage-id |
| 9 | Query-Param-vSmf-Capability | O | Support of the query parameters for V-SMF Capability:<br>- vsmf-support-ind |
| 10 | Enh-NF-Discovery | O | Enhanced NF Discovery<br>This feature indicates whether it is supported to return the nfInstanceList IE in the NF Discovery response. |
| 11 | Query-SBIProtoc17 | O | Support of the following query parameters, for Service Based Interface Protocol Improvements defined in 3GPP Rel-17::<br>- preferred-vendor-specific-features<br>- preferred-vendor-specific-nf-features<br>- home-pub-key-id<br>- pgw-ip<br>- preferred-para-precedence |
| 12 | SCPDRI | O | SCP Domain Routing Information<br><br>An NRF supporting this feature shall allow a service consumer (i.e. a SCP) to get the SCP Domain Routing Information and subscribe/unsubscribe to the change of SCP Domain Routing Information with following service operations:<br>- SCPDomainRoutingInfoGet (see clause 5.3.2.3)<br>- SCPDomainRoutingInfoSubscribe (see clause 5.3.2.4)<br>- SCPDomainRoutingInfoUnsubscribe (see clause 5.3.2.6)<br><br>A service consumer (i.e. a SCP) supporting this feature shall be able to handle SCPDomainRoutingInfoNotify as specified in clause 5.3.2.5, if subscribed to the change of SCP Domain Routing Information in the NRF. |
| 13 | Query-Upf-Pfcp | O | This feature indicates whether the NRF supports selection of UPF with required UP function features as defined in 3GPP TS 29.244 [21]. |
| 14 | Query-5G-ProSe | O | Support of the following query parameters, for Proximity based Services in 5GS defined in 3GPP Rel-17::<br>- prose-support-ind |
| 15 | NSAC | O | This feature indicates the NSACF serving area and service capability. Support of the following query parameters:<br>nsacf-serving-area<br>nsacf-capability |
| 16 | Query-MBS | O | Support of the following query parameters, for Multicast and Broadcast Services defined in 3GPP Rel-17:<br>- mbs-session-id-list |
| 17 | Query-eNA-PH2 | O | Support of the following query parameters, for Enhanced Network Automation Phase 2 defined in 3GPP Rel-17:<br>- analytics-aggregation-ind<br>- serving-nf-set-id<br>- serving-nf-type<br>- ml-analytics-id-list<br>- analytics-metadata-prov-ind |
| Feature number: The order number of the feature within the supportedFeatures attribute (starting with 1).<br>Feature: A short name that can be used to refer to the bit and to the feature.<br>M/O: Defines if the implementation of the feature is mandatory ("M") or optional ("O").<br>Description: A clear textual description of the feature.<br>NOTE 1: An NRF that advertises support of a given feature shall support all the query parameters associated with the feature. An NRF may support none or a subset of the query parameters of features that it does not advertise as supported.<br>NOTE 2: For a release under development, it is recommended to define new features for new query parameters by grouping them per 3GPP work item. Any definition of new query parameters in a frozen release requires a new feature definition. ||||

\* \* \* Next Change \* \* \* \*

A.3 Nnrf_NFDiscovery API

```
openapi: 3.0.0
```

**\*\*\*\*\*\*\*\*\*\*\*\*\*\*\*\* Text Skipped for Clarity \*\*\*\*\*\*\*\*\*\*\*\*\*\*\*\***

```
paths:
  /nf-instances:
    get:
      summary: Search a collection of NF Instances
      operationId: SearchNFInstances
      tags:
        - NF Instances (Store)
      parameters:
        - name: Accept-Encoding
          in: header
          description: Accept-Encoding, described in IETF RFC 7231
          schema:
            type: string
        - name: target-nf-type
          in: query
          description: Type of the target NF
          required: true
          schema:
            $ref: 'TS29510_Nnrf_NFManagement.yaml#/components/schemas/NFType'
        - name: requester-nf-type
          in: query
          description: Type of the requester NF
          required: true
          schema:
            $ref: 'TS29510_Nnrf_NFManagement.yaml#/components/schemas/NFType'
        - name: requester-nf-instance-id
          in: query
          description: NfInstanceId of the requester NF
          schema:
            $ref: 'TS29571_CommonData.yaml#/components/schemas/NfInstanceId'
        - name: service-names
          in: query
          description: Names of the services offered by the NF
          schema:
            type: array
            items:
              $ref: 'TS29510_Nnrf_NFManagement.yaml#/components/schemas/ServiceName'
            minItems: 1
            uniqueItems: true
          style: form
          explode: false
        - name: requester-nf-instance-fqdn
          in: query
          description: FQDN of the requester NF
          schema:
            $ref: 'TS29510_Nnrf_NFManagement.yaml#/components/schemas/Fqdn'
        - name: target-plmn-list
          in: query
          description: Id of the PLMN of either the target NF, or in SNPN scenario the Credentials Holder in the PLMN
          content:
            application/json:
              schema:
                type: array
                items:
                  $ref: 'TS29571_CommonData.yaml#/components/schemas/PlmnId'
                minItems: 1
        - name: requester-plmn-list
          in: query
          description: Id of the PLMN where the NF issuing the Discovery request is located
          content:
            application/json:
              schema:
                type: array
                items:
```

```yaml
        $ref: 'TS29571_CommonData.yaml#/components/schemas/PlmnId'
      minItems: 1
- name: target-nf-instance-id
  in: query
  description: Identity of the NF instance being discovered
  schema:
    $ref: 'TS29571_CommonData.yaml#/components/schemas/NfInstanceId'
- name: target-nf-fqdn
  in: query
  description: FQDN of the NF instance being discovered
  schema:
    $ref: 'TS29510_Nnrf_NFManagement.yaml#/components/schemas/Fqdn'
- name: hnrf-uri
  in: query
  description: Uri of the home NRF
  schema:
    $ref: 'TS29571_CommonData.yaml#/components/schemas/Uri'
- name: snssais
  in: query
  description: Slice info of the target NF
  content:
    application/json:
      schema:
        type: array
        items:
          $ref: 'TS29571_CommonData.yaml#/components/schemas/Snssai'
        minItems: 1
- name: requester-snssais
  in: query
  description: Slice info of the requester NF
  content:
    application/json:
      schema:
        type: array
        items:
          $ref: 'TS29571_CommonData.yaml#/components/schemas/Snssai'
        minItems: 1
- name: plmn-specific-snssai-list
  in: query
  description: PLMN specific Slice info of the target NF
  content:
    application/json:
      schema:
        type: array
        items:
          $ref: 'TS29510_Nnrf_NFManagement.yaml#/components/schemas/PlmnSnssai'
        minItems: 1
- name: requester-plmn-specific-snssai-list
  in: query
  description: PLMN-specific slice info of the NF issuing the Discovery request
  content:
    application/json:
      schema:
        type: array
        items:
          $ref: 'TS29510_Nnrf_NFManagement.yaml#/components/schemas/PlmnSnssai'
        minItems: 1
- name: dnn
  in: query
  description: Dnn supported by the BSF, SMF or UPF
  schema:
    $ref: 'TS29571_CommonData.yaml#/components/schemas/Dnn'
- name: nsi-list
  in: query
  description: NSI IDs that are served by the services being discovered
  schema:
    type: array
    items:
      type: string
    minItems: 1
  style: form
  explode: false
- name: smf-serving-area
```

```
        in: query
        schema:
          type: string
      - name: tai
        in: query
        description: Tracking Area Identity
        content:
          application/json:
            schema:
              $ref: 'TS29571_CommonData.yaml#/components/schemas/Tai'
      - name: amf-region-id
        in: query
        description: AMF Region Identity
        schema:
          $ref: 'TS29571_CommonData.yaml#/components/schemas/AmfRegionId'
      - name: amf-set-id
        in: query
        description: AMF Set Identity
        schema:
          $ref: 'TS29571_CommonData.yaml#/components/schemas/AmfSetId'
      - name: guami
        in: query
        description: Guami used to search for an appropriate AMF
        content:
          application/json:
            schema:
              $ref: 'TS29571_CommonData.yaml#/components/schemas/Guami'
      - name: supi
        in: query
        description: SUPI of the user
        schema:
          $ref: 'TS29571_CommonData.yaml#/components/schemas/Supi'
      - name: ue-ipv4-address
        in: query
        description: IPv4 address of the UE
        schema:
          $ref: 'TS29571_CommonData.yaml#/components/schemas/Ipv4Addr'
      - name: ip-domain
        in: query
        description: IP domain of the UE, which supported by BSF
        schema:
          type: string
      - name: ue-ipv6-prefix
        in: query
        description: IPv6 prefix of the UE
        schema:
          $ref: 'TS29571_CommonData.yaml#/components/schemas/Ipv6Prefix'
      - name: pgw-ind
        in: query
        description: Combined PGW-C and SMF or a standalone SMF
        schema:
          type: boolean
      - name: pgw
        in: query
        description: PGW FQDN of a combined PGW-C and SMF
        schema:
          $ref: 'TS29510_Nnrf_NFManagement.yaml#/components/schemas/Fqdn'
      - name: pgw-ip
        in: query
        description: PGW IP Address of a combined PGW-C and SMF
        content:
          application/json:
            schema:
              $ref: 'TS29571_CommonData.yaml#/components/schemas/IpAddr'
      - name: gpsi
        in: query
        description: GPSI of the user
        schema:
          $ref: 'TS29571_CommonData.yaml#/components/schemas/Gpsi'
      - name: external-group-identity
        in: query
        description: external group identifier of the user
        schema:
```

```yaml
      $ref: 'TS29503_Nudm_SDM.yaml#/components/schemas/ExtGroupId'
- name: internal-group-identity
  in: query
  description: internal group identifier of the user
  schema:
    $ref: 'TS29571_CommonData.yaml#/components/schemas/GroupId'
- name: pfd-data
  in: query
  description: PFD data
  content:
    application/json:
      schema:
        $ref: 'TS29510_Nnrf_NFManagement.yaml#/components/schemas/PfdData'
- name: data-set
  in: query
  description: data set supported by the NF
  schema:
    $ref: 'TS29510_Nnrf_NFManagement.yaml#/components/schemas/DataSetId'
- name: routing-indicator
  in: query
  description: routing indicator in SUCI
  schema:
    type: string
    pattern: '^[0-9]{1,4}$'
- name: group-id-list
  in: query
  description: Group IDs of the NFs being discovered
  schema:
    type: array
    items:
      $ref: 'TS29571_CommonData.yaml#/components/schemas/NfGroupId'
    minItems: 1
  style: form
  explode: false
- name: dnai-list
  in: query
  description: Data network access identifiers of the NFs being discovered
  schema:
    type: array
    items:
      $ref: 'TS29571_CommonData.yaml#/components/schemas/Dnai'
    minItems: 1
  style: form
  explode: false
- name: pdu-session-types
  in: query
  description: list of PDU Session Type required to be supported by the target NF
  schema:
    type: array
    items:
      $ref: 'TS29571_CommonData.yaml#/components/schemas/PduSessionType'
    minItems: 1
  style: form
  explode: false
- name: event-id-list
  in: query
  description: Analytics event(s) requested to be supported by the Nnwdaf_AnalyticsInfo service
  schema:
    type: array
    items:
      $ref: 'TS29520_Nnwdaf_AnalyticsInfo.yaml#/components/schemas/EventId'
    minItems: 1
  style: form
  explode: false
- name: nwdaf-event-list
  in: query
  description: Analytics event(s) requested to be supported by the Nnwdaf_EventsSubscription service.
  schema:
    type: array
    items:
```

```yaml
            $ref:
'TS29520_Nnwdaf_EventsSubscription.yaml#/components/schemas/NwdafEvent'
            minItems: 1
          style: form
          explode: false
        - name: supported-features
          in: query
          description: Features required to be supported by the target NF
          schema:
            $ref: 'TS29571_CommonData.yaml#/components/schemas/SupportedFeatures'
        - name: upf-iwk-eps-ind
          in: query
          description: UPF supporting interworking with EPS or not
          schema:
            type: boolean
        - name: chf-supported-plmn
          in: query
          description: PLMN ID supported by a CHF
          content:
            application/json:
              schema:
                $ref: 'TS29571_CommonData.yaml#/components/schemas/PlmnId'
        - name: preferred-locality
          in: query
          description: preferred target NF location
          schema:
            type: string
        - name: access-type
          in: query
          description: AccessType supported by the target NF
          schema:
            $ref: 'TS29571_CommonData.yaml#/components/schemas/AccessType'
        - name: limit
          in: query
          description: Maximum number of NFProfiles to return in the response
          required: false
          schema:
            type: integer
            minimum: 1
        - name: required-features
          in: query
          description: Features required to be supported by the target NF
          schema:
            type: array
            items:
              $ref: 'TS29571_CommonData.yaml#/components/schemas/SupportedFeatures'
            minItems: 1
          style: form
          explode: false
        - name: complex-query
          in: query
          description: the complex query condition expression
          content:
            application/json:
              schema:
                $ref: 'TS29571_CommonData.yaml#/components/schemas/ComplexQuery'
        - name: max-payload-size
          in: query
          description: Maximum payload size of the response expressed in kilo octets
          required: false
          schema:
            type: integer
            maximum: 2000
            default: 124
        - name: max-payload-size-ext
          in: query
          description: Extended query for maximum payload size of the response expressed in kilo octets
          required: false
          schema:
            type: integer
            default: 124
        - name: atsss-capability
```

```
        in: query
        description: ATSSS Capability
        content:
          application/json:
            schema:
              $ref: 'TS29571_CommonData.yaml#/components/schemas/AtsssCapability'
      - name: upf-ue-ip-addr-ind
        in: query
        description: UPF supporting allocating UE IP addresses/prefixes
        schema:
          type: boolean
      - name: client-type
        in: query
        description: Requested client type served by the NF
        content:
          application/json:
            schema:
              $ref:
'TS29572_Nlmf_Location.yaml#/components/schemas/ExternalClientType'
      - name: lmf-id
        in: query
        description: LMF identification to be discovered
        content:
          application/json:
            schema:
              $ref: 'TS29572_Nlmf_Location.yaml#/components/schemas/LMFIdentification'
      - name: an-node-type
        in: query
        description: Requested AN node type served by the NF
        content:
          application/json:
            schema:
              $ref: 'TS29510_Nnrf_NFManagement.yaml#/components/schemas/AnNodeType'
      - name: rat-type
        in: query
        description: Requested RAT type served by the NF
        content:
          application/json:
            schema:
              $ref: 'TS29571_CommonData.yaml#/components/schemas/RatType'
      - name: preferred-tai
        in: query
        description: preferred Tracking Area Identity
        content:
          application/json:
            schema:
              $ref: 'TS29571_CommonData.yaml#/components/schemas/Tai'
      - name: preferred-nf-instances
        in: query
        description: preferred NF Instances
        schema:
          type: array
          items:
            $ref: 'TS29571_CommonData.yaml#/components/schemas/NfInstanceId'
          minItems: 1
        style: form
        explode: false
      - name: If-None-Match
        in: header
        description: Validator for conditional requests, as described in IETF RFC
7232, 3.2
        schema:
          type: string
      - name: target-snpn
        in: query
        description: Target SNPN Identity, or the Credentials Holder in the SNPN
        content:
          application/json:
            schema:
              $ref: 'TS29571_CommonData.yaml#/components/schemas/PlmnIdNid'
      - name: requester-snpn-list
        in: query
        description: SNPN ID(s) of the NF instance issuing the Discovery request
```

```yaml
              content:
                application/json:
                  schema:
                    type: array
                    items:
                      $ref: 'TS29571_CommonData.yaml#/components/schemas/PlmnIdNid'
                    minItems: 1
            - name: af-ee-data
              in: query
              description: NEF exposed by the AF
              content:
                application/json:
                  schema:
                    $ref:
'TS29510_Nnrf_NFManagement.yaml#/components/schemas/AfEventExposureData'
            - name: w-agf-info
              in: query
              description: UPF collocated with W-AGF
              content:
                application/json:
                  schema:
                    $ref: 'TS29510_Nnrf_NFManagement.yaml#/components/schemas/WAgfInfo'
            - name: tngf-info
              in: query
              description: UPF collocated with TNGF
              content:
                application/json:
                  schema:
                    $ref: 'TS29510_Nnrf_NFManagement.yaml#/components/schemas/TngfInfo'
            - name: twif-info
              in: query
              description: UPF collocated with TWIF
              content:
                application/json:
                  schema:
                    $ref: 'TS29510_Nnrf_NFManagement.yaml#/components/schemas/TwifInfo'
            - name: target-nf-set-id
              in: query
              description: Target NF Set ID
              schema:
                $ref: 'TS29571_CommonData.yaml#/components/schemas/NfSetId'
            - name: target-nf-service-set-id
              in: query
              description: Target NF Service Set ID
              schema:
                $ref: 'TS29571_CommonData.yaml#/components/schemas/NfServiceSetId'
            - name: nef-id
              in: query
              description: NEF ID
              schema:
                $ref: 'TS29510_Nnrf_NFManagement.yaml#/components/schemas/NefId'
            - name: notification-type
              in: query
              description: Notification Type
              schema:
                $ref: 'TS29510_Nnrf_NFManagement.yaml#/components/schemas/NotificationType'
            - name: n1-msg-class
              in: query
              description: N1 Message Class
              schema:
                $ref: 'TS29518_Namf_Communication.yaml#/components/schemas/N1MessageClass'
            - name: n2-info-class
              in: query
              description: N2 Information Class
              schema:
                $ref:
'TS29518_Namf_Communication.yaml#/components/schemas/N2InformationClass'
            - name: serving-scope
              in: query
              description: areas that can be served by the target NF
              schema:
                type: array
                items:
```

```
          type: string
        minItems: 1
      style: form
      explode: false
    - name: imsi
      in: query
      description: IMSI of the requester UE to search for an appropriate NF (e.g.
HSS)
      schema:
        type: string
        pattern: '^[0-9]{5,15}$'
    - name: ims-private-identity
      in: query
      description: IMPI of the requester UE to search for a target HSS
      schema:
        type: string
    - name: ims-public-identity
      in: query
      description: IMS Public Identity of the requester UE to search for a target
HSS
      schema:
        type: string
    - name: msisdn
      in: query
      description: MSISDN of the requester UE to search for a target HSS
      schema:
        type: string
    - name: preferred-api-versions
      in: query
      description: Preferred API version of the services to be discovered
      content:
        application/json:
          schema:
            description: A map (list of key-value pairs) where ServiceName serves as
key
            type: object
            additionalProperties:
              type: string
            minProperties: 1
    - name: v2x-support-ind
      in: query
      description: PCF supports V2X
      schema:
        type: boolean
    - name: redundant-gtpu
      in: query
      description: UPF supports redundant gtp-u to be discovered
      schema:
        type: boolean
    - name: redundant-transport
      in: query
      description: UPF supports redundant transport path to be discovered
      schema:
        type: boolean
    - name: ipups
      in: query
      description: UPF which is configured for IPUPS functionality to be discovered
      schema:
        type: boolean
    - name: scp-domain-list
      in: query
      description: SCP domains the target SCP or SEPP belongs to
      schema:
        type: array
        items:
          type: string
        minItems: 1
      style: form
      explode: false
    - name: address-domain
      in: query
      description: Address domain reachable through the SCP
      schema:
```

```
              $ref: 'TS29510_Nnrf_NFManagement.yaml#/components/schemas/Fqdn'
        - name: ipv4-addr
          in: query
          description: IPv4 address reachable through the SCP
          schema:
            $ref: 'TS29571_CommonData.yaml#/components/schemas/Ipv4Addr'
        - name: ipv6-prefix
          in: query
          description: IPv6 prefix reachable through the SCP
          schema:
            $ref: 'TS29571_CommonData.yaml#/components/schemas/Ipv6Prefix'
        - name: served-nf-set-id
          in: query
          description: NF Set ID served by the SCP
          schema:
            $ref: 'TS29571_CommonData.yaml#/components/schemas/NfSetId'
        - name: remote-plmn-id
          in: query
          description: Id of the PLMN reachable through the SCP or SEPP
          content:
            application/json:
              schema:
                $ref: 'TS29571_CommonData.yaml#/components/schemas/PlmnId'
        - name: data-forwarding
          in: query
          description: UPF Instance(s) configured for data forwarding are requested
          schema:
            type: boolean
        - name: preferred-full-plmn
          in: query
          description: NF Instance(s) serving the full PLMN are preferred
          schema:
            type: boolean
        - name: requester-features
          in: query
          description: Features supported by the NF Service Consumer that is invoking
the Nnrf_NFDiscovery service
          schema:
            $ref: 'TS29571_CommonData.yaml#/components/schemas/SupportedFeatures'
        - name: realm-id
          in: query
          description: realm-id to search for an appropriate UDSF
          schema:
            type: string
        - name: storage-id
          in: query
          description: storage-id to search for an appropriate UDSF
          schema:
            type: string
        - name: vsmf-support-ind
          in: query
          description: V-SMF capability supported by the target NF instance(s)
          schema:
            type: boolean
        - name: nrf-disc-uri
          in: query
          description: Uri of the NRF holding the NF profile of a target NF Instance
          schema:
            $ref: 'TS29571_CommonData.yaml#/components/schemas/Uri'
        - name: preferred-vendor-specific-features
          in: query
          description: Preferred vendor specific features of the services to be
discovered
          content:
            application/json:
              schema:
                description: A map (list of key-value pairs) where ServiceName serves as
key
                type: object
                additionalProperties:
                  description: A map (list of key-value pairs) where IANA-assigned SMI
Network Management Private Enterprise Codes serves as key
                  type: object
```

```
              additionalProperties:
                type: array
                items:
                  $ref:
'TS29510_Nnrf_NFManagement.yaml#/components/schemas/VendorSpecificFeature'
                minItems: 1
                minProperties: 1
              minProperties: 1
        - name: preferred-vendor-specific-nf-features
          in: query
          description: Preferred vendor specific features of the network function to be
discovered
          content:
            application/json:
              schema:
                description: A map (list of key-value pairs) where IANA-assigned SMI
Network Management Private Enterprise Codes serves as key
                type: object
                additionalProperties:
                  type: array
                  items:
                    $ref:
'TS29510_Nnrf_NFManagement.yaml#/components/schemas/VendorSpecificFeature'
                  minItems: 1
                minProperties: 1
        - name: required-pfcp-features
          in: query
          description: PFCP features required to be supported by the target UPF
          schema:
            type: string
        - name: home-pub-key-id
          in: query
          description: Indicates the Home Network Public Key ID which shall be able to
be served by the NF instance
          schema:
            type: integer
        - name: prose-support-ind
          in: query
          description: PCF supports ProSe Capability
          schema:
            type: boolean
        - name: analytics-aggregation-ind
          in: query
          description: analytics aggregation is supported by NWDAF or not
          schema:
            type: boolean
        - name: serving-nf-set-id
          in: query
          description: NF Set Id served by target NF
          schema:
            $ref: 'TS29571_CommonData.yaml#/components/schemas/NfSetId'
        - name: serving-nf-type
          in: query
          description: NF type served by the target NF
          schema:
            $ref: 'TS29510_Nnrf_NFManagement.yaml#/components/schemas/NFType'
        - name: ml-analytics-id-list
          in: query
          description: Analytics Id(s) of Nnwdaf_MLModelProvision service
          content:
            application/json:
              schema:
                type: array
                items:
                  $ref:
'TS29520_Nnwdaf_EventsSubscription.yaml#/components/schemas/NwdafEvent'
                minItems: 1
        - name: analytics-metadata-prov-ind
          in: query
          description: analytics matadata provisioning is supported by NWDAF or not
          schema:
            type: boolean
        - name: nsacf-serving-area
```

```
            in: query
            description: the serving area of the NSACF
            schema:
              type: string
        - name: nsacf-capability
            in: query
            description: the service capability supported by the target NSACF
            schema:
              $ref: 'TS29510_Nnrf_NFManagement.yaml#/components/schemas/NsacfCapability'
        - name: mbs-session-id-list
            in: query
            description: List of MBS Session ID(s)
            content:
              application/json:
                schema:
                  type: array
                  items:
                    $ref: 'TS29571_CommonData.yaml#/components/schemas/MbsSessionId'
                  minItems: 1
        - name: preferred-para-precedence
            in: query
            description: Indicating the precedence of the preferred query parameters (from higher to lower).
            content:
              application/json:
                schema:
                  type: array
                  items:
                    type: string
                  minItems: 2
      responses:
        '200':
          description: Expected response to a valid request
          content:
            application/json:
              schema:
                $ref: '#/components/schemas/SearchResult'
          links:
            search:
              operationId: RetrieveStoredSearch
              parameters:
                searchId: $response.body#/searchId
              description: >
                The 'searchId' parameter returned in the response can be used as the
                'searchId' parameter in the GET request to '/searches/{searchId}'
            completeSearch:
              operationId: RetrieveCompleteSearch
              parameters:
                searchId: $response.body#/searchId
              description: >
                The 'searchId' parameter returned in the response can be used as the
                'searchId' parameter in the GET request to
'/searches/{searchId}/complete'
          headers:
            Cache-Control:
              description: Cache-Control containing max-age, described in IETF RFC 7234, 5.2
              schema:
                type: string
            ETag:
              description: Entity Tag containing a strong validator, described in IETF RFC 7232, 2.3
              schema:
                type: string
            Content-Encoding:
              description: Content-Encoding, described in IETF RFC 7231
              schema:
                type: string
```

************* Text Skipped for Clarity ***************

**\* \* \* End of Changes \* \* \* \***

Appendix 2

3GPP TSG-CT WG4 Meeting #106-e        C4-21xxxx
E-Meeting, 11th – 15th October 2021

Source:        Ericsson
Title:        Discussion on Essential Improvements on NF Discovery
Agenda item:        6.3.1
Document for:        DISCUSSION

1. Background

3GPP TS 29.510 has specified NRF service which allow NF producer to register NF profile in NRF and NF consumer to discover the NF instances matching certain query parameters and preferred query parameters.

Some issues have been observed:

ISSUE-1: Multiple Preferred Query Parameter Handling

The NF consumer may provide optional preferred parameters which are used by NRF to preferably find the candidate NF instances and prioritize the NF candidates in the search result. After NRF selected all fully matched instances (or no fully matched instances found), the NRF may also select NF instances that are not matching certain preferred parameter(s) in search result, i.e., partial matching without certain preferred certain preferred parameters.

[Observation-1] When multiple preferred parameters are provided, the NRF is not aware the precedence of these parameters thus cannot decide which preferred parameter can be ignored first in partial matching.

For Example:

- NFp1: *serving TAI = [TAI-x, ...], vendor-specific-nf-features=x*
- NFp2: *serving TAI = [TAI-y, ...], vendor-specific-nf-features=y*

The NFc performs discovery request includes following query parameters:

*preferred-tai=TAI-x&&preferred-vendor-specific-nf-features=y*.

Then, the NRF may include only NFp1 or NFp2 or both NFp1 and NFp2 in random order. With more candidates in the NRF and more preferred parameters, the result handling becomes much complex and unpredictable.

As a result, the NF consumer would need to go through the candidate NF instances in detail to identify which candidate is most suitable for the scenario. Even worse, if due to limited number of NF profiles can be returned in search result, the NRF may provide the candidates which are not preferred by the NF consumer in early searches and the NF consumer need to perform subsequent searches with back efficiency and unnecessary network traffic.

ISSUE-2: NF Priority Handling in Discovery

In Discovery result, the NRF may overwrite the priority value in NF profile, e.g., according to algorithm based on NF consumer preferences or other non-functional attributes.

| priority | integer | O | 0..1 | Priority (relative to other NFs of the same type) within the range 0 to 65535, to be used for NF selection; lower values indicate a higher priority. Priority may or may not be present in the nfServiceList parameters, xxxInfo parameters and in this attribute. Priority in the nfServiceList has precedence over the priority in this attribute (NOTE 4).<br><br>Priority in xxxInfo parameter shall only be used to determine the relative priority among NF instances with the same priority at NFProfile/NFService.<br><br>The NRF may overwrite the received priority value when exposing an NFProfile with the Nnrf_NFDiscovery service. |

[Observaton-2] For network traffic efficiency, the NF consumer can store the search result and subscribe to the NF profile changes of the candidate NFs for future reusing.

In the notification data, the NRF may send the NF profile including the unmodified priority value registered by the NF producer, the NF consumer will identify a priority is updated which is actually not. This will ruin the priority in stored search result and may negatively impact the NF service consumer behaviour in future selection of NF candidates.

To effectively reuse the stored search result with expected priority handling, the NRF should continue providing the priority of NF candidates aligned with the algorithm discovery result.

[Observation-3] Even the NRF may wish to provide the NRF calculated priority values also in NF profile to NFc, but there are limitations for NRF to realize it:
the preferred parameters in discovery most likely also impacted the priority in search result
the priority value calculation of the NF candidates may be relative to other candidates in the search result.

[Observation-4] In some scenarios, the NF Producer may require the priority in NF profile not to be overwritten by NRF, e.g., NF instances may be pre-configured as primary / secondary, regardless of locality, load or other preferences maybe used by NRF to alter the priority in search result.

2. Solutions

For ISSUE-1

[Solution-A] Precedence of Preferred Parameters in Discovery Request
- address [Observation-1]

The NRF provide a new query parameter in discovery request indicating the precedence of the included preferred parameters in the request. If multiple preferred parameters are included in a discovery request, the NF consumer can also include this new query parameter to explicitly indicate the precedence. The NRF can then accordingly to the precedence to selectively process the preferred parameters for partial matching in search results.

This solution can remove the ambiguity of NRF handling the preferred parameters. The search result will always be aligned with NF service consumer preference. Even not all candidates can be returned due to limited number of profiles in one response, higher priority candidates will be returned in earlier searches.

For ISSUE-2

[Solution-B.1] Include preferred query parameters and the precedence in Subscription in NF Management Service
- address [Observation-2] & partly [Observation-3]

This solution extends the NF Profile Change Subscription in NF Management Service, to include the same preference (preferred parameters) and the precedence as in the Discovery request. This allows the NRF to execute same algorithm for the modification of the NF producer profile priority with the similar logic as in discovery procedure.

In any attribute in the NF profile that is used by the NRF to calculate the altered priority is modified (e.g. Load, Capacity, or the Priority itself), then the NRF uses preference and precedence to recalculate the priority and inform the NF consumer. otherwise, if the modified attribute does not impact the calculation of the Priority, then the NRF do not include the Priority as modified attribute, what will be interpreted by the NF consumer that the Priority is not modified

Figure 13:
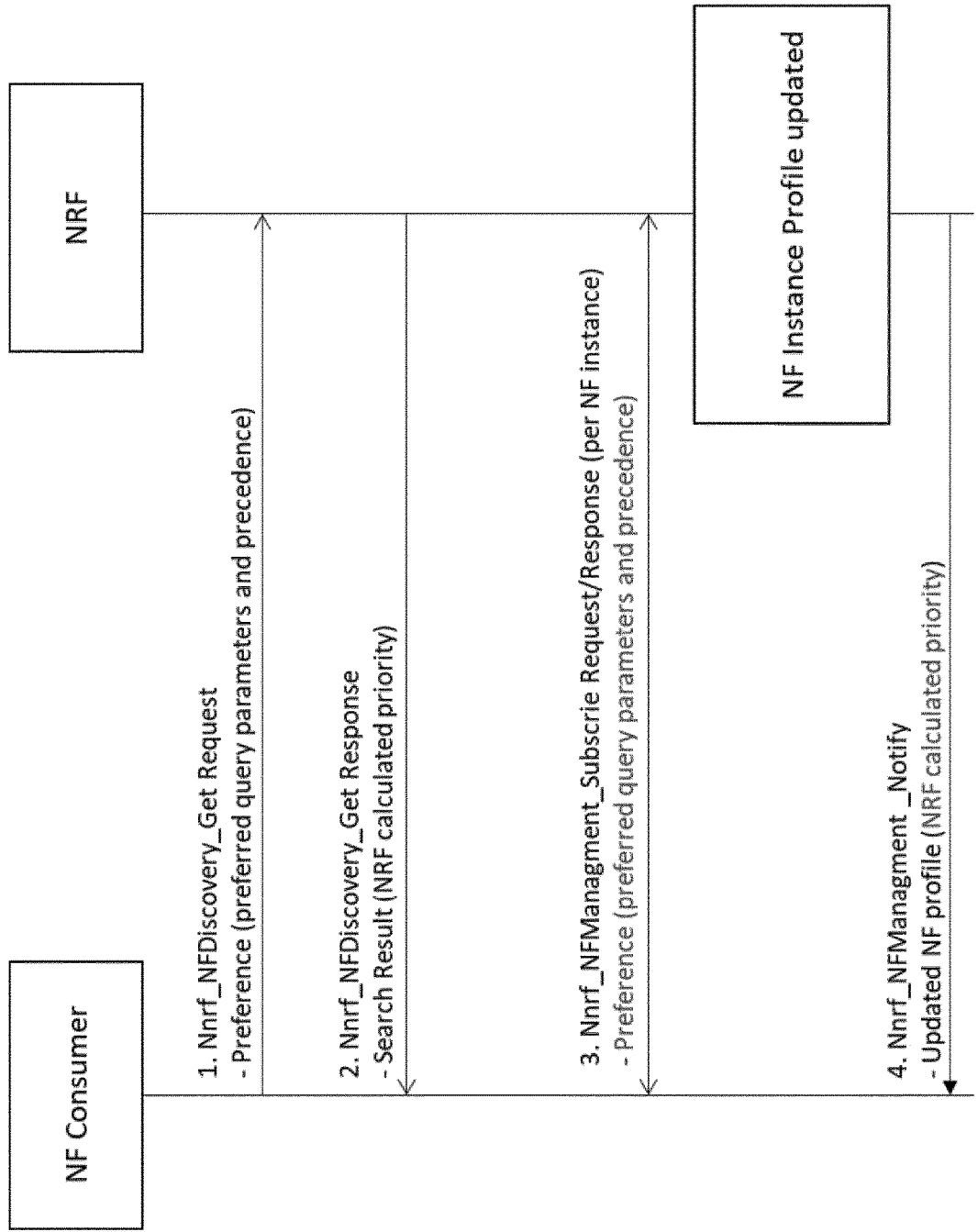
FIGS. 13-24 are signalling diagrams illustrating an exchange of signals in a system according to some embodiments.

Figure 13 illustrates the proposed solution.

Pros:
- Limited impacts to NRF API by reusing existing NF Management Subscription resource.

[Solution-B.2] New subscription for NRF calculated priority in NF discovery service
- address [Observation-2] & [Observation-3]

New resource at NF discovery service to be supported by NRF, which allow the NF consumer to subscribe for NRF calculated priority changes for a target list of NF profiles (i.e., the list of NF candidates as in the search result).

The same preference and precedence used in the Discovery request can be included in the new subscription and the NRF will calculate the priority using exactly the same algorithm (as discovery procedure) for the modification of the NF profile.

For other attributes of the NF profiles, the existing NF Management subscriptions are used as legacy.

Figure 14:
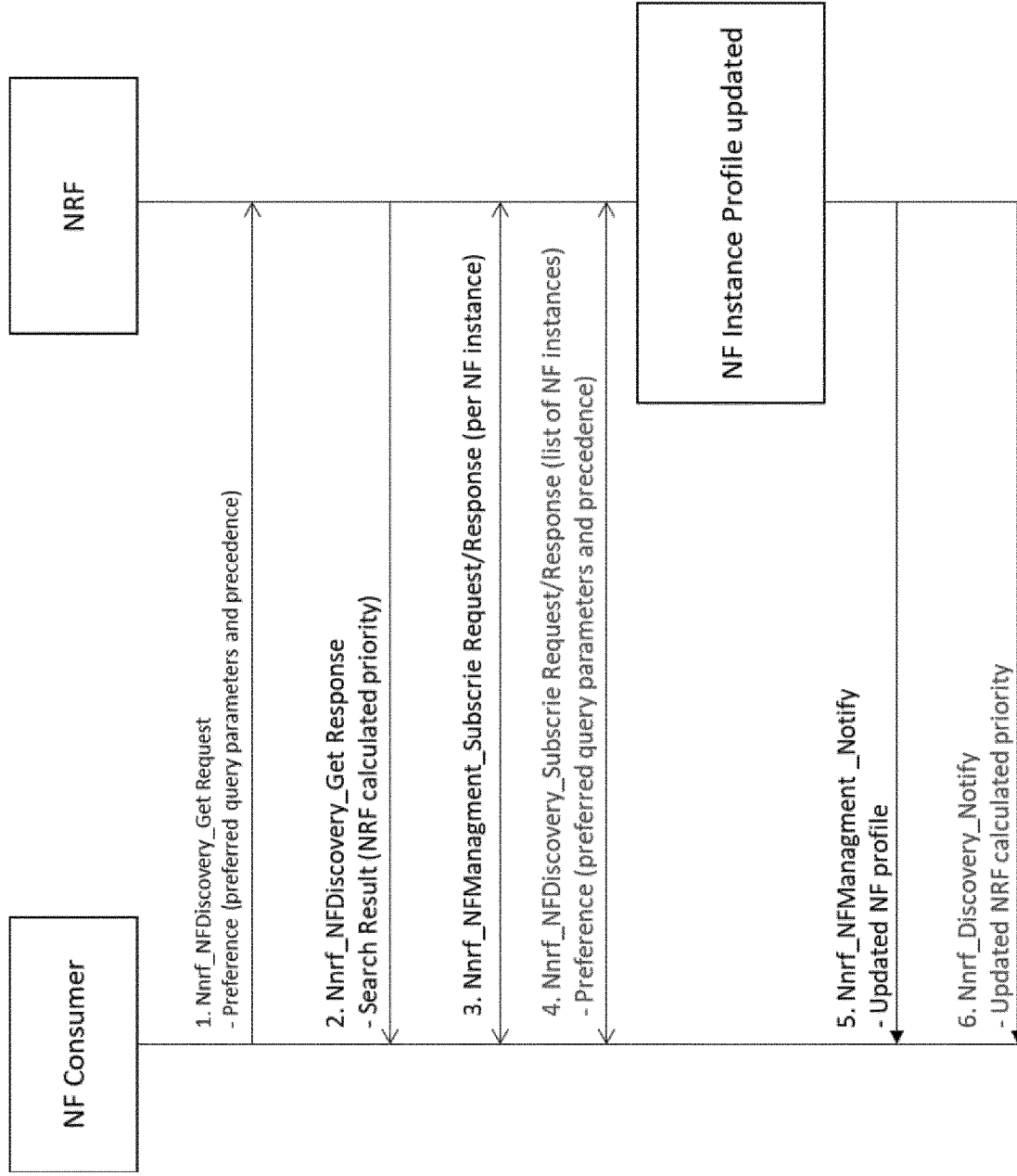

Figure 14 illustrates the proposed solution.

Pros:
- No impact to legacy procedures
- Decoupling NF Discovery Service logic with NF Management service.
- Subscription is for list of NF instances, relative priority among candidates can be calculated

[Solution-B.3] Stored Search with preferences and precedence in NRF and provide URI to Subscribe
- address [Observation-2] & [Observation-3]

The NRF stores the discovery transaction including the preferences and precedence and the search results. The NRF provides the URI (e.g., the URI with SearchId resource) and new service operation supported on this URI to allow the NF consumer to subscribe for NRF calculated priority for the NF candidates.

Figure 15:
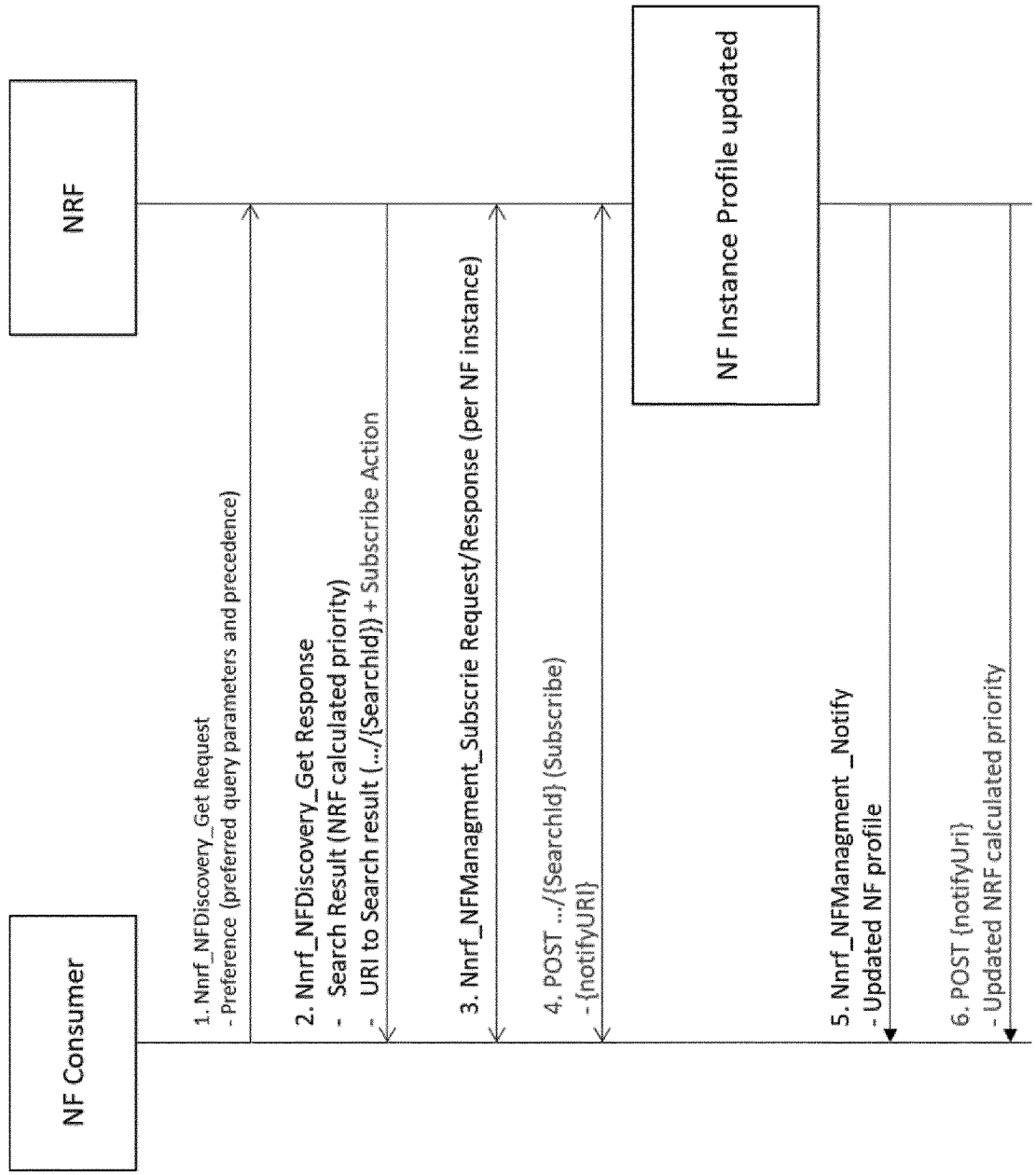

Figure 15 illustrates the proposed solution.

Pros:
- Decoupling NF Discovery Service logic with NF Management service.
- Subscription is associated directly to discovery, no additional information needed for subscription.

[Solution-C] Indication of Unchangeable Priority in NF Profile by NF producer
- address [Observation-4]

The solution specifies new attribute in NF profile to allow the NF producer to explicitly inform the NRF to not overwrite the priority value registered by NF producer in the search result. The priority value for specific user scenarios can be synchronized consistently between NF producer and NF consumer.

This solution only introduces small changes in NRF API and is totally transparent to NF consumer behaviour, and the changes are backward compatible.

3. Proposal

Based on the above analysis, it is recommended to adapt the following solutions for the observed issues:

For ISSUE-1

Solution-A provides a straight approach towards the needs, which is backward compatible and easy to understand. it is recommended to implement "[Solution-A] Precedence of Preferred Parameters in Discovery Request" as way forward (CRxxxx of TS 29.510, C4-21xxxx).

For ISSUE-2 [Observation2] & [Observation-3]

It is beneficial to avoid impacting existing NF Management subscription to allow the NF to receive the NF Profile, and to avoid a closely coupling between two different services in the NRF due to the need to include preferences and its precedence as input parameters to Discovery.

It is recommended to implement [Solution-B.2] "New subscription for NRF calculated priority in NF discovery service" as way forward (CRxxxx of TS 29.510, C4-21xxxx)

For ISSUE-2 [Observation4]

It is recommended to implement [Solution-C] "Indication of Unchangeable Priority in NF Profile by NF producer" as a small improvement. (CRxxxx of TS 29.510, C4-21xxxx)

Appendix 3

3GPP TSG-CT WG4 Meeting #106-e  C4-21xxxx
E-Meeting, 11th – 15th October 2021

*CR-Form-v12.0*

CHANGE REQUEST

29.510 CR xxxx rev - Current version: 17.3.0

*For HELP on using this form: comprehensive instructions can be found at*
*http://www.3gpp.org/Change-Requests.*

Proposed change affects: UICC apps ☐ ME ☐ Radio Access Network ☐ Core Network ☒

| Title: | NRF Calculated Priority Subscription |
|---|---|
| Source to WG: | Ericsson |
| Source to TSG: | CT4 |
| Work item code: | SBIProtoc17 | Date: | 2021-09-02 |
| Category: | B | Release: | Rel-17 |
| | Use one of the following categories:<br>F (correction)<br>A (mirror corresponding to a change in an earlier release)<br>B (addition of feature),<br>C (functional modification of feature)<br>D (editorial modification)<br>Detailed explanations of the above categories can be found in 3GPP TR 21.900. | | Use one of the following releases:<br>Rel-8 (Release 8)<br>Rel-9 (Release 9)<br>Rel-10 (Release 10)<br>Rel-11 (Release 11)<br>Rel-12 (Release 12)<br>Rel-13 (Release 13)<br>Rel-14 (Release 14)<br>Rel-15 (Release 15)<br>Rel-16 (Release 16) |
| Reason for change: | 3GPP TS 29.510 has specified NRF service which allow NF producer to register NF profile in NRF and NF consumer to discover the NF instances matching certain query parameters. In Discovery result, the NRF may overwrite the priority value in NF profile, e.g. according to algorithm based on NF consumer preferences or other non-functional attributes.<br><br>For network traffic efficiency, the NF consumer can store the search result and subscribe to the NF profile changes of the candidate NFs for future reusing. If in the notification data, the NRF sends the NF profile including the unmodified priority value registered by the NF producer, the NF consumer will identify a priority is updated which is atually not.<br><br>This CR proposes a protocol improvement, a new service operation, to allow NF consumer to subscribe for update of NRF modified priority for the candidates aligned with the search result. |
| Summary of change: | 1/ Define new service operations for NRF calculated priority status:<br>  - subscribe<br>  - notify<br>  - unsubscribe<br><br>2/ Define API specification for new service operations (resource and data types).<br><br>3/ Update OpenAPI accordingly |
| Consequences if not approved: | |

| | | |
|---|---|---|
| Clauses affected: | 5.3.1, 5.3.2.1, 5.3.2.x(New), 5.3.2.y(New), 5.3.2.z(New), 6.2.3.1, 6.2.3.x(New), 6.2.3.y(New), 6.2.5.1, 6.2.5.x(New), 6.2.6.1, 6.2.6.2.2, 6.2.6.2.x(New), 6.2.6.2.y(New), 6.2.6.2.z(New), 6.2.6.2.a(New), A.3 | |

| | Y | N | | |
|---|---|---|---|---|
| Other specs | | X | Other core specifications | TS/TR ... CR ... |
| affected: | | X | Test specifications | TS/TR ... CR ... |
| (show related CRs) | | X | O&M Specifications | TS/TR ... CR ... |

| | |
|---|---|
| Other comments: | This CR introduces backward compatible new feature in OpenAPI file of Nnrf_NFDiscovery APIs. |

This CR's revision history:

* Information **

6.1.6.2.2 Type: NFProfile

Table 6.1.6.2.2-1: Definition of type NFProfile

| Attribute name | Data type | P | Cardinality | Description |
|---|---|---|---|---|
| ... | | | | |
| priority | integer | O | 0..1 | Priority (relative to other NFs of the same type) within the range 0 to 65535, to be used for NF selection; lower values indicate a higher priority. Priority may or may not be present in the nfServiceList parameters, xxxInfo parameters and in this attribute. Priority in the nfServiceList has precedence over the priority in this attribute (NOTE 4).<br><br>Priority in xxxInfo parameter shall only be used to determine the relative priority among NF instances with the same priority at NFProfile/NFService.<br><br>The NRF may overwrite the received priority value when exposing an NFProfile with the Nnrf_NFDiscovery service. |

* First Change **

5.3.1 Service Description

The Nnrf_NFDiscovery service allows a NF or SCP Instance to discover other NF Instances with the potential services they offer, or to discover SEPP instances in the same PLMN, by querying the local NRF.

The Nnrf_NFDiscovery service also allows to a SCP discover other SCP instances.

It also allows an NRF in a PLMN to re-issue a discovery request towards an NRF in another PLMN (e.g., the HPLMN of a certain UE).

It also allows an NF service consumer (e.g., an NF instance or an SCP instance) to subscribe to changes on NRF calculated priority for NF instances.

* Next Change **

5.3.2.1 Introduction

The service operations defined for the Nnrf_NFDiscovery service are as follows:

- NFDiscover: It provides to the NF service consumer or SCP the profile (including IP address(es) or FQDN) of the NF Instance(s) or NF Service(s) or SEPP instances matching certain input criteria. It also provides to the SCP the profile (including IP address(es) or FQDN) of the SCP Instance(s) matching certain input criteria.

- PriorityStatusSubscribe: It allows an NF or SCP Instance to subscribe to changes on NRF calculated priority of NF Instances.

- PriorityStatusNotify: It allows the NRF to notify subscribed NF or SCP Instances of changes on NRF calculated priority of NF Instances.

- PriorityStatusUnsubscribe: It allows an NF or SCP Instance to unsubscribe to NRF calculated priority of NF Instances.

The NFDiscover operation can be invoked by an NF Service Consumer (i.e., "source NF") or SCP requesting to discover NF instances (i.e., "target NFs") located in the same PLMN, or in a different PLMN, or SEPP instances located in the same PLMN. It can also be invoked by an SCP requesting to discover SCP instances located in the same PLMN.

In the description of these operations in clause 5.3.2.2, 5.3.2.x and 5.3.2.z, when the NF instances are located in the same PLMN, both source NF and target NFs are said to be located in the "Serving PLMN" but, in the general case, the functionality is not restricted to the PLMN that is serving a given UE, and it shall be applicable as well to any scenario in which source NF and target NFs belong to the same PLMN.

When source NF and target NFs are located in different PLMNs, the source NF is said to be in the "Serving PLMN", and the target NFs (and the NRF where they are registered) are said to be in the "Home PLMN", similarly to the scenarios described in 3GPP TS 23.502 [3], but the functionality shall be equally applicable to any scenario between any pair of PLMNs (e.g. with the source NF in the Home PLMN and the target NF in the Serving PLMN).

The SCP and SEPP are treated by the Nnrf_NFDiscovery service in the same way as NFs. Specifically, the SCP and SEPP are designated with a specific NF type and NF Instance ID. However, the SCP and SEPP do not support services. Accordingly, references to "NF" or "NF Profile" in the description of the service operations in the following clauses also apply to an SCP and SEPP.

- SCPDomainRoutingInfoGet: It allows a service consumer (e.g. SCP) to fetch the SCP domain routing information (list of all SCP Domains registered by SCPs and the interconnected SCP domains per SCP domain), if both the SCP and the NRF supports the "SCPDRI" feature. It also allows a service consumer (e.g. NRF) to fetch the local SCP domain routing information (based on SCPs registered in the NRF as service producer), if both the NRF as service consumer and NRF as service producer supports the "SCPDRI" feature.

NOTE: Two SCP domains are considered interconnected when at least one SCP belongs to both SCP domains, i.e. at least one SCP can bridge messages between these two SCP domains.

- SCPDomainRoutingInfoSubscribe: It allows a service consumer (e.g. SCP) to create a subscription for changes of the SCP domain routing information, if both the SCP and the NRF supports the "SCPDRI" feature. It also allows a service consumer (e.g. NRF) to create a subscription for changes of local SCP domain routing information, if both the NRF as service consumer and NRF as service producer supports the "SCPDRI" feature.

- SCPDomainRoutingInfoNotify: It allows the NRF to send notification(s) to a service consumer (e.g. SCP) previously subscribed to the changes of the SCP domain routing information, if both the SCP and the NRF supports the "SCPDRI" feature. It also allows the NRF as service producer to send notification(s) to a service consumer (e.g. NRF) previously subscribed to the changes of the local SCP domain routing information, if both the NRF as service consumer and NRF as service producer supports the "SCPDRI" feature.

- SCPDomainRoutingInfoUnsubscribe: It allows a service consumer (e.g. SCP or NRF) to delete a previously created subscription for changes of the SCP domain routing information, if both the service consumer and the NRF as service producer supports the "SCPDRI" feature.

* * * Next Change * * * *

5.3.2.x PriorityStatusSubscribe

5.3.2.x.1 General

This service operation allows an NF service consumer to create a subscription for NRF calculated priority change of NF Instances.

5.3.2.x.2 Subscription to NF Instances in the same PLMN

The subscription to notifications on NF Instances is executed creating a new individual resource under the collection resource "subscriptions". The operation is invoked by issuing a POST request on the URI representing the "subscriptions" resource.

Figure 16:
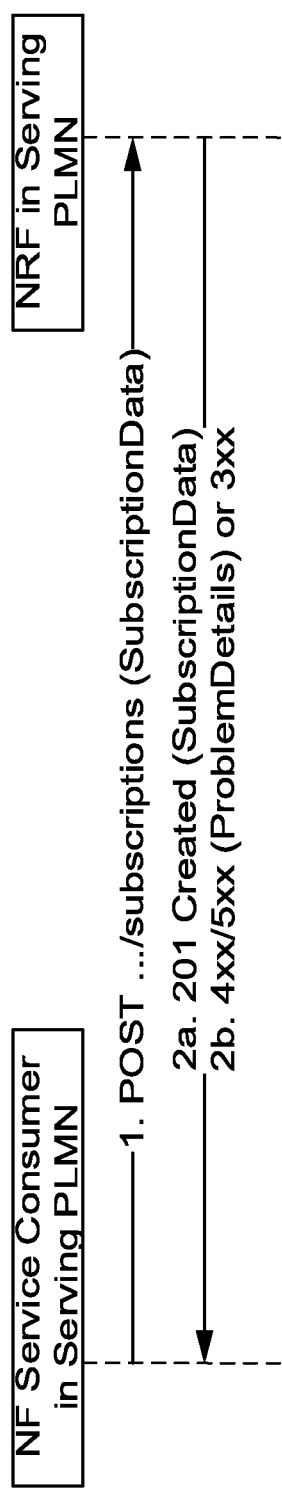

Figure 16 illustrates a subscription to NF Instances in the same PLMN. The steps illustrated in Figure 16 are as follows:

1. The NF Service Consumer shall send a POST request to the resource URI representing the "subscriptions" collection resource. The request body shall include a list of NF instance IDs to be monitored. The request body may also include NF consumer preference to be used by NRF for priority calculation.

2a. On success, "201 Created" shall be returned. The response shall contain the data related to the created subscription, including the validity time, as determined by the NRF, after which the subscription becomes invalid. Once the subscription expires, if the NF Service Consumer wants to keep receiving status notifications, it shall create a new subscription in the NRF.

2b. On failure or redirection, the NRF shall return 3xx/4xx/5xx response codes as listed in table 6.x.1.3.2.1-2.

NOTE: If the NF service consumer subscribes to the changes of NRF calculated priority, the NF service consumer shall consider the NRF calculated priority value from Nnrf_NFDiscovery service has higher precedence than the priority value received from Nnrf_NFManagement Service for the same NF instance.

5.3.2.x.3 Subscription to NF Instances in a different PLMN

The subscription to notifications on NF Instances in a different PLMN is done by creating a resource under the collection resource "subscriptions", in the NRF of the home PLMN.

For that, step 1 in clause 5.3.2.x.2 is executed (send a POST request to the NRF in the Serving PLMN); this request shall include the identity of the home PLMN in the SubscriptionData parameter in the request body.

Figure 17:
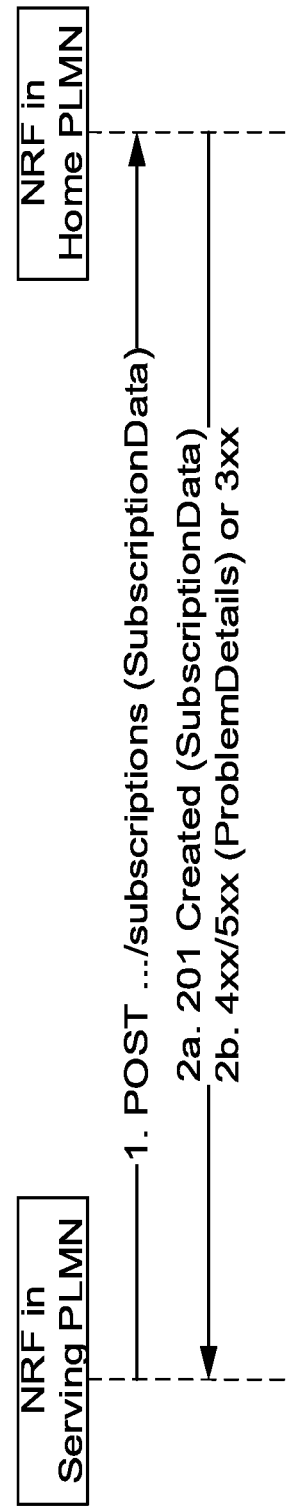

Then, steps 1-2 in Figure 17 are executed, between the NRF in the Serving PLMN and the NRF in the home PLMN. In this step, the presence of the PLMN ID in the SubscriptionData parameter is not required. The NRF in the home PLMN returns a subscriptionID identifying the created subscription.

Finally, step 2 in clause 5.3.2.x.2 is executed; a new subscriptionID shall be generated by the NRF in the Serving PLMN as indicated in step 2 of Figure 17, and shall be sent to the NF Service Consumer in the Serving PLMN.

Figure 17 illustrates a subscription to NF Instances in a different PLMN. The steps illustrated in Figure 17 are as follows:

1. The NRF in Serving PLMN shall send a POST request to the resource URI in the NRF in home PLMN representing the "subscriptions" collection resource. The request body shall include the SubscriptionData as received by the NRF in Serving PLMN from the NF Service Consumer in the Serving PLMN (see 5.3.2.x.2).

2a. On success, "201 Created" shall be returned. The NRF in Serving PLMN should not keep state for this created subscription and shall send to the NF Service Consumer in Serving PLMN (step 2 in 5.3.2.x.2) a subscriptionID that shall consist on the following structure: <MCC>+<MNC>+"-"+<OriginalSubscriptionID>

EXAMPLE: If the NRF in a Home PLMN (where MCC = 123, and MNC=456) creates a subscription with value "subs987654", the subscriptionID that the NRF in Serving PLMN would send to the NF Service Consumer in Serving PLMN is: "123456-subs987654"

The URI in the Location header that the NRF in Serving PLMN returns to the NF Service Consumer in Serving PLMN shall contain a <subscriptionId> modified as described above and, if it is as an absolute URI, an apiRoot pointing to the address of the NRF in Serving PLMN.

2b. On failure or redirection, the NRF shall return 3xx/4xx/5xx response codes as listed in table 6.x.1.3.2.1-2

5.3.2.x.4 Subscription to NF Instances with intermediate forwarding NRF

When multiple NRFs are deployed in one PLMN, an NF Instance can subscribe to changes of NF Instances registered in an NRF to which it is not directly interacting. The subscription message is forwarded by an intermediate NRF to which the subscribing NF instance is directly interacting.

For that, step 1 in clause 5.3.2.x.2 is executed (send a POST request to the NRF-1 in the Serving PLMN); this request shall include the SubscriptionData parameter in the request body.

Figure 18:
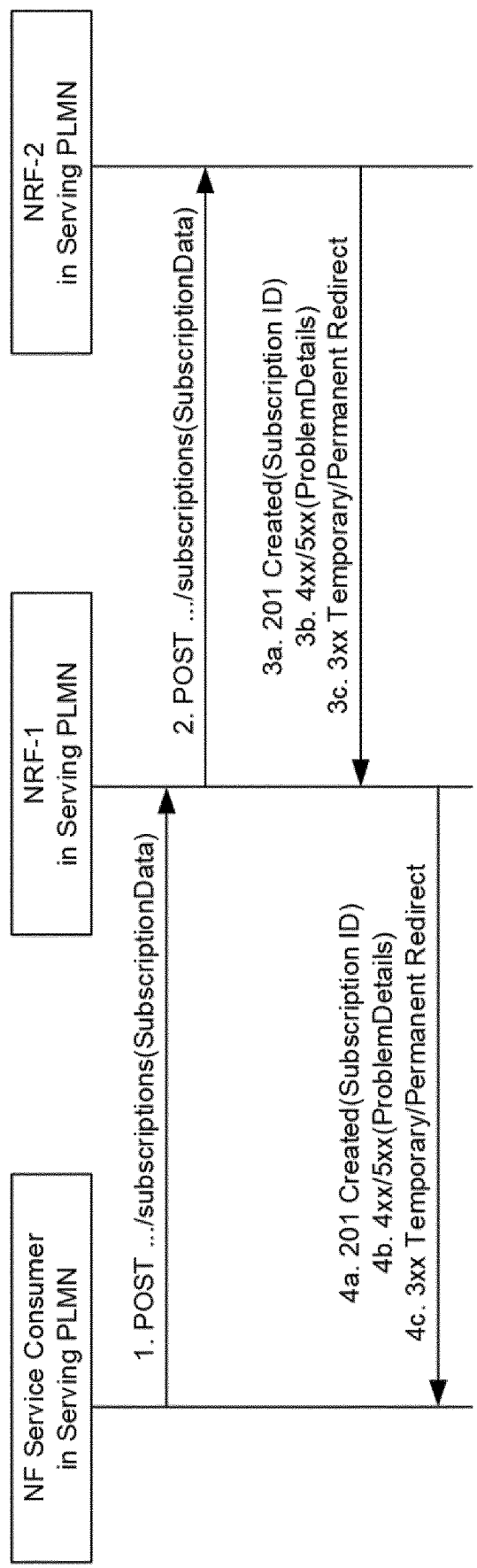

Then, steps 1-4 in Figure 18 are executed between NF Service Consumer in Serving PLMN, NRF-1 in Serving PLMN and NRF-2 in Serving PLMN. In these steps, NRF-1 sends the subscription request to a pre-configured NRF-2. NRF-2 requests corresponding NRF (e.g. the NF Service Producer registered NRF) and returns a subscriptionID identifying the created subscription and this subscriptionID is sent to the NF Service Consumer via NRF-1.

Finally, step 2 in clause 5.3.2.x.2 is executed; the subscriptionID shall be sent to the NF Service Consumer.

Figure 18 illustrates a subscription with intermediate forwarding NRF. The steps illustrated in Figure 18 are as follows:

1. NRF-1 receives a subscription request but does not have the information to fulfil the request. Then NRF-1 sends the subscription request to a pre-configured NRF-2.

2. Upon receiving a subscription request, based on the SubscriptionData contained in the subscription request (e.g.NF type) and locally stored information (see clause 5.2.2.2.3), NRF-2 shall identify the next hop NRF and forward the subscription request to that NRF (i.e. NF Service Producer registered NRF).

3a. On success, "201 Created" shall be returned by NRF-2.

3b. On failure, i.e. if the creation of the subscription fails, the NRF-2 shall return "4XX/5XX" response.

3c. In the case of redirection, the NRF shall return 3xx status code, which shall contain a Location header with an URI pointing to the endpoint of another NRF service instance.

4a. NRF-1 forwards the success response to NF Service Consumer. The payload body of the POST response shall contain the representation describing the status of the request and the "Location" header shall be present and shall contain the URI of the created resource. The authority and/or deployment-specific string of the apiRoot of the created resource URI may differ from the authority and/or deployment-specific string of the apiRoot of the request URI received in the POST request.

4b. On failure, NRF-1 forwards the error response to NF Service Consumer.

4c. In the case of redirection, the NRF shall return 3xx status code, which shall contain a Location header with an URI pointing to the endpoint of another NRF service instance.

5.3.2.x.5 Subscription to NF Instances with intermediate redirecting NRF

When multiple NRFs are deployed in one PLMN, an NF Instance can subscribe to changes of NF Instances registered in another NRF. The subscription message is redirected by a third NRF.

For that, step 1 in clause 5.3.2.x.2 is executed (send a POST request to the NRF-1 in the Serving PLMN); this request shall include the SubscriptionData parameter in the request body.

Figure 19:
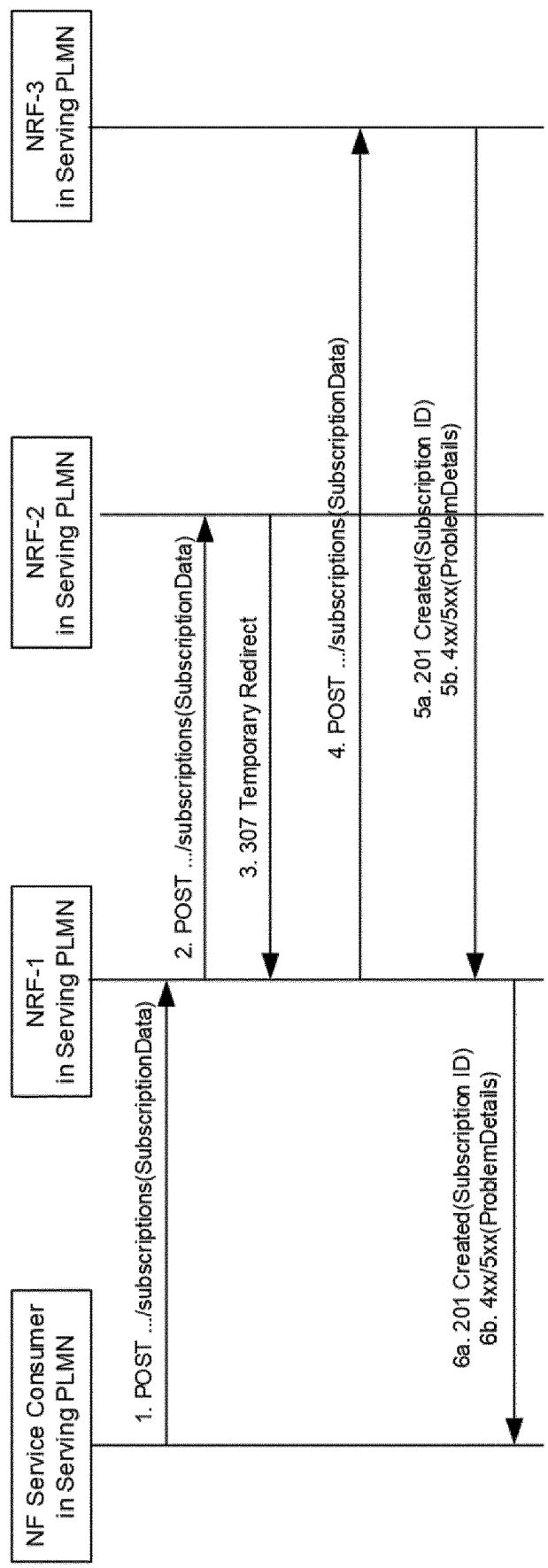

Then, steps 2-5 in Figure 19 are executed between NRF-1, NRF-2 and NRF-3.

Finally, step 2 in clause 5.3.2.x.2 is executed; the subscriptionID shall be sent to the NF Service Consumer.

Figure 19 illustrates a subscription to NF Instances with intermediate redirecting NRF. The steps illustrated in Figure 19 are as follows:

1. NF Service Consumer send a subscription request to NRF-1.

2. NRF-1 receives a subscription request but does not have the information to fulfil the request. Then NRF-1 sends the subscription request to a pre-configured NRF-2.

3. Upon receiving a subscription request, based on the SubscriptionData contained in the subscription request (e.g.NF type) and locally stored information (see clause 5.2.2.2.3), NRF-2 shall identify the next hop NRF, and redirect the subscription request by returning HTTP 307 Temporary Redirect response.

The 307 Temporary Redirect response shall contain a Location header field, the host part of the URI in the Location header field represents NRF-3.

4. Upon receiving 307 Temporary Redirect response, NRF-1 sends the subscription request to NRF-3 by using the URI contained in the Location header field of the 307 Temporary Redirect response.

5a. On success, "201 Created" shall be returned by NRF-3.

5b. On failure, if the creation of the subscription fails at the NRF-3, the NRF-3 shall return "4XX/5XX" response.

6a. On success, "201 Created" shall be forwarded to NF Service Consumer via NRF-1. The payload body of the POST response shall contain the representation describing the status of the request and the "Location" header shall be present and shall contain the URI of the created resource. The authority and/or deployment-specific string of the apiRoot of the created resource URI may differ from the authority and/or deployment-specific string of the apiRoot of the request URI received in the POST request.

6b. On failure, if the creation of the subscription fails, "4XX/5XX" shall be forwarded to NF Service Consumer via NRF-1.

> * * * Next Change * * * *

5.3.2.y   PriorityStatusNotify

5.3.2.y.1   General

This service operation notifies each NF Service Consumer that was previously subscribed to receiving notifications of the NRF calculated priority changes of the NF Instance(s). The notification is sent to a callback URI that each NF Service Consumer provided during the subscription (see PriorityStatusSubscribe operation in 5.3.2.x).

5.3.2.y.2   Notification from NRF in the same PLMN

The operation is invoked by issuing a POST request to each callback URI of the different subscribed NF Instances.

Figure 20:
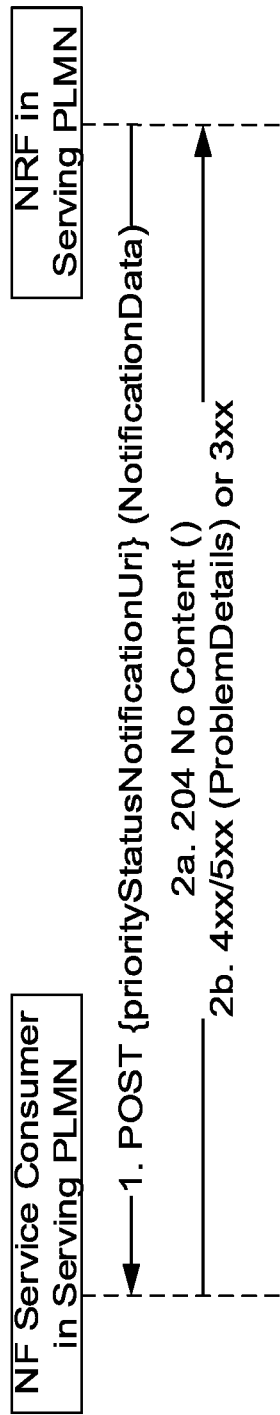

Figure 20 illustrates a notification from NRF in the same PLMN. The steps illustrated in Figure 20 are as follows:

1. The NRF shall send a POST request to the callback URI. The request body shall contain the updated NRF calculated priority of the NF instance(s).

2a. On success, "204 No content" shall be returned by the NF Service Consumer.

2b. On failure or redirection:

- If the NF Service Consumer does not consider the "nfStatusNotificationUri" as a valid notification URI (e.g., because the URI does not belong to any of the existing subscriptions created by the NF Service Consumer in the NRF), the NF Service Consumer shall return "404 Not Found" status code with the ProblemDetails IE providing details of the error.

- In the case of redirection, the NRF shall return 3xx status code, which shall contain a Location header with an URI pointing to the endpoint of another NRF service consumer endpoint.

5.3.2.y.3   Notification from NRF in a different PLMN

The operation is invoked by issuing a POST request to each callback URI of the different subscribed NF Instances.

Figure 21:
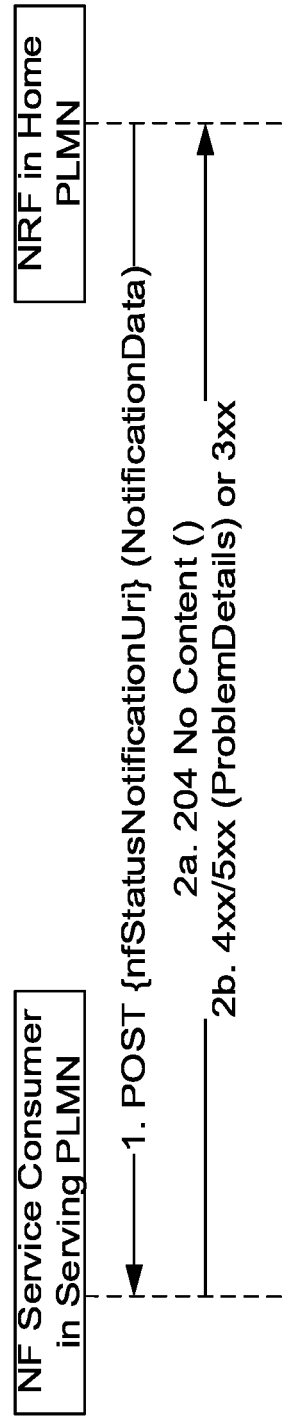

Figure 21 illustrates a notification from NRF in a different PLMN. The steps illustrated in Figure 21 are as follows:

Steps 1 and 2 are identical to steps 1 and 2 in Figure 20.

It should be noted that the POST request shall be sent directly from the NRF in home PLMN to the NF Service Consumer in Serving PLMN, without involvement of the NRF in Serving PLMN.

5.3.2.y.4 Notification for subscription via intermediate NRF

Figure 22:
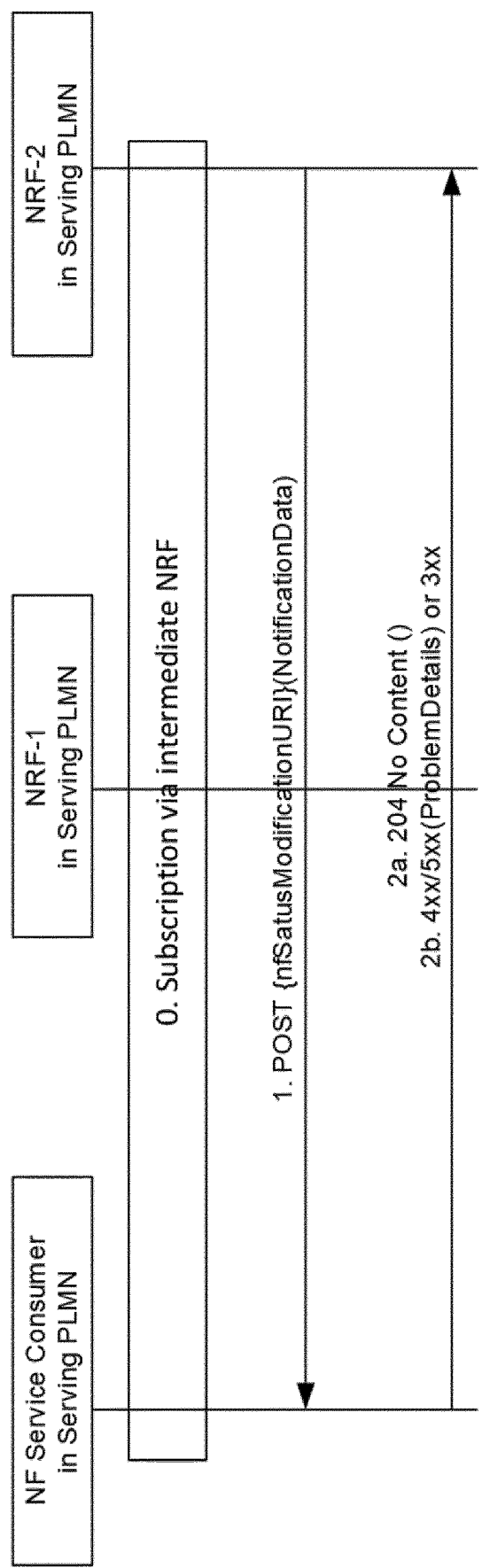

Figure 22 illustrates a notification for subscription via intermediate NRF. The steps illustrated in Figure 22 are as follows:

Step 0 is the NF Service Consumer creates a subscription to NRF-2 via intermediate NRF.

Steps 1 and 2 are identical to steps 1 and 2 in Figure 20.

The POST request shall be sent directly from NRF-2 to the NF Service Consumer without involvement of NRF-1.

---

* * * Next Change * * * *

5.3.2.z PriorityStatusUnSubscribe

5.3.2.z.1 General

This service operation removes an existing subscription to notifications.

5.3.2.z.2 Subscription removal in the same PLMN

It is executed by deleting a given resource identified by a "subscriptionID". The operation is invoked by issuing a DELETE request on the URI representing the specific subscription received in the Location header field of the "201 Created" response received during a successful subscription (see clause 5.3.2.x).

Figure 23:
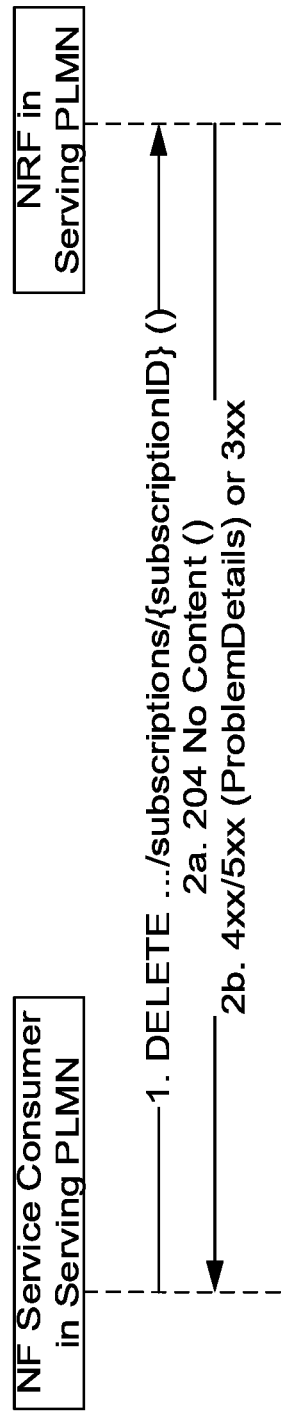

Figure 23 illustrates subscription removal in the same PLMN. The steps illustrated in Figure 23 are as follows:

1. The NF Service Consumer shall send a DELETE request to the resource URI representing the individual subscription. The request body shall be empty.

2a. On success, "204 No Content" shall be returned. The response body shall be empty.

2b. On failure or redirection, the NRF shall return 3xx/4xx/5xx response codes as listed in table 6.x.1.3.2.1-2.

5.3.2.z.3 Subscription removal in a different PLMN

The subscription removal in a different PLMN is done by deleting a resource identified by a "subscriptionID", in the NRF of the Home PLMN.

For that, step 1 in clause 5.3.2.z.2 is executed (send a DELETE request to the NRF in the Serving PLMN); this request shall include the identity of the PLMN of the home NRF (MCC/MNC values) as a leading prefix of the subscriptionID (see clause 5.3.2.x.3).

Figure 24:
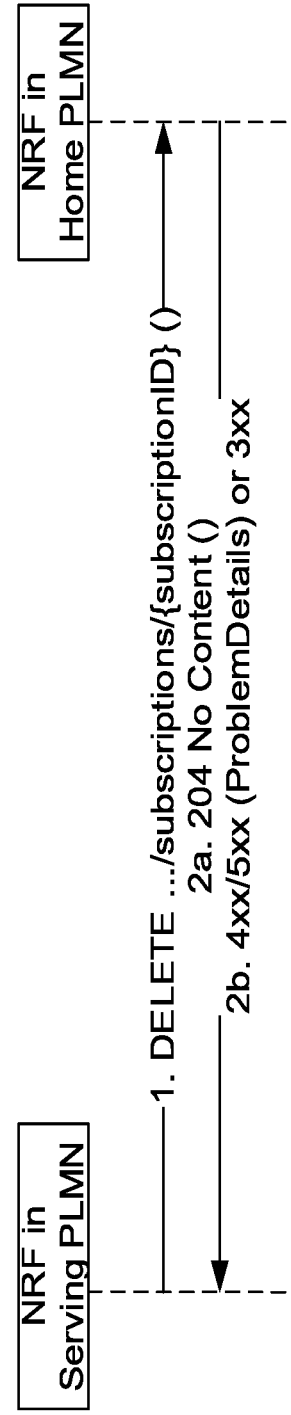

Then, steps 1-2 in Figure 24 are executed, between the NRF in the Serving PLMN and the NRF in the Home PLMN. In this step, the subscriptionID sent to the NRF in the Home PLMN shall not contain the identity of the PLMN (i.e., it shall be the same subscriptionID value as originally generated by the NRF in the Home PLMN). The NRF in the Home PLMN returns a status code with the result of the operation.

Finally, step 2 in clause 5.3.2.z.2 is executed; a status code is returned from the NRF in serving PLMN to the NF Service Consumer in Serving PLMN in accordance to the result received from NRF in Home PLMN.

Figure 24 illustrates subscription removal in a different PLMN. The steps illustrated in Figure 24 are as follows:

1. The NF Service Consumer shall send a DELETE request to the resource URI representing the individual subscription. The request body shall be empty.

2a. On success, "204 No Content" shall be returned. The response body shall be empty.

2b. On failure or redirection, the NRF shall return 3xx/4xx/5xx response codes as listed in table 6.x.1.3.2.1-2.

---

**\* \* \* Next Change \* \* \* \***

---

6.2.3.1     Overview

Figure 25:
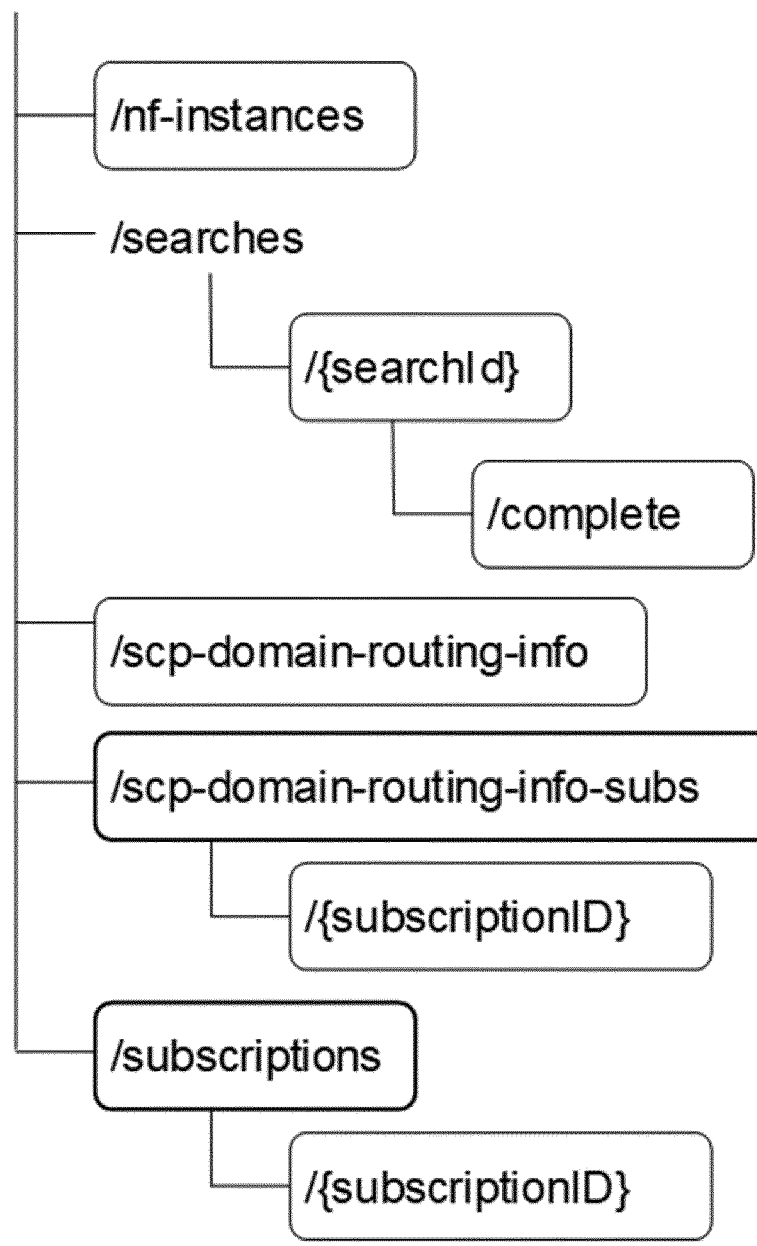
FIG. 25 is a schematic illustration of a uniform resource identifier structure.

The structure of the Resource URIs of the NFDiscovery service is shown in Figure 25.

Figure 25 illustrates a resource URI structure of the NFDiscovery API.

Table 6.2.3.1-1 provides an overview of the resources and applicable HTTP methods.

Table 6.2.3.1-1: Resources and methods overview

| Resource name | Resource URI | HTTP method or custom operation | Description |
|---|---|---|---|
| nf-instances (Store) | /nf-instances | GET | Retrieve a collection of NF Instances according to certain filter criteria. |
| Stored Search (Document) | /searches/{searchId} | GET | Retrieve a collection of NF Instances, previously stored by NRF as a consequence of a prior search result. |
| Complete Stored Search (Document) | /searches/{searchId}/complete | GET | Retrieve a collection of NF Instances, previously stored by NRF as a consequence of a prior search result, without applying any client restriction on the number of instances (e.g. "limit" or "max-payload-size" query parameters). |
| SCP Domain Routing Information (Document) | /scp-domain-routing-info | GET | Retrieve the SCP Domain Routing Information. |
| SCP Domain Routing Info Subscriptions (Collection) | /scp-domain-routing-info-subs | POST | Subscribe to SCP Domain Routing Information change. |
| Individual SCP Domain Routing Info Subscription (Document) | /scp-domain-routing-info-subs/{subscriptionID} | DELETE | Unsubscribe to SCP Domain Routing Information change. |
| subscriptions (Collection) | /subscriptions | POST | Creates a new subscription in NRF to changes on NRF calculated priority of NF Instances. |
| subscription (Document) | /subscriptions/{subscriptionID} | DELETE | Deletes an existing subscription from NRF. |

* * * Next Change * * * *

6.2.3.x    Resource: subscriptions (Collection)

6.2.3.x.1    Description

This resource represents a collection of subscriptions to changes on NRF calculated priority of NF Instances.

6.2.3.x.2    Resource Definition

Resource URI: {apiRoot}/nnrf-disc/v1/subscriptions

This resource shall support the resource URI variables defined in table 6.2.3.x.2-1.

Table 6.2.3.x.2-1: Resource URI variables for this resource

| Name | Data type | Definition |
|------|-----------|------------|
| apiRoot | string | See clause 6.1.1 |

6.2.3.x.3 Resource Standard Methods

6.2.3.x.3.1 POST

This method creates a new subscription. This method shall support the URI query parameters specified in table 6.2.3.x.3.1-1.

Table 6.2.3.x.3.1-1: URI query parameters supported by the POST method on this resource

| Name | Data type | P | Cardinality | Description |
|------|-----------|---|-------------|-------------|
| n/a |  |  |  |  |

This method shall support the request data structures specified in table 6.2.3.x.3.1-2 and the response data structures and response codes specified in table 6.2.3.x.3.1-3.

Table 6.2.3.x.3.1-2: Data structures supported by the POST Request Body on this resource

| Data type | P | Cardinality | Description |
|-----------|---|-------------|-------------|
| SubscriptionData | M | 1 | The request body contains the input parameters for the subscription. |

Table 6.2.3.x.3.1-3: Data structures supported by the POST Response Body on this resource

| Data type | P | Cardinality | Response codes | Description |
|---|---|---|---|---|
| SubscriptionData | M | 1 | 201 Created | This case represents the successful creation of a subscription.<br><br>Upon success, the HTTP response shall include a "Location" HTTP header that contains the resource URI of the created resource. |
| RedirectResponse | O | 0..1 | 307 Temporary Redirect | The NRF shall generate a Location header field containing a URI pointing to the endpoint of another NRF service instance to which the request should be sent.<br>If an SCP redirects the message to another SCP then the location header field shall contain the same URI or a different URI pointing to the endpoint of the NF service producer to which the request should be sent. |
| RedirectResponse | O | 0..1 | 308 Permanent Redirect | The NRF shall generate a Location header field containing a URI pointing to the endpoint of another NRF service instance to which the request should be sent.<br>If an SCP redirects the message to another SCP then the location header field shall contain the same URI or a different URI pointing to the endpoint of the NF service producer to which the request should be sent. |
| NOTE: | The mandatory HTTP error status codes for the POST method listed in Table 5.2.7.1-1 of 3GPP TS 29.500 [4] other than those specified in the table above also apply, with a ProblemDetails data type (see clause 5.2.7 of 3GPP TS 29.500 [4]). ||||

Table 6.2.3.x.3.1-4: Headers supported by the 201 Response Code on this resource

| Name | Data type | P | Cardinality | Description |
|---|---|---|---|---|
| Location | string | M | 1 | Contains the URI of the newly created resource, according to the structure: {apiRoot}/nnrf-disc/v1/subscriptions/{subscriptionId} |

Table 6.2.3.x.3.1-5: Headers supported by the 307 Response Code on this resource

| Name | Data type | P | Cardinality | Description |
|---|---|---|---|---|
| Location | string | M | 1 | A URI pointing to the endpoint of the NRF service instance to which the request should be sent |

Table 6.2.3.x.3.1-6: Headers supported by the 308 Response Code on this resource

| Name | Data type | P | Cardinality | Description |
|---|---|---|---|---|
| Location | string | M | 1 | A URI pointing to the endpoint of the NRF service instance to which the request should be sent |

> * Next Change **

6.2.3.y  Resource: subscription (Document)

6.2.3.y.1  Description

This resource represents an individual subscription to changes on NRF calculated priority of NF Instances.

6.2.3.y.2  Resource Definition

Resource URI: {apiRoot}/nnrf-disc/v1/subscriptions/{subscriptionID}

This resource shall support the resource URI variables defined in table 6.2.3.y.2-1.

Table 6.2.3.y.2-1: Resource URI variables for this resource

| Name | Data type | Definition |
| --- | --- | --- |
| apiRoot | string | See clause 6.1.1 |
| subscriptionID | string | Represents a specific subscription |

6.2.3.y.3  Resource Standard Methods

6.2.3.y.3.1  DELETE

This method terminates an existing subscription. This method shall support the URI query parameters specified in table 6.2.3.y.3.1-1.

Table 6.2.3.y.3.1-1: URI query parameters supported by the DELETE method on this resource

| Name | Data type | P | Cardinality | Description |
| --- | --- | --- | --- | --- |
| n/a | | | | |

This method shall support the request data structures specified in table 6.2.3.y.3.1-2 and the response data structures and response codes specified in table 6.2.3.y.3.1-3.

Table 6.2.3.y.3.1-2: Data structures supported by the DELETE Request Body on this resource

| Data type | P | Cardinality | Description |
| --- | --- | --- | --- |
| n/a | | | |

Table 6.2.3.y.3.1-3: Data structures supported by the DELETE Response Body on this resource

| Data type | P | Cardinality | Response codes | Description |
|---|---|---|---|---|
| n/a | | | 204 No Content | |
| RedirectResponse | O | 0..1 | 307 Temporary Redirect | The NRF shall generate a Location header field containing a URI pointing to the endpoint of another NRF service instance to which the request should be sent. If an SCP redirects the message to another SCP then the location header field shall contain the same URI or a different URI pointing to the endpoint of the NF service producer to which the request should be sent. |
| RedirectResponse | O | 0..1 | 308 Permanent Redirect | The NRF shall generate a Location header field containing a URI pointing to the endpoint of another NRF service instance to which the request should be sent. If an SCP redirects the message to another SCP then the location header field shall contain the same URI or a different URI pointing to the endpoint of the NF service producer to which the request should be sent. |
| NOTE: The mandatory HTTP error status codes for the DELETE method listed in Table 5.2.7.1-1 of 3GPP TS 29.500 [4] other than those specified in the table above also apply, with a ProblemDetails data type (see clause 5.2.7 of 3GPP TS 29.500 [4]). ||||||

Table 6.2.3.y.3.1-4: Headers supported by the 307 Response Code on this resource

| Name | Data type | P | Cardinality | Description |
|---|---|---|---|---|
| Location | string | M | 1 | A URI pointing to the endpoint of the NRF service instance to which the request should be sent |

Table 6.2.3.y.3.1-5: Headers supported by the 308 Response Code on this resource

| Name | Data type | P | Cardinality | Description |
|---|---|---|---|---|
| Location | string | M | 1 | A URI pointing to the endpoint of the NRF service instance to which the request should be sent |

* * * Next Change * * * *

6.2.5.1 General

This clause specifies the notifications provided by the Nnrf_NFDiscovery service.

The delivery of notifications shall be supported as specified in clause 6.2 of 3GPP TS 29.500 [4] for Server-initiated communication.

Table 6.2.5.1-1: Notifications overview

| Notification | Resource URI | HTTP method or custom operation | Description (service operation) |
|---|---|---|---|
| SCP Domain Routing Information Change Notification | {callbackUri} (NF Service Consumer provided callback reference) | POST | Notify about change of SCP Domain Routing Information |
| NRF Calculated Priority Change Notification | {priorityStatusNotificationUri} (NF Service Consumer provided callback reference) | POST | Notify about change on NRF calculated priority of NF Instance(s). |

* * * Next Change * * * *

6.2.5.x NRF Calculated Priority Change Notification

6.2.5.x.1 Description

The NF Service Consumer provides a callback URI for getting notified about change on NRF calculated priority of NF Instance(s). The NRF shall notify the NF Service Consumer, when the NRF calculated priority of the monitored NF instances changed.

6.2.5.x.2 Notification Definition

The POST method shall be used for NF Instance Status notification and the URI shall be the callback reference provided by the NF Service Consumer during the subscription to this notification.

Resource URI: {priorityStatusNotificationUri}

Support of URI query parameters is specified in table 6.2.5.x.2-1.

Table 6.2.5.x.2-1: URI query parameters supported by the POST method

| Name | Data type | P | Cardinality | Description |
|---|---|---|---|---|
| n/a | | | | |

Support of request data structures is specified in table 6.2.5.x.2-2, and support of response data structures and response codes is specified in table 6.2.5.x-3.

Table 6.2.5.x.2-2: Data structures supported by the POST Request Body

| Data type | P | Cardinality | Description |
|---|---|---|---|
| NotificationData | M | 1 | Representation of the NF Instance status notification. |

Table 6.2.5.x.2-3: Data structures supported by the POST Response Body

| Data type | P | Cardinality | Response codes | Description |
|---|---|---|---|---|
| N/A | | | 204 No Content | This case represents a successful notification of the NF Instance status event. |
| RedirectResponse | O | 0..1 | 307 Temporary Redirect | The NF service consumer shall generate a Location header field containing a URI pointing to the endpoint of another NF Service Consumer instance to which the notification should be sent. If an SCP redirects the message to another SCP then the location header field shall contain the same URI or a different URI pointing to the endpoint of the NF service consumer to which the notification should be sent. |
| RedirectResponse | O | 0..1 | 308 Permanent Redirect | The NF service consumer shall generate a Location header field containing a URI pointing to the endpoint of another NF Service Consumer instance to which the notification should be sent. If an SCP redirects the message to another SCP then the location header field shall contain the same URI or a different URI pointing to the endpoint of the NF service consumer to which the notification should be sent. |
| NOTE: | The mandatory HTTP error status codes for the POST method listed in Table 5.2.7.1-1 of 3GPP TS 29.500 [4] other than those specified in the table above also apply, with a ProblemDetails data type (see clause 5.2.7 of 3GPP TS 29.500 [4]). | | | |

Table 6.2.5.x.2-4: Headers supported by the 307 Response Code on this endpoint

| Name | Data type | P | Cardinality | Description |
|---|---|---|---|---|
| Location | string | M | 1 | A URI pointing to the endpoint of the NF service consumer instance to which the request should be sent |

Table 6.2.5.x.2-5: Headers supported by the 308 Response Code on this endpoint

| Name | Data type | P | Cardinality | Description |
|---|---|---|---|---|
| Location | string | M | 1 | A URI pointing to the endpoint of the NF service consumer instance to which the request should be sent |

* * * Next Change * * * *

6.2.6.1  General

This clause specifies the application data model supported by the API.

Table 6.2.6.1-1 specifies the data types defined for the Nnrf_NFDiscovery service based interface protocol.

Table 6.2.6.1-1: Nnrf_NFDiscovery specific Data Types

| Data type | Clause defined | Description |
|---|---|---|
| SearchResult | 6.2.6.2.2 | Contains the list of NF Profiles returned in a Discovery response. |
| NFProfile | 6.2.6.2.3 | Information of an NF Instance discovered by the NRF. |
| NFService | 6.2.6.2.4 | Information of a given NF Service Instance; it is part of the NFProfile of an NF Instance discovered by the NRF. |
| StoredSearchResult | 6.2.6.2.5 | Contains a complete search result (i.e. a number of discovered NF Instances), stored by NRF as a consequence of a prior search result. |
| PreferredSearch | 6.2.6.2.6 | Contains information on whether the returned NFProfiles match the preferred query parameters. |
| NfInstanceInfo | 6.2.6.2.7 | Contains information on an NF profile matching a discovery request. |
| ScpDomainRoutingInfo | 6.2.6.2.8 | SCP Domain Routing Information |
| ScpDomainConnectivity | 6.2.6.2.9 | SCP Domain Routing Information |
| ScpDomainRoutingInfoSubscription | 6.2.6.2.10 | SCP Domain Routing Information Subscription |
| ScpDomainRoutingInfoNotification | 6.2.6.2.11 | Notification for SCP Domain Routing Information Update |
| SubscriptionData | 6.2.6.2.x | Information of a subscription to changes on NRF calculated priority of NF instances. |
| NotificationData | 6.2.6.2.y | Data sent in notifications from NRF NF service consumer, including changes on NRF calculated priority of NF instances. |
| PriorityStatus | 6.2.6.2.z | Updated NRF calculated priority status of NF instance |
| PriorityAssistInformation | 6.2.6.2.a | Assist information for NRF performing priority calculation of NF instances. |

Table 6.2.6.1-2 specifies data types re-used by the Nnrf_NFDiscovery service-based interface protocol from other specifications, including a reference to their respective specifications and when needed, a short description of their use within the Nnrf_NFDiscovery service-based interface.

Table 6.2.6.1-2: Nnrf_NFDiscovery re-used Data Types

| Data type | Reference | Comments |
|---|---|---|
| Snssai | 3GPP TS 29.571 [7] | |
| PlmnId | 3GPP TS 29.571 [7] | |
| Dnn | 3GPP TS 29.571 [7] | |
| Tai | 3GPP TS 29.571 [7] | |
| SupportedFeatures | 3GPP TS 29.571 [7] | |
| NfInstanceId | 3GPP TS 29.571 [7] | |
| Uri | 3GPP TS 29.571 [7] | |
| Gpsi | 3GPP TS 29.571 [7] | |
| GroupId | 3GPP TS 29.571 [7] | |
| Guami | 3GPP TS 29.571 [7] | |
| IPv4Addr | 3GPP TS 29.571 [7] | |
| IPv6Addr | 3GPP TS 29.571 [7] | |
| UriScheme | 3GPP TS 29.571 [7] | |
| Dnai | 3GPP TS 29.571 [7] | |
| NfGroupId | 3GPP TS 29.571 [7] | Identifier of a NF Group |
| PduSessionType | 3GPP TS 29.571 [7] | |
| AtsssCapability | 3GPP TS 29.571 [7] | |
| PlmnIdNid | 3GPP TS 29.571 [7] | |
| NfSetId | 3GPP TS 29.571 [7] | |
| NfServiceSetId | 3GPP TS 29.571 [7] | |
| ExtSnssai | 3GPP TS 29.571 [7] | |
| DurationSec | 3GPP TS 29.571 [7] | |
| RedirectResponse | 3GPP TS 29.571 [7] | Response body of the redirect response message. |
| MbsSessionId | 3GPP TS 29.571 [7] | MBS Session Identifier |
| IpAddr | 3GPP TS 29.571 [7] | IP Address |
| EventId | 3GPP TS 29.520 [32] | Defined in Nnwdaf_AnalyticsInfo API. |
| NwdafEvent | 3GPP TS 29.520 [32] | Defined in Nnwdaf_EventsSubscription API. |
| ExtGroupId | 3GPP TS 29.503 [36] | |
| ExternalClientType | 3GPP TS 29.572 [33] | |
| SupportedGADShapes | 3GPP TS 29.572 [33] | Supported GAD Shapes |
| DefaultNotificationSubscription | 3GPP TS 29.510 | See clause 6.1.6.2.4 |
| IPEndPoint | 3GPP TS 29.510 | See clause 6.1.6.2.5 |
| NFType | 3GPP TS 29.510 | See clause 6.1.6.3.3 |
| UdrInfo | 3GPP TS 29.510 | See clause 6.1.6.2.6 |
| UdmInfo | 3GPP TS 29.510 | See clause 6.1.6.2.7 |
| AusfInfo | 3GPP TS 29.510 | See clause 6.1.6.2.8 |
| SupiRange | 3GPP TS 29.510 | See clause 6.1.6.2.9 |
| AmfInfo | 3GPP TS 29.510 | See clause 6.1.6.2.11 |
| SmfInfo | 3GPP TS 29.510 | See clause 6.1.6.2.12 |
| UpfInfo | 3GPP TS 29.510 | See clause 6.1.6.2.13 |
| PcfInfo | 3GPP TS 29.510 | See clause 6.1.6.2.20 |
| BsfInfo | 3GPP TS 29.510 | See clause 6.1.6.2.21 |
| ChfInfo | 3GPP TS 29.510 | See clause 6.1.6.2.32 |
| NFServiceVersion | 3GPP TS 29.510 | See clause 6.1.6.2.19 |
| PlmnSnssai | 3GPP TS 29.510 | See clause 6.1.6.2.44 |
| NwdafInfo | 3GPP TS 29.510 | See clause 6.1.6.2.45 |
| NFStatus | 3GPP TS 29.510 | See clause 6.1.6.3.7 |
| DataSetId | 3GPP TS 29.510 | See clause 6.1.6.3.8 |
| ServiceName | 3GPP TS 29.510 | See clause 6.1.6.3.11 |
| NFServiceStatus | 3GPP TS 29.510 | See clause 6.1.6.3.12 |
| LmfInfo | 3GPP TS 29.510 | See clause 6.1.6.2.46 |
| GmlcInfo | 3GPP TS 29.510 | See clause 6.1.6.2.47 |
| NefInfo | 3GPP TS 29.510 | See clause 6.1.6.2.48 |
| PfdData | 3GPP TS 29.510 | See clause 6.1.6.2.49 |
| AfEventExposureData | 3GPP TS 29.510 | See clause 6.1.6.2.50 |
| PcscfInfo | 3GPP TS 29.510 | See clause 6.1.6.2.53 |
| HssInfo | 3GPP TS 29.510 | See clause 6.1.6.2.57 |
| ImsiRange | 3GPP TS 29.510 | See clause 6.1.6.2.58 |

| VendorSpecificFeature | 3GPP TS 29.510 | See clause 6.1.6.2.62 |
| ScpInfo | 3GPP TS 29.510 | See clause 6.1.6.2.65 |
| NefId | 3GPP TS 29.510 | See clause 6.1.6.3 |
| VendorId | 3GPP TS 29.510 | See clause 6.1.6.3 |
| AnNodeType | 3GPP TS 29.510 | See clause 6.1.6.3.13 |
| SuciInfo | 3GPP TS 29.510 | See clause 6.1.6.2.71 |
| SeppInfo | 3GPP TS 29.510 | See clause 6.1.6.2.72 |
| NsacfInfo | 3GPP TS 29.510 | See clause 6.1.6.2.81 |
| NsacfCapability | 3GPP TS 29.510 | See clause 6.1.6.2.82 |
| MbSmfInfo | 3GPP TS 29.510 | See clause 6.1.6.2.85 |
| TsctsfInfo | 3GPP TS 29.510 | See clause 6.1.6.2.91 |

\* \* \* Next Change \* \* \* \*

6.2.6.2.2 Type: SearchResult

Table 6.2.6.2.2-1: Definition of type SearchResult

| Attribute name | Data type | P | Cardinality | Description |
|---|---|---|---|---|
| validityPeriod | integer | M | 1 | It shall contain the time in seconds during which the discovery result is considered valid and can be cached by the NF Service Consumer. This value shall be the same as the value contained in the "max-age" parameter of the "Cache-Control" header field sent in the HTTP response. |
| nfInstances | array(NFProfile) | M | 0..N | It shall contain an array of NF Instance profiles, matching the search criteria indicated by the query parameters of the discovery request. If the nfInstancesList IE is absent, an empty array means there is no NF instance that can match the search criteria. |
| searchId | string | O | 0..1 | This IE may be present if the NRF stores the result of the current service discovery response in a given URL (server-side caching), to make it available in the future to NF Service Consumers without having to compute the whole search process again. |
| numNfInstComplete | Uint32 | O | 0..1 | This IE may be present when the total number of NF Instances found by NRF, as the result of the service discovery process, is higher than the actual number of NF Instances included in the attribute nfInstances of the SearchResult object. This may happen due to the NF Service Consumer including in the discovery request parameters such as "limit" or "max-payload-size". |
| preferredSearch | PreferredSearch | C | 0..1 | This IE shall be present to indicate whether all the returned NFProfiles match the preferred query parameters, if the discovery request contain any of the query parameter defined in the PreferredSearch data type. |
| nrfSupportedFeatures | SupportedFeatures | C | 0..1 | Features supported by the NRF for the NFDiscovery service (see clause 6.2.9).<br>This IE should be present if the NRF supports at least one feature. |
| nfInstanceList | map(NfInstanceInfo) | O | 1..N | This IE may be present if the NF Discovery request indicated support of the Enh-NF-Discovery feature. When present, this IE shall contain a map of NfInstanceInfo of NF instance profiles matching the search criteria indicated by the query parameters of the discovery request. The key of the map shall be the NF instance ID. |
| modifiedPriorityInd | boolean | O | 0..1 | This IE shall indicate whether the NRF calculated priority values are returned in the search result or not. (NOTE)<br><br>When present, this IE shall be set as following:<br>- true: the NRF calculated priority values of NF instances are returned in the search result.<br>- false: the registered priority values of NF instances are returned in the search result |
| NOTE: If NRF calculated priority values are returned in the search result, the NF service consumer may subscribe to the changes of NRF calculated priority value on the candidate NF instances (see clause 5.3.2.x). |||||

\* \* \* Next Change \* \* \* \*

6.2.6.2.x    Type: SubscriptionData

Table 6.2.6.2.x-1: Definition of type SubscriptionData

| Attribute name | Data type | P | Cardinality | Description |
|---|---|---|---|---|
| priorityStatusNotificationUri | Uri | M | 1 | Callback URI where the NF Service Consumer will receive the notifications from NRF. |
| nfList | array(NfInstanceId) | M | 1..N | If present, this IE shall contain a list of NF instance IDs identifying the target NF instances to be monitored. |
| validityTime | DateTime | C | 0..1 | Time instant after which the subscription becomes invalid. This parameter may be sent by the client, as a hint to the server, but it shall be always sent back by the server (regardless of the presence of the attribute in the request) in the response to the subscription creation request. |
| assistInfo | PriorityAssistInformation | O | 0..1 | This IE contain the assist information for NRF performing priority calculation of the NF instances. |
| plmnId | PlmnId | O | 0..1 | If present, this attribute contains the home PLMN ID of the NF Instance(s) whose NRF modified priority changes is requested to be monitored. |
| nid | Nid | O | 0..1 | If present, this attribute contains the target NID that, together with the plmnId attribute, identifies the SNPN of the NF Instance(s) whose status is requested to be monitored. |
| hnrfDiscUri | Uri | C | 0..1 | If included, this IE shall contain the API URI of the Nnrf_NFDiscovery Service (see clause 6.1.2) of the home NRF.<br><br>It shall be included if the NF Service Consumer has previously received such API URI from the NSSF in the home PLMN (see clause 6.1.6.2.11 of 3GPP TS 29.531 [42]). |

* * * Next Change * * * *

6.2.6.2.y    Type: NotificationData

Table 6.2.6.2.y-1: Definition of type NotificationData

| Attribute name | Data type | P | Cardinality | Description |
|---|---|---|---|---|
| nfPriorityStatusList | map(PriorityStatus) | M | 1..N | This IE shall contain a map of changed PriorityStatus of NF instances. The key of the map shall be the NF instance ID. |

* * * Next Change * * * *

6.1.6.2.z  Type: PriorityStatus

Table 6.1.6.2.z-1: Definition of type PriorityStatus

| Attribute name | Data type | P | Cardinality | Description |
|---|---|---|---|---|
| priority | integer | O | 0..1 | When present, this IE shall indicate the updated NRF calculated priority of the NF instance (relative to other NFs of the same type) within the range 0 to 65535, to be used for NF selection; lower values indicate a higher priority. |
| servicePriorityList | map(integer) | O | 1..N | When present, this IE shall contain a map of updated NRF calculated priority value of NF Service Instance(s), where the NF service instance ID shall be used as the key of the map. |

* * * Next Change * * * *

6.1.6.2.a  Type: PriorityAssistInformation

Table 6.1.6.2.a-1: Definition of type PriorityAssistInformation

| Attribute name | Data type | P | Cardinality | Description |
|---|---|---|---|---|
| preferenceList | array(string) | M | 1..N | This IE contain the assist information for NRF to calculate the priority of the NF instance.<br><br>Each item of the array shall contain one preference of NF consumer and shall encode one of the following preferred query parameters in format as specified in Table 6.2.3.2.3.1:<br>- preferred-locality<br>- preferred-tai<br>- preferred-nf-instances<br>- preferred-api-versions<br>- preferred-full-plmn<br>- preferred-vendor-specific-features<br>- preferred-vendor-specific-nf-features<br><br>The NF consumer preference is included in the array in precedence order from higher to lower. |

* * * Next Change * * * *

A.3   Nnrf_NFDiscovery API

```
openapi: 3.0.0 info:
  version: '1.2.0-alpha.4'
  title: 'NRF NFDiscovery Service'
  description: |
    NRF NFDiscovery Service.
    © 2021, 3GPP Organizational Partners (ARIB, ATIS, CCSA, ETSI, TSDSI, TTA, TTC).
    All rights reserved.
```
************* Text Skipped for Clarify *****************

```yaml
/scp-domain-routing-info-subs/{subscriptionID}:
  delete:
    summary: Deletes a subscription
    operationId: ScpDomainRoutingInfoUnsubscribe
    tags:
      - Individual SCP Domain Routing Information Subscription (Document)
    parameters:
      - name: subscriptionID
        in: path
        required: true
        description: Unique ID of the subscription to remove
        schema:
          type: string
    responses:
      '204':
        description: Expected response to a successful subscription removal
      '400':
        $ref: 'TS29571_CommonData.yaml#/components/responses/400'
      '401':
        $ref: 'TS29571_CommonData.yaml#/components/responses/401'
      '403':
        $ref: 'TS29571_CommonData.yaml#/components/responses/403'
      '404':
        $ref: 'TS29571_CommonData.yaml#/components/responses/404'
      '411':
        $ref: 'TS29571_CommonData.yaml#/components/responses/411'
      '413':
        $ref: 'TS29571_CommonData.yaml#/components/responses/413'
      '415':
        $ref: 'TS29571_CommonData.yaml#/components/responses/415'
      '429':
        $ref: 'TS29571_CommonData.yaml#/components/responses/429'
      '500':
        $ref: 'TS29571_CommonData.yaml#/components/responses/500'
      '501':
        $ref: 'TS29571_CommonData.yaml#/components/responses/501'
      '503':
        $ref: 'TS29571_CommonData.yaml#/components/responses/503'
      default:
        $ref: 'TS29571_CommonData.yaml#/components/responses/default'

/subscriptions:
  post:
    summary: Create a new subscription
    operationId: CreateSubscription
    tags:
      - Subscriptions (Collection)
    parameters:
      - name: Content-Encoding
        in: header
        description: Content-Encoding, described in IETF RFC 7231
        schema:
          type: string
      - name: Accept-Encoding
        in: header
        description: Accept-Encoding, described in IETF RFC 7231
        schema:
          type: string
    requestBody:
      content:
        application/json:
          schema:
            $ref: '#/components/schemas/SubscriptionData'
      required: true
    responses:
      '201':
        description: Expected response to a valid request
        content:
          application/json:
            schema:
              $ref: '#/components/schemas/SubscriptionData'
        headers:
          Location:
```

```yaml
              description: 'Contains the URI of the newly created resource, according to
the structure: {apiRoot}/nnrf-disc/v1/subscriptions/{subscriptionId}'
              required: true
              schema:
                type: string
            Accept-Encoding:
              description: Accept-Encoding, described in IETF RFC 7694
              schema:
                type: string
            Content-Encoding:
              description: Content-Encoding, described in IETF RFC 7231
              schema:
                type: string
        '307':
          description: Temporary Redirect
          content:
            application/json:
              schema:
                $ref: 'TS29571_CommonData.yaml#/components/schemas/RedirectResponse'
          headers:
            Location:
              description: 'The URI pointing to the resource located on the redirect target NRF'
              required: true
              schema:
                type: string
        '308':
          description: Permanent Redirect
          content:
            application/json:
              schema:
                $ref: 'TS29571_CommonData.yaml#/components/schemas/RedirectResponse'
          headers:
            Location:
              description: 'The URI pointing to the resource located on the redirect target NRF'
              required: true
              schema:
                type: string
        '400':
          $ref: 'TS29571_CommonData.yaml#/components/responses/400'
        '401':
          $ref: 'TS29571_CommonData.yaml#/components/responses/401'
        '403':
          $ref: 'TS29571_CommonData.yaml#/components/responses/403'
        '404':
          $ref: 'TS29571_CommonData.yaml#/components/responses/404'
        '411':
          $ref: 'TS29571_CommonData.yaml#/components/responses/411'
        '413':
          $ref: 'TS29571_CommonData.yaml#/components/responses/413'
        '415':
          $ref: 'TS29571_CommonData.yaml#/components/responses/415'
        '429':
          $ref: 'TS29571_CommonData.yaml#/components/responses/429'
        '500':
          $ref: 'TS29571_CommonData.yaml#/components/responses/500'
        '501':
          $ref: 'TS29571_CommonData.yaml#/components/responses/501'
        '503':
          $ref: 'TS29571_CommonData.yaml#/components/responses/503'
        default:
          $ref: 'TS29571_CommonData.yaml#/components/responses/default'
      callbacks:
        onPriorityStatusEvent:
          '{$request.body#/priorityStatusNotificationUri}':
            post:
              parameters:
                - name: Content-Encoding
                  in: header
                  description: Content-Encoding, described in IETF RFC 7231
                  schema:
                    type: string
```

```yaml
            requestBody:
              description: Notification Payload
              content:
                application/json:
                  schema:
                    $ref: '#/components/schemas/NotificationData'
            responses:
              '204':
                description: Expected response to a successful callback processing
                headers:
                  Accept-Encoding:
                    description: Accept-Encoding, described in IETF RFC 7694
                    schema:
                      type: string
              '307':
                description: Temporary Redirect
                content:
                  application/json:
                    schema:
                      $ref: 'TS29571_CommonData.yaml#/components/schemas/RedirectResponse'
                headers:
                  Location:
                    description: 'The URI pointing to the resource located on another NF service consumer instance'
                    required: true
                    schema:
                      type: string
              '308':
                description: Permanent Redirect
                content:
                  application/json:
                    schema:
                      $ref: 'TS29571_CommonData.yaml#/components/schemas/RedirectResponse'
                headers:
                  Location:
                    description: 'The URI pointing to the resource located on another NF service consumer instance'
                    required: true
                    schema:
                      type: string
              '400':
                $ref: 'TS29571_CommonData.yaml#/components/responses/400'
              '401':
                $ref: 'TS29571_CommonData.yaml#/components/responses/401'
              '403':
                $ref: 'TS29571_CommonData.yaml#/components/responses/403'
              '404':
                $ref: 'TS29571_CommonData.yaml#/components/responses/404'
              '411':
                $ref: 'TS29571_CommonData.yaml#/components/responses/411'
              '413':
                $ref: 'TS29571_CommonData.yaml#/components/responses/413'
              '415':
                $ref: 'TS29571_CommonData.yaml#/components/responses/415'
              '429':
                $ref: 'TS29571_CommonData.yaml#/components/responses/429'
              '500':
                $ref: 'TS29571_CommonData.yaml#/components/responses/500'
              '501':
                $ref: 'TS29571_CommonData.yaml#/components/responses/501'
              '503':
                $ref: 'TS29571_CommonData.yaml#/components/responses/503'
              default:
                $ref: 'TS29571_CommonData.yaml#/components/responses/default'

/subscriptions/{subscriptionID}:
    delete:
      summary: Deletes a subscription
      operationId: RemoveSubscription
      tags:
        - Subscription ID (Document)
```

```yaml
      parameters:
        - name: subscriptionID
          in: path
          required: true
          description: Unique ID of the subscription to remove
          schema:
            type: string
            pattern: '^([0-9]{5,6}-)?[^-]+$'
      responses:
        '204':
          description: Expected response to a successful subscription removal
        '307':
          description: Temporary Redirect
          content:
            application/json:
              schema:
                $ref: 'TS29571_CommonData.yaml#/components/schemas/RedirectResponse'
          headers:
            Location:
              description: 'The URI pointing to the resource located on the redirect target NRF'
              required: true
              schema:
                type: string
        '308':
          description: Permanent Redirect
          content:
            application/json:
              schema:
                $ref: 'TS29571_CommonData.yaml#/components/schemas/RedirectResponse'
          headers:
            Location:
              description: 'The URI pointing to the resource located on the redirect target NRF'
              required: true
              schema:
                type: string
        '400':
          $ref: 'TS29571_CommonData.yaml#/components/responses/400'
        '401':
          $ref: 'TS29571_CommonData.yaml#/components/responses/401'
        '403':
          $ref: 'TS29571_CommonData.yaml#/components/responses/403'
        '404':
          $ref: 'TS29571_CommonData.yaml#/components/responses/404'
        '411':
          $ref: 'TS29571_CommonData.yaml#/components/responses/411'
        '413':
          $ref: 'TS29571_CommonData.yaml#/components/responses/413'
        '415':
          $ref: 'TS29571_CommonData.yaml#/components/responses/415'
        '429':
          $ref: 'TS29571_CommonData.yaml#/components/responses/429'
        '500':
          $ref: 'TS29571_CommonData.yaml#/components/responses/500'
        '501':
          $ref: 'TS29571_CommonData.yaml#/components/responses/501'
        '503':
          $ref: 'TS29571_CommonData.yaml#/components/responses/503'
        default:
          $ref: 'TS29571_CommonData.yaml#/components/responses/default' components:
```

************* Text Skipped for Clarify ****************

```yaml
  schemas:

SearchResult:
      description: Contains the list of NF Profiles returned in a Discovery response
```

```
      type: object
      required:
        - nfInstances
      properties:
        validityPeriod:
          type: integer
        nfInstances:
          type: array
          items:
            $ref: '#/components/schemas/NFProfile'
        searchId:
          type: string
        numNfInstComplete:
          $ref: 'TS29571_CommonData.yaml#/components/schemas/Uint32'
        preferredSearch:
          $ref: '#/components/schemas/PreferredSearch'
        nrfSupportedFeatures:
          $ref: 'TS29571_CommonData.yaml#/components/schemas/SupportedFeatures'
        nfInstanceList:
          description: List of matching NF instances. The key of the map is the NF instance ID.
          type: object
          additionalProperties:
            $ref: '#/components/schemas/NfInstanceInfo'
          minProperties: 1
        modifiedPriorityInd:
          type: boolean
```

************* Text Skipped for Clarify ****************

```
    ScpDomainRoutingInfoNotification:
      description: SCP Domain Routing Information Notification
      type: object
      required:
        - routingInfo
      properties:
        routingInfo:
          $ref: '#/components/schemas/ScpDomainRoutingInformation'
        localInd:
          type: boolean
          default: false SubscriptionData:
      description: Information of a subscription to changes on NRF calculated priority of NF instances.
      type: object
      required:
        - priorityStatusNotificationUri
      properties:
        nfStatusNotificationUri:
          type: string
        nfList:
          type: array
          items:
            $ref: 'TS29571_CommonData.yaml#/components/schemas/NfInstanceId'
          minItems: 1
        validityTime:
          $ref: 'TS29571_CommonData.yaml#/components/schemas/DateTime'
        assistInfo:
          $ref: '#/components/schemas/PriorityAssistInformation'
        plmnId:
          $ref: 'TS29571_CommonData.yaml#/components/schemas/PlmnId'
        nid:
          $ref: 'TS29571_CommonData.yaml#/components/schemas/Nid'
        hnrfDiscUri:
          $ref: 'TS29571_CommonData.yaml#/components/schemas/Uri'

NotificationData:
      description: Data sent in notifications from NRF NF service consumer, including changes on NRF calculated priority of NF instances.
```

```
    type: object
    required:
      - nfPriorityStatusList
    properties:
      nfPriorityStatusList:
        description: A map (list of key-value pairs) where NF Instance ID serves as the key
        type: object
        additionalProperties:
          $ref: '#/components/schemas/PriorityStatus'
        minProperties: 1

PriorityStatus:
  description: Updated NRF Calculated Proirity status of an NF instance.
  type: object
  properties:
    priority:
      type: integer
      minimum: 0
      maximum: 65535
    servicePriorityList:
      description: A map (list of key-value pairs) where NF Service Instance ID serves as the key
      type: object
      additionalProperties:
        type: integer
        minimum: 0
        maximum: 65535
      minProperties: 1

PriorityAssistInformation:
  description: Assist information for NRF performing priority calculation of NF instances.
  type: object
  required:
    - preferenceList
  properties:
    preferenceList:
      type: array
      items:
        type: string
      minItems: 1
```

**\* \* \* End of Changes \* \* \* \***

The invention claimed is:

1. A method for prioritising a plurality of first Network Function (NF) nodes of at least one service producer in a network, wherein the method is performed by a network node and comprises:
   initiating transmission of a first message towards a Network Repository Function (NRF) node;
   wherein the first message comprises information indicative of a plurality of criteria and an order of importance of the plurality of criteria;
   wherein the information is for use in assigning priority information to the plurality of first NF nodes; and
   wherein, for each first NF node of the plurality of first NF nodes, the priority information assigned to the first NF node is indicative of a priority with which the first NF node is to be selected to provide a service relative to at least one other first NF node of the plurality of first NF nodes and the priority information is assigned to the first NF node based on one or more criteria of the plurality of criteria that the first NF node meets and the position of the one or more criteria in the order of importance of the plurality of criteria.

2. The method of claim 1, wherein the first message comprises an array and the array comprises the information indicative of the plurality of criteria and the order of importance of the plurality of criteria, and wherein each item of the array comprises a different criterion of the plurality of criteria and the plurality of criteria are ordered in the array according to their importance.

3. The method of claim 1, wherein the plurality of criteria comprises any one or more of:
   a criterion indicative that first NF nodes located at a predefined location are preferred;
   a criterion indicative that first NF nodes serving a predefined tracking area identity (TAI) are preferred;
   a criterion indicative that a predefined instance of first NF nodes are preferred;
   a criterion indicative that first NF nodes supporting a predefined application programming interface (API) version of the service are preferred;
   a criterion indicative that first NF nodes serving a full public land mobile network (PLMN) are preferred;
   a criterion indicative that first NF nodes supporting one or more predefined vendor specific features for the service are preferred; and
   a criterion indicative that first NF nodes supporting one or more predefined vendor specific features for the first NF nodes are preferred.

4. The method of claim 1, further comprising initiating transmission of a second message towards the NRF node, wherein the second message comprises:
   the information indicative of the plurality of criteria and the order of importance of the plurality of criteria; and/or
   information indicative of the plurality of first NF nodes for providing the service and, for each first NF node of the plurality of first NF nodes, the priority information assigned to the first NF node.

5. The method of claim 4, wherein:
   the second message is a first subscription request; and
   the first subscription request is a request for the NRF node to notify the network node of updates to a profile of any first NF nodes of the plurality of first NF nodes; or
   the first subscription request is a request for the NRF node to notify the network node of updates to the priority information assigned to any first NF nodes of the plurality of first NF nodes.

6. The method of claim 5, wherein:
   the first subscription request is separate from a second subscription request; and
   the second subscription request is a request for the NRF node to notify the network node of updates to a profile of any first NF nodes of the plurality of first NF nodes.

7. The method of claim 1, wherein:
   the first message is a discovery request and the discovery request is a request for information indicative of the plurality of first NF nodes for providing the service; or
   the first message is a first subscription request and the first subscription request is a request for the NRF node to notify the network node of updates to a profile of any first NF nodes of the plurality of first NF nodes; or
   the first message is a second subscription request and the second subscription request is a request for the NRF node to notify the network node of updates to the priority information assigned to any first NF nodes of the plurality of first NF nodes.

8. The method of claim 7, wherein the second subscription request comprises information indicative of the plurality of first NF nodes for providing the service.

9. The method of claim 7, wherein:
   the second subscription request is separate from a third subscription request; and
   the third subscription request is a request for the NRF node to notify the network node of updates to a profile of any first NF nodes of the plurality of first NF nodes.

10. The method of claim 1, wherein:
    the first message comprises an identifier; and
    the identifier is the information indicative of the plurality of criteria and the order of importance of the plurality of criteria.

11. The method of claim 10, wherein the information indicative of the plurality of criteria and the order of importance of the plurality of criteria is an identity of a resource of the NRF node at which the information indicative of the plurality of criteria and the order of importance of the plurality of criteria is stored.

12. The method of claim 10, further comprising receiving a third message comprising the identifier from the NRF node, wherein:
    the third message is a discovery response; and
    the discovery response comprises information indicative of the plurality of first NF nodes for providing the service and information indicative that the priority information has been assigned to the plurality of first NF nodes.

13. The method of claim 10, further comprising:
    initiating transmission of a discovery request towards the NRF node;
    wherein the discovery request is a request for information indicative of the plurality of first NF nodes for providing the service; and
    wherein the discovery request comprises information indicative that the network node is to be subscribed to updates to the priority information assigned to any first NF nodes of the plurality of first NF nodes.

14. The method of claim 1, further comprising:
    initiating transmission of a discovery request towards the NRF node in response to receiving a second message from the NRF node;
    wherein the second message comprises information indicative that the network node is to initiate transmission of a discovery request towards the NRF node; and
    wherein the discovery request is a request for information indicative of an alternative plurality of first NF nodes for providing the service and comprises the information indicative of the plurality of criteria and the order of importance of the plurality of criteria.

15. A method for prioritising a plurality of first Network Function (NF) nodes of at least one service producer in a network, wherein the method is performed by a network node and comprises:
receiving a first message from a Network Repository Function (NRF) node;
wherein the first message comprises priority information assigned to the plurality of first NF nodes; and
wherein, for each first NF node of the plurality of first NF nodes, the priority information assigned to the first NF node is indicative of a priority with which the first NF node is to be selected to provide a service relative to at least one other first NF node of the plurality of first NF nodes and the priority information is assigned to the first NF node based on one or more criteria of a plurality of criteria that the first NF node meets and the position of the one or more criteria in an order of importance of the plurality of criteria.

16. The method of claim 15, further comprising selecting a first NF node from the plurality of first NF nodes to provide the service, wherein the first NF node is selected based on the priority information.

17. The method of claim 15, wherein the priority information assigned to the selected first NF node is indicative that a priority with which the selected first NF node is to be selected is higher than a priority with which the other first NF nodes are to be selected.

18. The method of claim 15, wherein the plurality of criteria comprise any one or more of:
a criterion indicative that first NF nodes located at a predefined location are preferred;
a criterion indicative that first NF nodes serving a predefined tracking area identity, TAI, are preferred;
a criterion indicative that a predefined instance of first NF nodes are preferred;
a criterion indicative that first NF nodes supporting a predefined application programming interface, API, version of the service are preferred;
a criterion indicative that first NF nodes serving a full public land mobile network, PLMN, are preferred;
a criterion indicative that first NF nodes supporting one or more predefined vendor specific features for the service are preferred; and
a criterion indicative that first NF nodes supporting one or more predefined vendor specific features for the first NF nodes are preferred.

19. The method of claim 15, wherein:
the first message is a discovery response and the discovery response comprises information indicative of the plurality of first NF nodes for providing the service and information indicative that the priority information has been assigned to the plurality of first NF nodes; or
the first message is a first subscription response and the first subscription response comprises information indicative of an update to a profile of one or more first NF nodes of the plurality of first NF nodes; or
the first message is a second subscription response and the second subscription response comprises information indicative of an update to the priority information assigned to one or more first NF nodes of the plurality of first NF nodes.

20. The method of claim 19, wherein:
the second subscription response is separate from a third subscription response; and
the third subscription response comprises information indicative of an update to a profile of one or more first NF nodes of the plurality of first NF nodes.

21. The method of claim 15, further comprising:
receiving a second message from the NRF node;
wherein the second message comprises information indicative that the network node is to initiate transmission of a discovery request towards the NRF node; and
wherein the discovery request is a request for information indicative of an alternative plurality of first NF nodes for providing the service and comprises the information indicative of the plurality of criteria and the order of importance of the plurality of criteria.

22. A network node comprising:
processing circuitry; and
memory comprising instructions therein that, when executed by the processing circuitry, configures the network node to:
initiate transmission of a first message towards a Network Repository Function (NRF) node;
wherein the first message comprises information indicative of a plurality of criteria and an order of importance of the plurality of criteria;
wherein the information is for use in assigning priority information to a plurality of first Network Function (NF) nodes; and
wherein, for each first NF node of the plurality of first NF nodes, the priority information assigned to the first NF node is indicative of a priority with which the first NF node is to be selected to provide a service relative to at least one other first NF node of the plurality of first NF nodes and the priority information is assigned to the first NF node based on one or more criteria of the plurality of criteria that the first NF node meets and the position of the one or more criteria in the order of importance of the plurality of criteria.

23. A network node comprising:
processing circuitry; and
memory comprising instructions therein that, when executed by the processing circuitry, configures the network node to:
receive a first message from a Network Repository Function (NRF) node;
wherein the first message comprises priority information assigned to a plurality of first Network Function (NF) nodes; and
wherein, for each first NF node of the plurality of first NF nodes, the priority information assigned to the first NF node is indicative of a priority with which the first NF node is to be selected to provide a service relative to at least one other first NF node of the plurality of first NF nodes and the priority information is assigned to the first NF node based on one or more criteria of a plurality of criteria that the first NF node meets and the position of the one or more criteria in an order of importance of the plurality of criteria.

* * * * *

UNITED STATES PATENT AND TRADEMARK OFFICE
CERTIFICATE OF CORRECTION

PATENT NO. : 12,107,916 B2
APPLICATION NO. : 18/266942
DATED : October 1, 2024
INVENTOR(S) : Rodrigo et al.

Page 1 of 1

It is certified that error appears in the above-identified patent and that said Letters Patent is hereby corrected as shown below:

In the Specification

In Column 34, Line 7, delete "FIG. 1C," and insert -- FIG. 10, --, therefor.

Signed and Sealed this
Eighteenth Day of February, 2025

Coke Morgan Stewart
*Acting Director of the United States Patent and Trademark Office*